United States Patent [19]

Akishino et al.

[11] Patent Number: 5,128,869
[45] Date of Patent: Jul. 7, 1992

[54] ENGINE CONTROLLING SYSTEM FOR VEHICLE

[75] Inventors: Katsuo Akishino; Osamu Hirako; Makoto Shimada, all of Kyoto, Japan

[73] Assignee: Mitsubishi Jidosha Kogyo Kabushiki Kaisha, Tokyo, Japan

[21] Appl. No.: 400,114

[22] PCT Filed: Dec. 24, 1988

[86] PCT No.: PCT/JP88/01323
§ 371 Date: Aug. 22, 1989
§ 102(e) Date: Aug. 22, 1989

[87] PCT Pub. No.: WO89/06196
PCT Pub. Date: Jul. 13, 1989

[30] Foreign Application Priority Data

| Dec. 25, 1987 | [JP] | Japan | 62-328604 |
| Jan. 12, 1988 | [JP] | Japan | 63-4457 |
| Jul. 20, 1988 | [JP] | Japan | 63-180846 |
| Aug. 20, 1988 | [JP] | Japan | 63-206906 |
| Aug. 20, 1988 | [JP] | Japan | 63-206907 |

[51] Int. Cl.$^5$ ............................................. B60K 31/00
[52] U.S. Cl. .................. 364/426.04; 180/179; 123/352; 364/431.07
[58] Field of Search ........... 364/426.04, 431.07; 180/176–179; 123/352

[56] References Cited

U.S. PATENT DOCUMENTS

| 4,084,659 | 4/1978 | Abend et al. | 364/426.04 |
| 4,117,903 | 10/1978 | Fleischer et al. | 364/426.04 |
| 4,750,598 | 6/1988 | Danno et al. | 123/340 |
| 4,833,612 | 5/1989 | Okuno et al. | 364/426.04 |
| 4,884,203 | 11/1989 | Preis et al. | 364/426.04 |
| 4,907,155 | 3/1990 | Naitou et al. | 364/426.04 |
| 4,914,596 | 4/1990 | Etoh et al. | 180/179 |
| 4,934,476 | 6/1990 | Hyodo | 180/177 |

FOREIGN PATENT DOCUMENTS 0278232  8/1988  European Pat. Off. .
3523352  1/1986  Fed. Rep. of Germany .
3710891  10/1987  Fed. Rep. of Germany .

Primary Examiner—Gary Chin
Attorney, Agent, or Firm—Wegner, Cantor, Mueller & Player

[57] ABSTRACT

An engine controlling system for a vehicle which is suitable for use with an automobile. When an accelerated/decelerated condition detecting means detects an inoperative condition of an acceleration/deceleration instructing means and develops a non-operation detection signal, a constant speed running designation signal is developed from a constant speed running designating means, and an aimed speed setting means sets a speed of the vehicle to be aimed when the vehicle should make constant speed running. Then, a constant speed running controlling means controls an engine output adjusting means in response to a running speed detection signal from a running speed detecting means so that the running speed of the vehicle may become equal to the aimed speed. The engine output adjusting means thus adjusts the output power of an engine carried on the vehicle. Consequently, the vehicle thereafter makes constant speed running at a speed equal to the aimed speed.

10 Claims, 31 Drawing Sheets

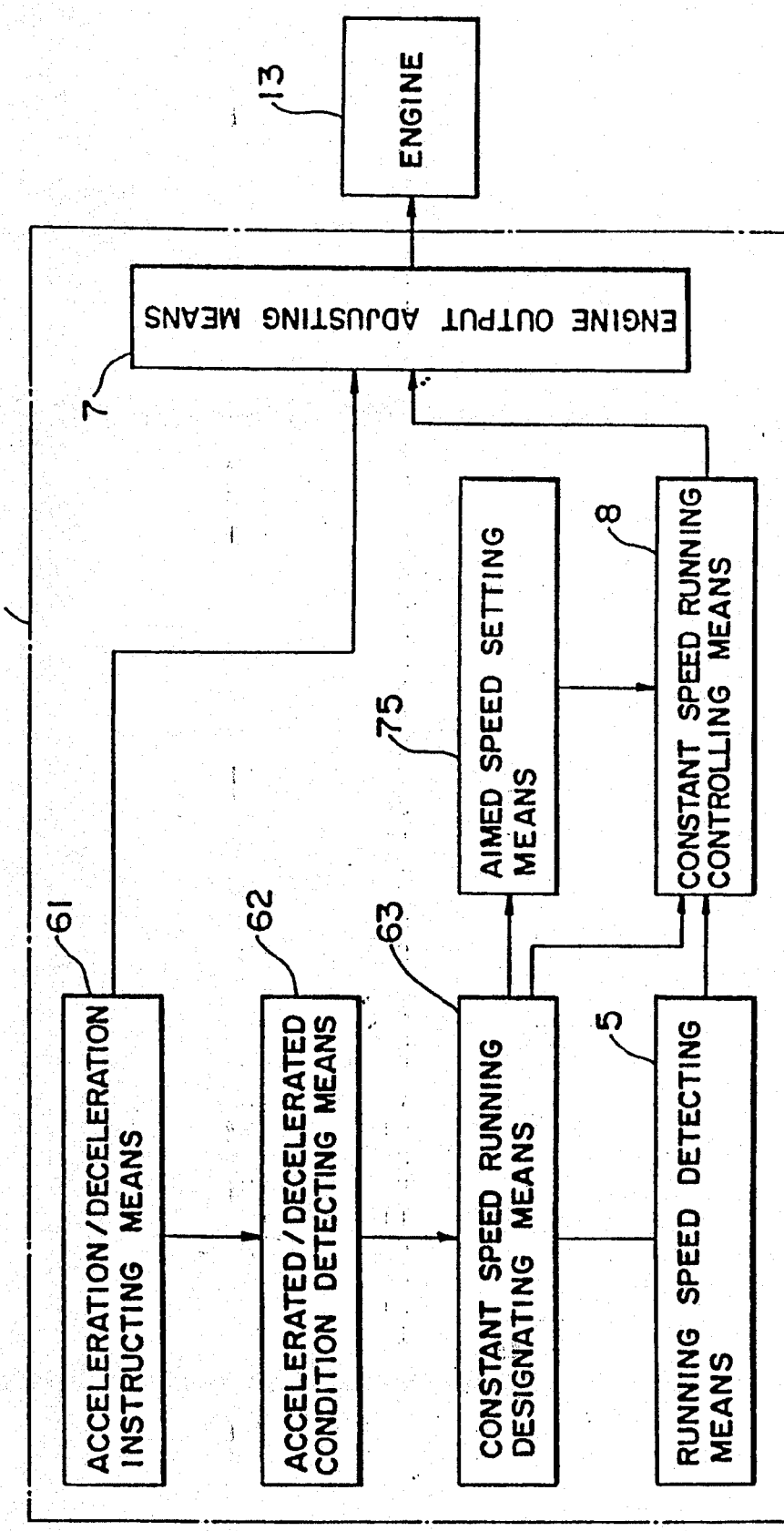

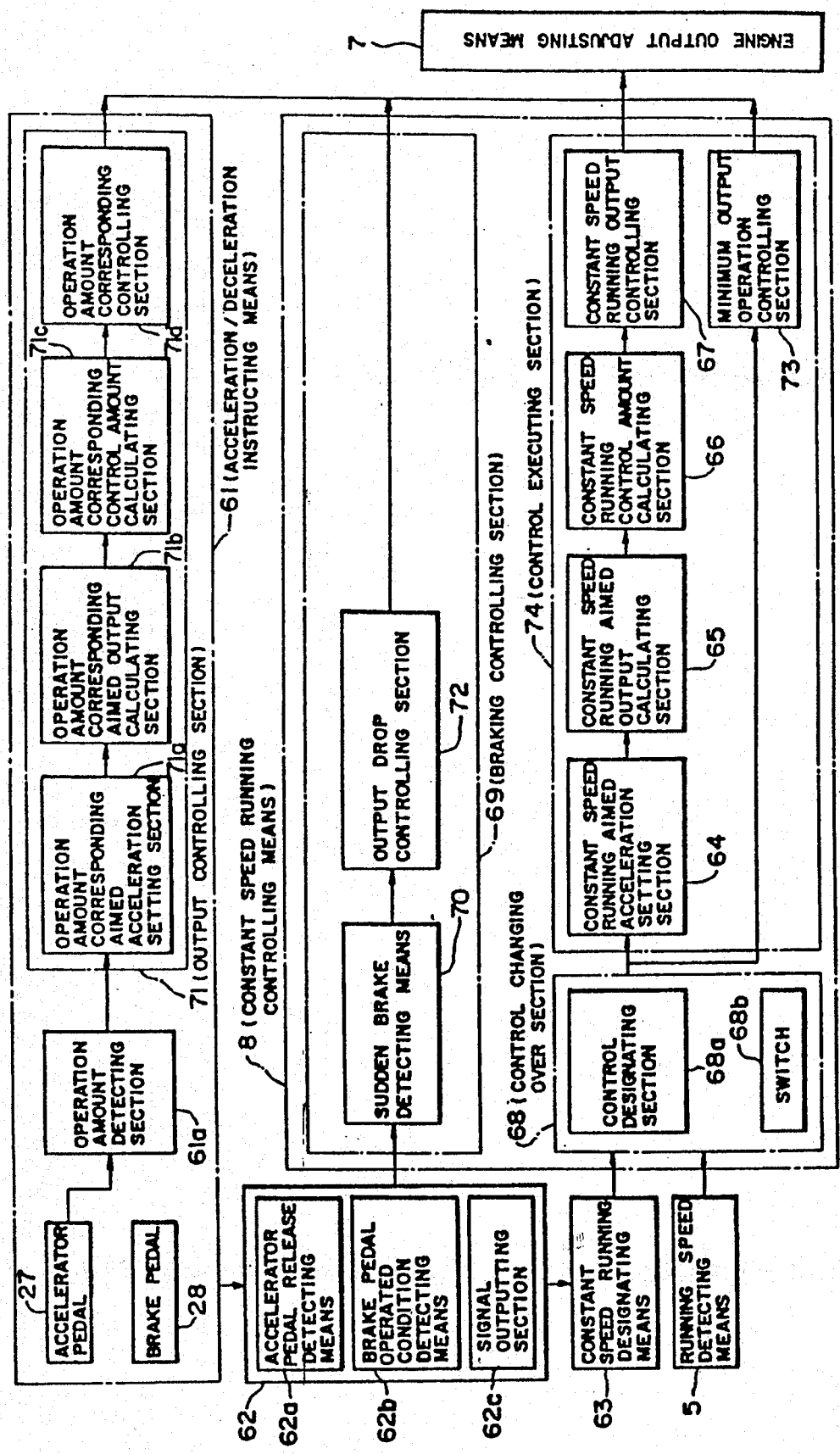

18 : AUTOMATIC CRUISE SWITCH
18a : MAIN LEVER
45 : ACCELERATION SWITCH
46 : CHANGING OVER SWITCH
47 : THROTTLE SWITCH
48 : AIMED SPEED CHANGING OVER SWITCH

18 : AUTOMATIC CRUISE SWITCH
45 : ACCELERATION SWITCH
46 : CHANGING OVER SWITCH
47 : THROTTLE SWITCH
48 : AIMED SPEED CHANGING OVER SWITCH

FIG. 8(iii)
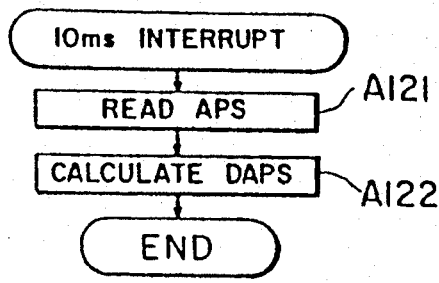

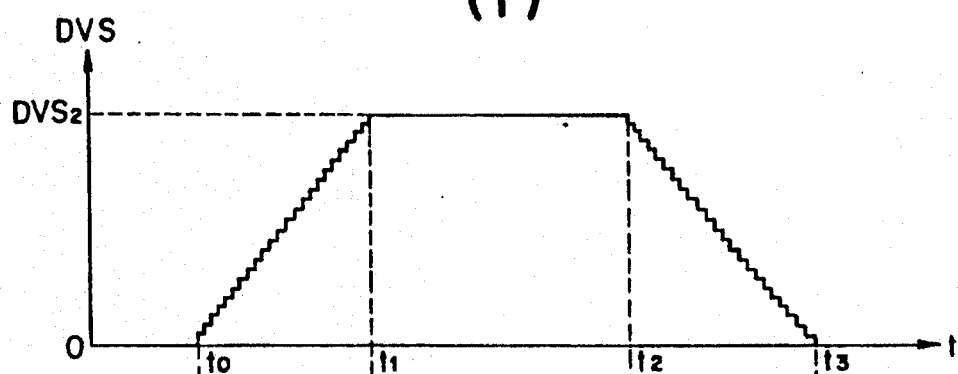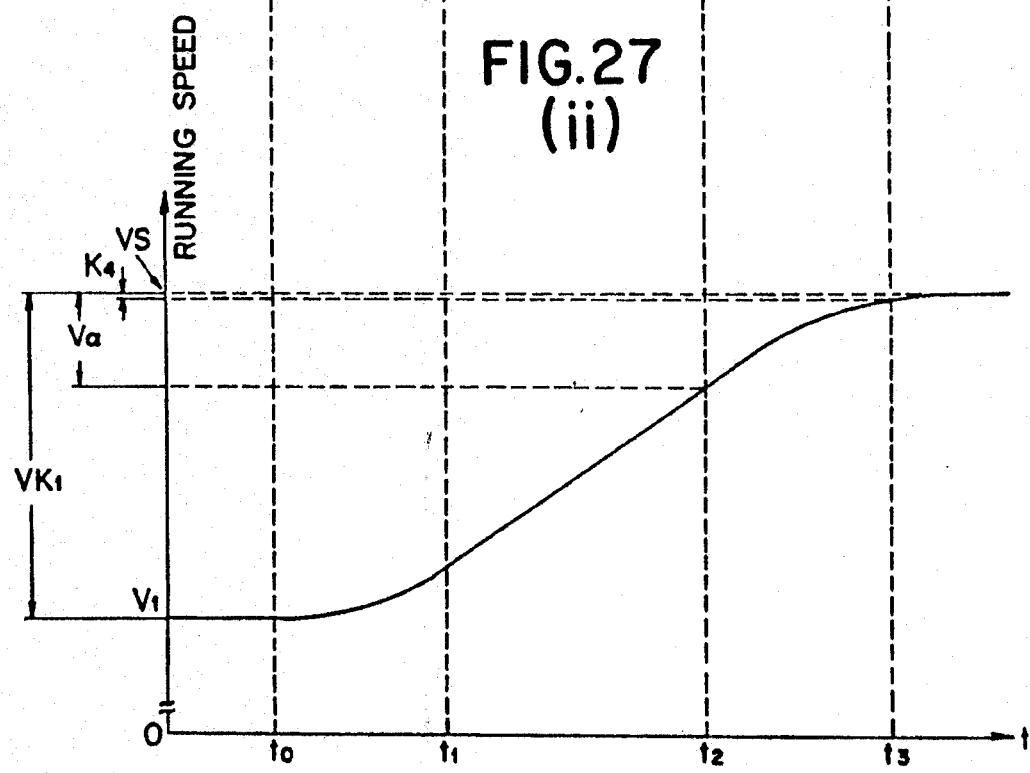

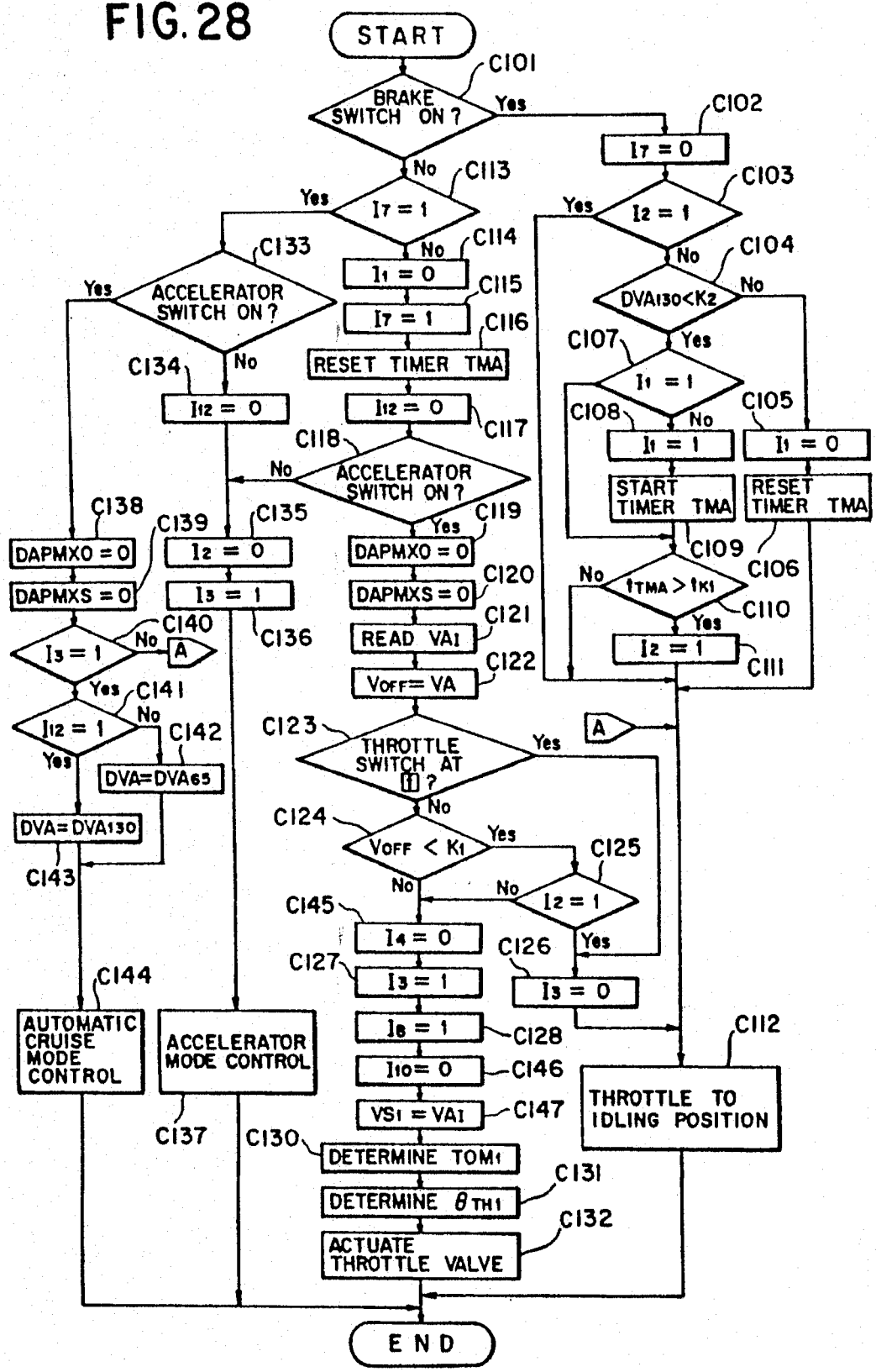

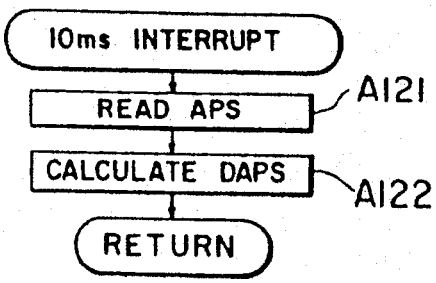
FIG.33(iii)

ENGINE CONTROLLING SYSTEM FOR VEHICLE

FIELD OF THE INVENTION

This invention relates to an engine controlling system for a vehicle which is suitable for use with an automobile.

BACKGROUND OF THE INVENTION

Conventionally, various systems for controlling an engine of a vehicle to automatically control the running speed of the vehicle have been provided. Such control may be constant speed running control, accelerated or decelerated running control or the like. Those systems are provided principally in order to facilitate operation for running of a vehicle. For example, it is anticipated to attain desired running of a vehicle with minimized operations of an accelerator pedal or a brake pedal.

Particularly when a vehicle is running following another preceding vehicle on a road where traffic is heavy, the running speed must be changed particularly frequently, and it is very important to allow the running speed of the vehicle to be changed frequently with a minimized number of operations.

However, when the running speed of a vehicle in a constant speed running condition is to be changed, it is necessary, with a conventional engine controlling system for a vehicle, to treadle an accelerator pedal or loosen the treadling of the accelerator pedal until a predetermined car speed is reached and then re-set the constant running speed. Also, it frequently happens that it is desired to cause a vehicle to run at a constant speed after the vehicle has been decelerated to a predetermined speed by treadling operation of a brake pedal. In such an instance, normally a conventional engine controlling system for a vehicle is reset each time the brake pedal is treadled, and consequently, it is necessary to re-start constant speed running control by manual operation. Thus, the conventional engine controlling systems for an engine have drawbacks that such operation as described just above makes a burden to the driver and that the essential object of a controlling means of the type to facilitate operation cannot be attained sufficiently.

The present invention has been made in view of such a subject as described above, and it is an object of the present invention to provide an engine controlling system for a vehicle which can attain easy and smooth transition to constant speed running of the vehicle even after operation of a brake pedal or an accelerator pedal and with which a will of a driver for driving can reflect with certainty on running of the vehicle.

DISCLOSURE OF THE INVENTION

In order to attain the object, according to the present invention, there is provided an engine controlling system for a vehicle, which comprises an engine output adjusting means for adjusting an output power of an engine carried on the vehicle, an acceleration/deceleration instructing means for developing an instruction of acceleration or deceleration of the vehicle, an accelerated/decelerated condition detecting means for detecting an inoperative condition of the acceleration/deceleration instructing means to develop a non-operation detection signal, a constant speed running designating means for developing a constant speed running designating signal when the non-operation detection signal is received, an aimed speed setting means for setting, when the constant speed running designating signal is received, an aimed speed at which the vehicle should make constant speed running, a running speed detecting means for detecting a running speed of the vehicle to develop a running speed detection signal, and a constant speed running controlling means for controlling, when the constant speed running designating signal is received, the engine output adjusting means in accordance with the running speed detection signal so that the running speed of the vehicle may become equal to the aimed speed.

With the engine controlling system for a vehicle according to the present invention described above, if the accelerated/decelerated condition detecting means detects that the acceleration/deceleration instructing means is inoperative and develops a non-operation detection signal, then a constant speed running designating signal is developed from the constant speed running designating means, and the aimed speed setting means sets a speed of the vehicle to be aimed when the vehicle is to make constant speed running. Then, the constant speed running controlling means controls the engine output adjusting means in response to a running speed detection signal from the running speed detecting means so that the running speed of the vehicle may become equal to the aimed speed. In accordance with the control, the engine output adjusting means adjusts the output power of the engine carried on the vehicle. Consequently, the vehicle will make constant speed running at the aimed speed.

BRIEF DESCRIPTION OF THE DRAWINGS

FIGS. 1(*i*) and 1(*ii*) are block diagrams schematically showing construction of principal components of an engine controlling system for a vehicle to which the present invention is applied;

FIGS. 27(i) and 27(ii) are graphs showing exemplary changes of an aimed acceleration and a running speed with respect to a time elapsed after an acceleration switch of the vehicle engine controlling system shown in FIG. 2 is changed over to change the designation by a running condition designating section of the control section to an accelerated running;

FIG. 28 is a flow chart illustrating details of operation of non-direct throttle movement control at step A116 of the flow of FIG. 8(i) but by a vehicle engine controlling system according to another embodiment of the present invention;

BEST FORMS IN EMBODYING THE INVENTION

Figure 29:
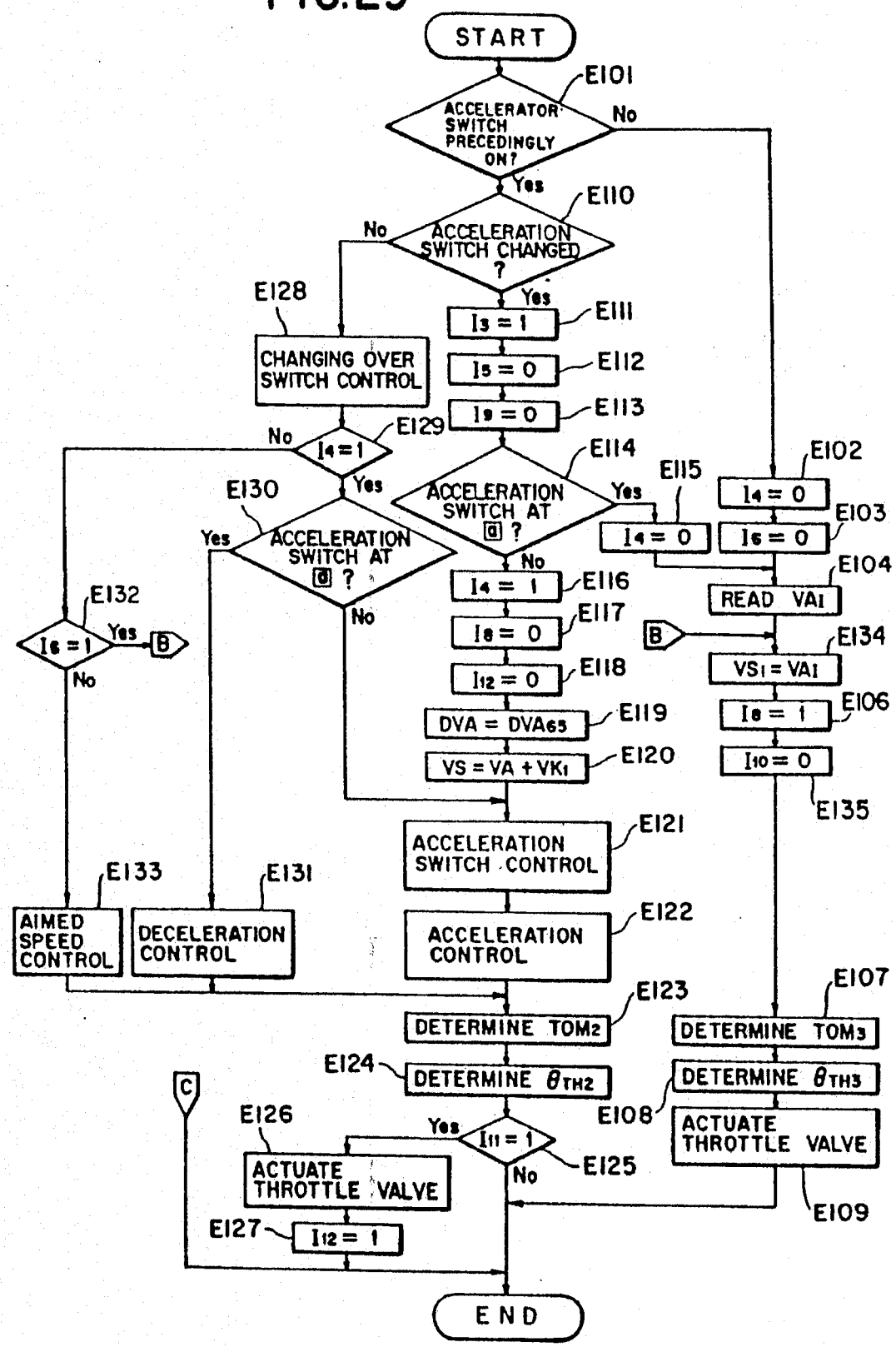
FIG. 29 is a flow chart illustrating details of operation of automatic cruise mode control at step C144 of the flow of FIG. 28.
Figure 30:
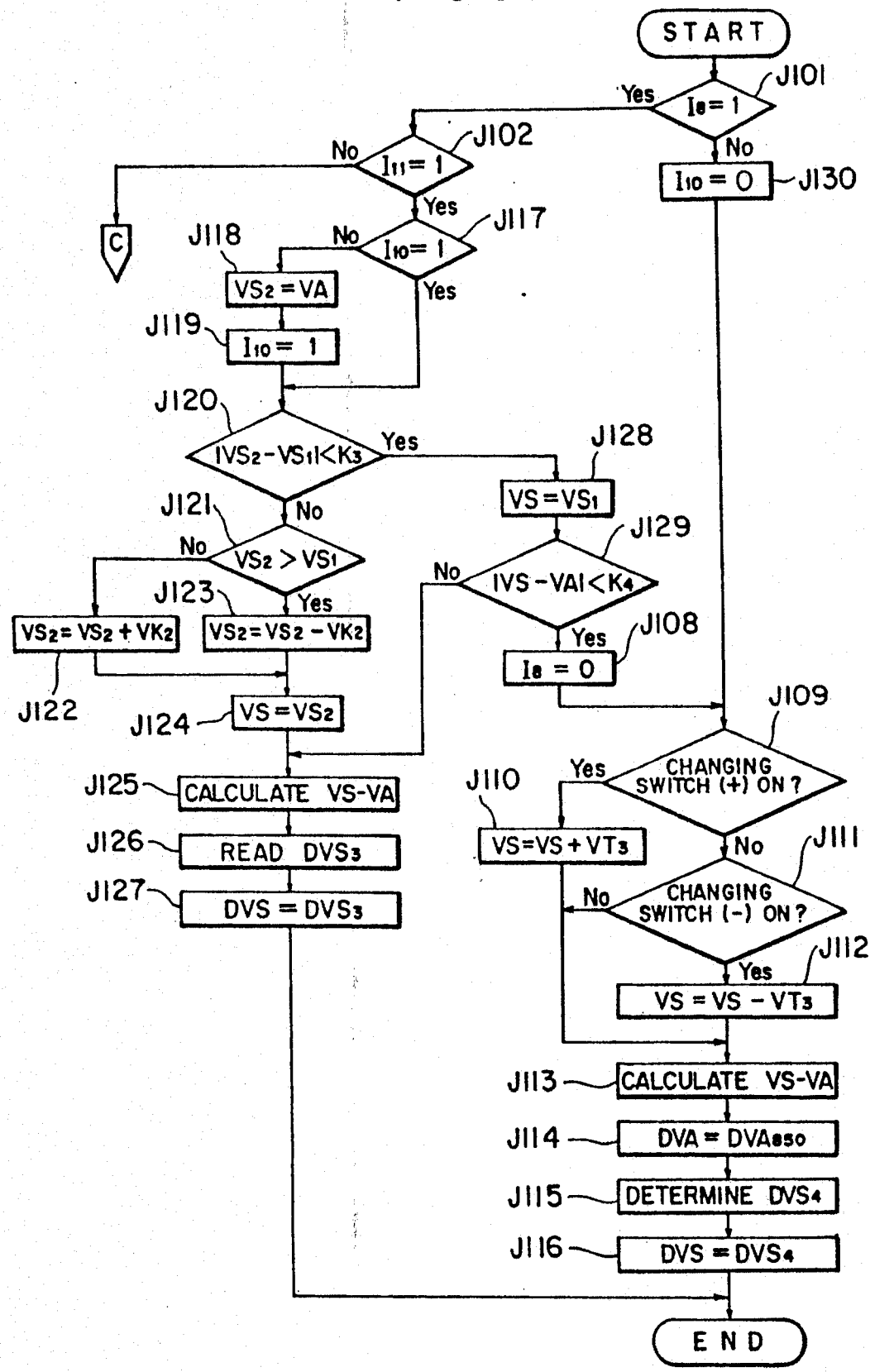
FIG. 30 is a flow chart illustrating details of operation of aimed speed control at step E133 of the flow of FIG. 29.
Figure 34:
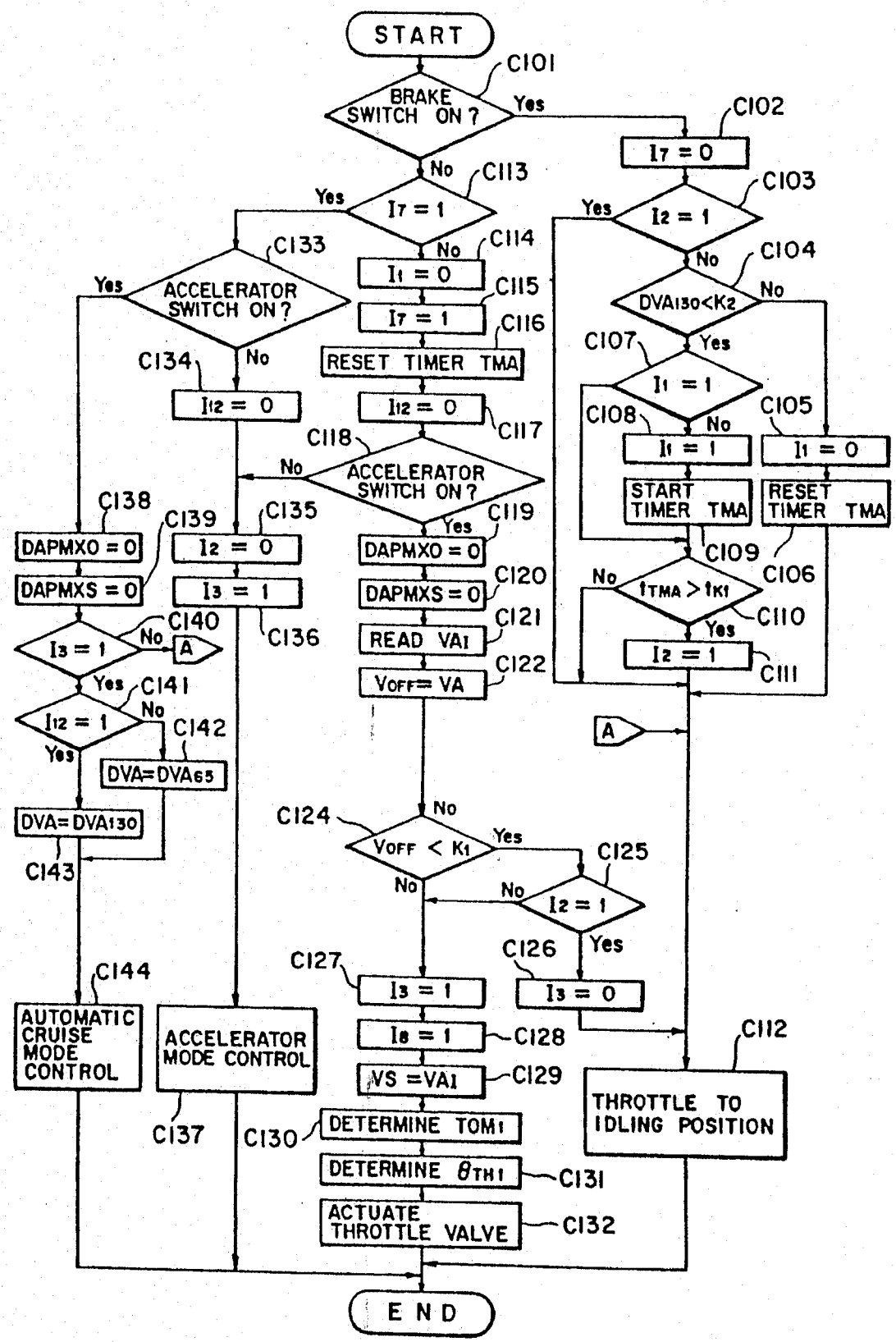
FIG. 34 is a flow chart illustrating details of operation of non-direct throttle movement control at step A116 of the main routine of FIG. 33(i)
Figure 35:
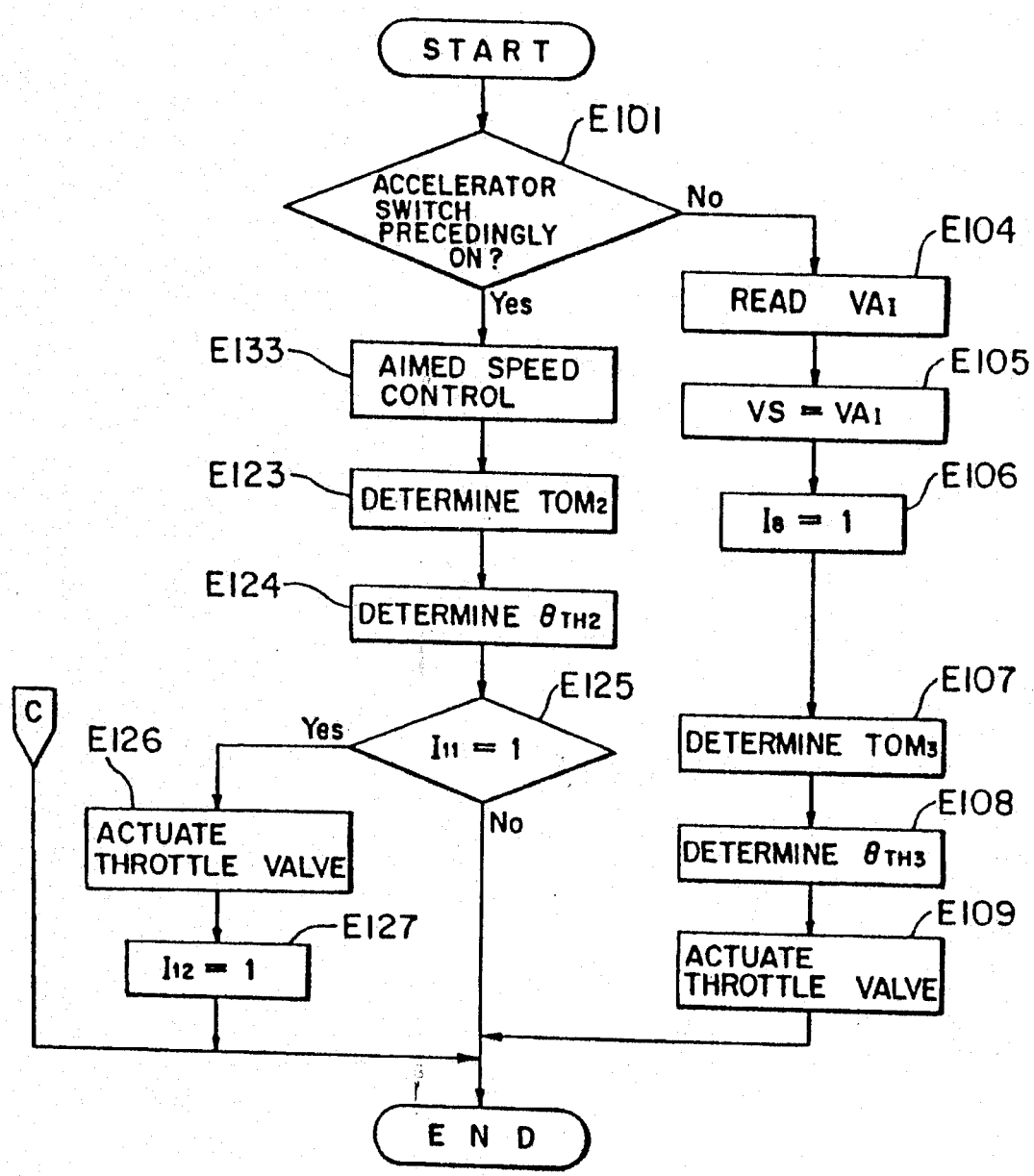
FIG. 35 is a flow chart illustrating details of operation of automatic cruise mode control at step C144 of the flow of FIG. 34.
Figure 36:
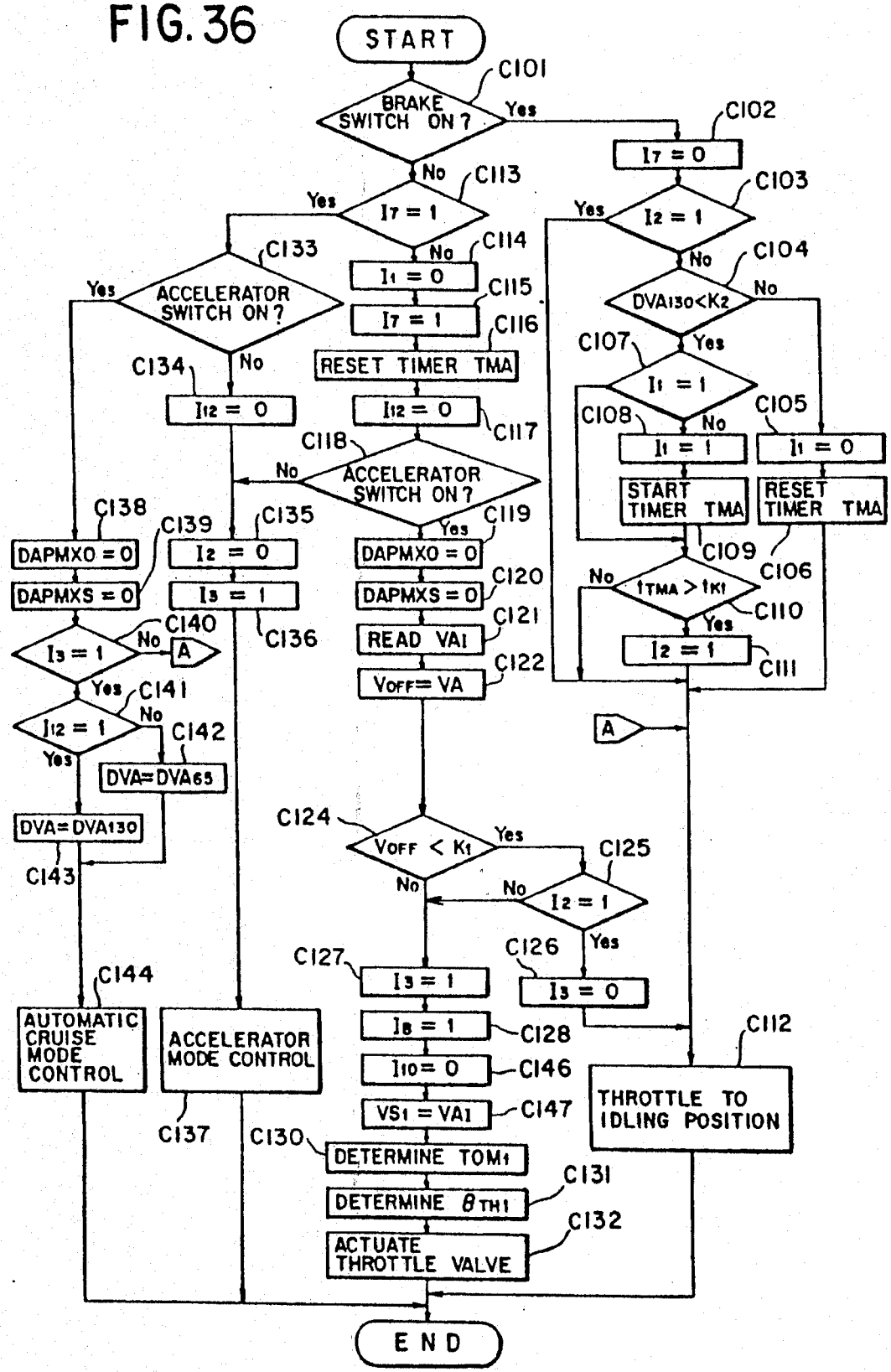
FIG. 36 is a flow chart illustrating details of operation of non-direct throttle movement control at step A116 of the flow of FIG. 33(i) but by a vehicle engine controlling system according to a fourth embodiment of the present invention.
Figure 37:
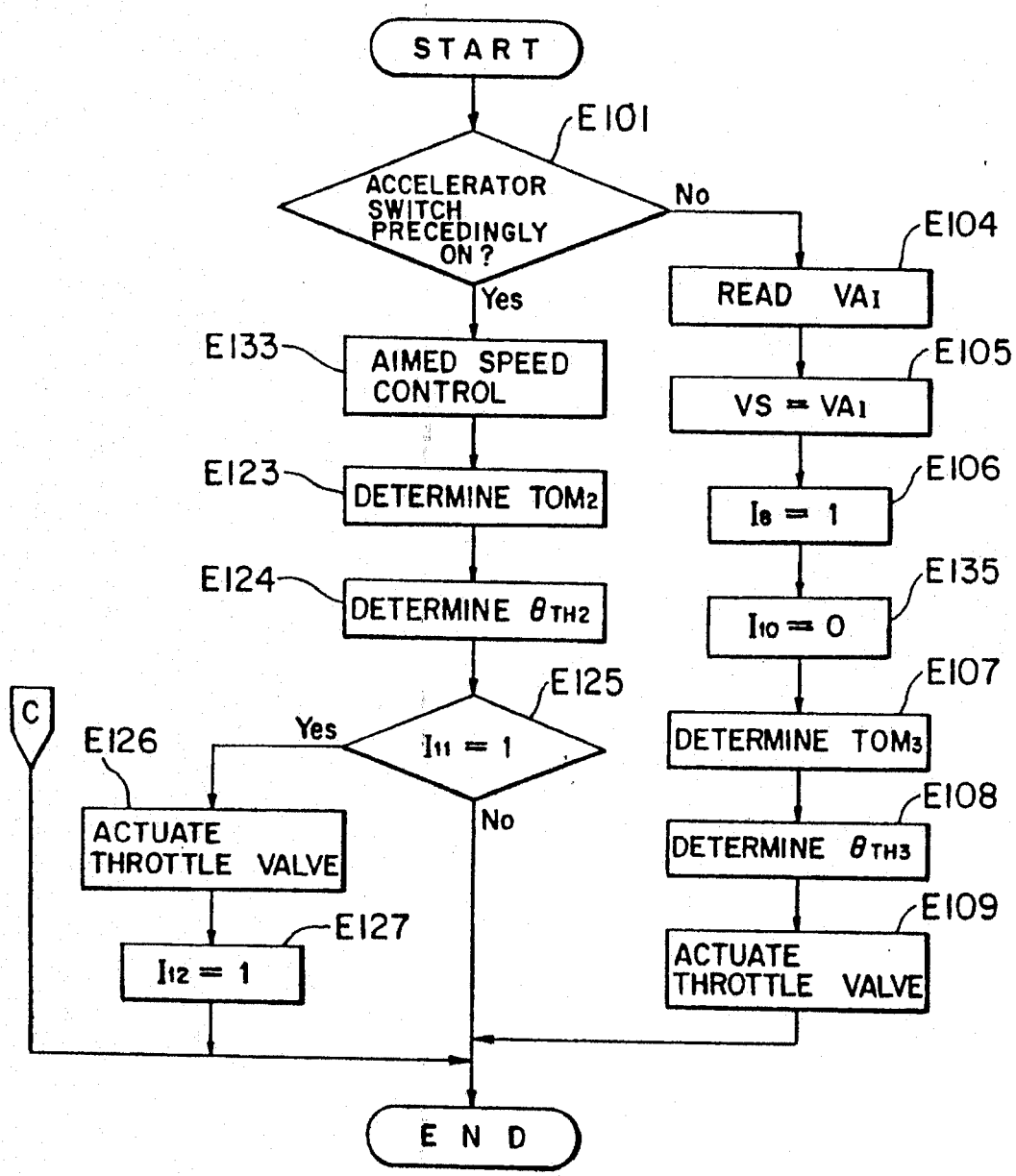
FIG. 37 is a flow chart illustrating details of operation of automatic cruise mode control at step C144 of the flow of FIG. 36.

In the following, preferred embodiments of the present invention will be described with reference to the drawings. FIGS. 1(i) to 27 show an engine controlling system for a vehicle of a first preferred embodiment of the present invention; FIGS. 28 to 30 show contents of control of another vehicle engine controlling system as a second preferred embodiment of the present invention; FIGS. 31 to 35 show contents of control of a further vehicle engine controlling system as a third preferred embodiment of the present invention; and FIGS. 36 and 37 show contents of control of a still further vehicle engine controlling system as a fourth preferred embodiment of the present invention.

At first, an engine controlling system for a vehicle according to the first preferred embodiment of the present invention will be described with reference to FIGS. 1(i) to 27. It is to be noted that FIGS. 1(i) to 7 of those figures show construction of the system of the first embodiment of the present invention, and the construction of the system will be described with reference to FIGS. 1(i) to 7.

Figure 2:
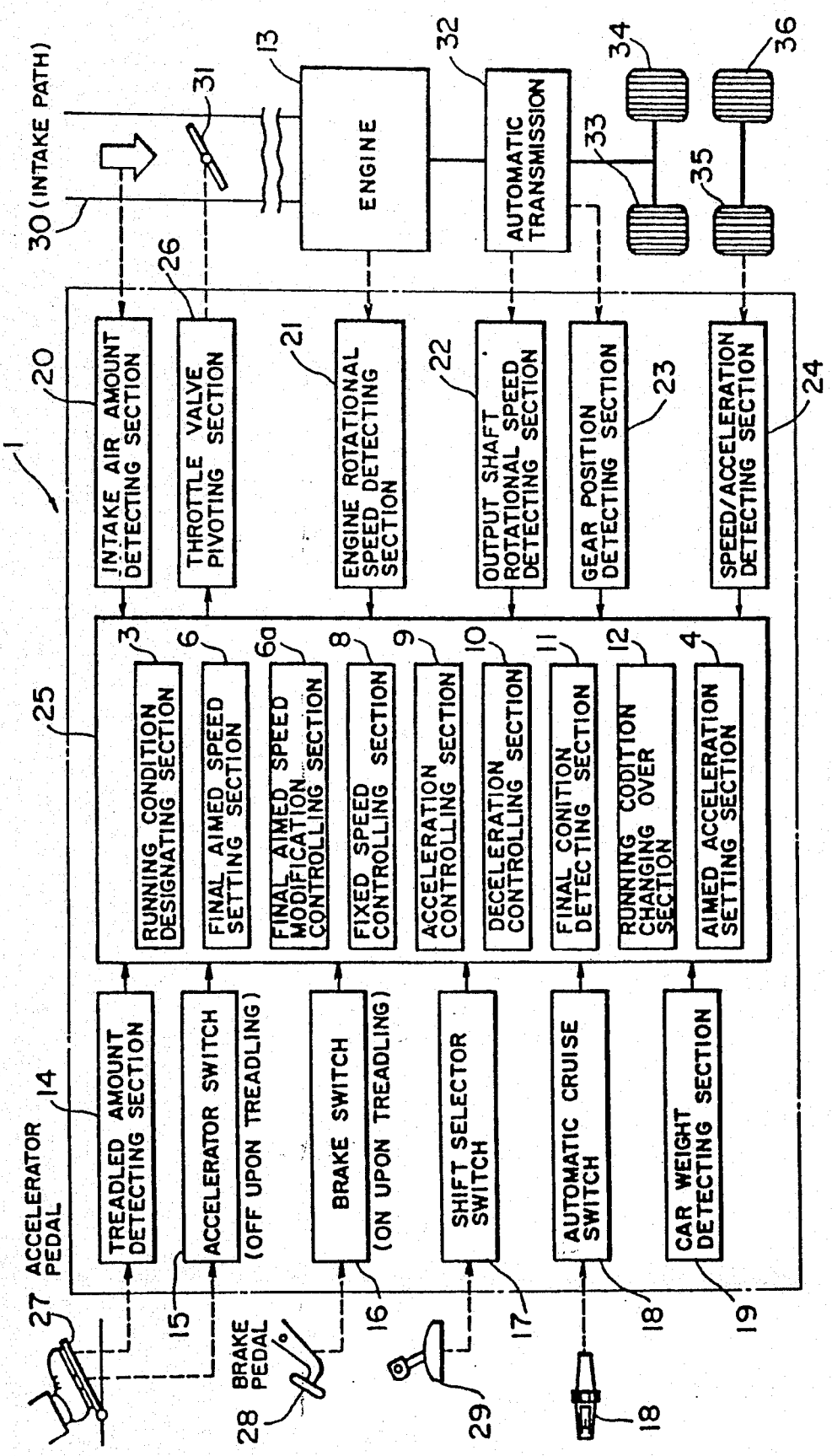
FIG. 2 is a block diagram schematically showing general construction of the vehicle engine controlling system.

Reference is first had to FIGS. 1(i), 1(ii) and 2 wherein FIGS. 1(i) and 1(ii) schematically show construction of principal components of the vehicle engine controlling system of the present embodiment, and FIG. 2 schematically shows general construction of the vehicle engine controlling system of the present embodiment.

Referring first to FIG. 1(i), the engine controlling system for a vehicle is generally denoted at 1.

The vehicle engine controlling system 1 includes a running speed detecting means 5 for detecting a running speed of a vehicle to develop a running speed detection signal. The running speed detecting means 5 corresponds particularly to a car speed sensor (not shown) provided in a transmission or the like of the vehicle.

The vehicle engine controlling system 1 further includes an engine output adjusting means 7 for adjusting an output power of an engine 13 carried on the vehicle in accordance with a variable control amount. The engine output adjusting means 7 corresponds particularly to a throttle valve pivoting section 26 and a throttle valve 31 shown in FIG. 2 for changing the amount of air to be taken into the engine 13 to adjust the output power of the engine 13. It is to be noted that the variable control amount is delivered from any one of various controlling sections 71d, 72, 67 and 73 which correspond particularly to a control section 25 shown in FIG. 2 and will be hereinafter described.

The vehicle engine controlling system 1 further includes a constant speed controlling means 8 for controlling the engine output adjusting means 7 in response to a constant speed designating signal so that the running speed of the vehicle may become equal to an aimed speed. More particularly, the constant speed controlling means 8 sets a control mount of the engine output adjusting means 7 to adjust the output power of the engine 13 required to maintain constant speed running of the vehicle at a predetermined speed.

Referring to FIG. 1(ii), the constant speed running controlling means 8 includes a control change-over section 68 for alternatively changing over, when a constant speed running designating signal is received, the control of the engine output adjusting means 7 between first control for making the running speed of the vehicle equal to an aimed speed when a non-operation detection signal is received and second control for putting the engine 13 into a substantially minimum output operating condition, and a control executing section 74 for executing the control designated by the control change-over section 68.

The control change-over section 68 is composed of a switch 68b (corresponding to throttle switch 27 described hereinafter) provided in a room of the vehicle, and a control designating section 68a for designating control of the engine output adjusting means 7 in response to a condition of the switch 68b. The switch 68b has at least two conditions of contacts including a first condition g and a second condition f, and when the switch 68b is in the first contact condition, the control executing section 78 designates, in response to a constant speed running designating signal received, control for making the running speed of the vehicle equal to an aimed speed (that is, normal constant speed control) as the control of the engine output adjusting means 7. To the contrary, when the switch 68b is in the second contact condition, the control executing section 74 designates, in response to a constant speed running designating signal received, control for putting the engine 13 into a substantially minimum output operating condition (i.e., an idling state) as the control of the engine output adjusting means 7.

The control executing section 74 includes a constant speed running aimed acceleration setting section 64, a constant speed running aimed output calculating section 65, a constant speed running control amount calculating section 66, and a constant speed running output controlling section 67. Of those sections, the constant speed running aimed acceleration setting section 64 sets, in response to a running speed detection signal received, an aimed acceleration of the vehicle necessary for the running speed of the vehicle to be made equal to an aimed speed. The constant speed running aimed output calculating section 65 calculates an aimed engine output power corresponding to an aimed acceleration set by the constant speed running aimed acceleration setting section 64. The constant speed running aimed control amount calculating section 66 calculates a control amount of the engine output adjusting means 7 corresponding to an aimed engine output power calculated by the constant speed running aimed output calculating section 65. The constant speed running output controlling section 67 controls the engine output adjusting means 7 in accordance with a control amount calculated by the constant speed running control amount calculating section 66.

The constant speed running controlling means 8 further includes a braking controlling section 69 for controlling, in response to a brake pedal treadling detection signal received, the engine output adjusting means 7 in priority to the output controlling section 71 such that the engine 13 may be put into a substantially minimum output operating condition.

The braking controlling section 69 includes a sudden brake detecting section 70 and an output drop controlling section 72. The braking detecting section 70 develops a sudden braking detection signal when it detects at least one of three conditions that the deceleration of the vehicle is higher than a reference value while a brake pedal treadling detection signal is being received, that the duration of a brake treadling detection signal is longer than a second reference time and that the running speed of the vehicle detected by the running speed detecting means 5 when a brake pedal release detection signal is received is lower than a reference value. Meanwhile, the output drop controlling section 72 controls, when a sudden braking detection signal, an accelerator pedal release detection signal and a brake pedal release detection signal are received simultaneously, the engine output adjusting means 8 in priority to the controlling section 71 to put the engine 13 into a substantially minimum output operating condition. It is to be noted that the sudden brake detecting section 70 develops a sudden braking detection signal also when it detects at least one of three conditions that the duration of a condition wherein the deceleration of the vehicle is greater than a reference value is longer than a first reference time, that the duration of a brake treadling detecting signal is longer than a second reference time and that the running speed of the vehicle detected by the running speed detecting section 5 when a brake pedal release detection signal is received is lower than a reference value.

The vehicle engine controlling system 1 shown in FIG. 1(i) further includes an acceleration/deceleration instructing means 61 for providing an instruction of acceleration or deceleration of the vehicle. The acceleration/deceleration instructing means 61 includes, as shown in FIG. 1(ii), an accelerator pedal 27 of the vehicle, an operation amount detecting section 61a (corresponding to treadled amount detection section 14 shown in FIG. 2) for detecting an operation amount of the accelerator pedal 27 to develop an operation amount detection signal, an output controlling section 71 for controlling the engine output adjusting means 7 in response to an operation amount detection signal, and a brake pedal 28 of the vehicle.

The output controlling section 71 is composed of an operation amount corresponding aimed acceleration setting section 71a responsive to an operation amount detection signal for setting an aimed acceleration in accordance with an operation amount (i.e., treadled amount) of the accelerator pedal 27 and a changing rate of the operation amount, an operation amount corresponding aimed output calculating section 71b for calculating an aimed engine output powder corresponding to an aimed acceleration set by the operation amount corresponding aimed acceleration setting section 71a, an operation amount corresponding control amount calculating section 71c for calculating a control amount of the engine output adjusting means 7 corresponding to an aimed engine output power calculated by the operation amount corresponding aimed output calculating section 71b, and an operation amount corresponding controlling section 71d for controlling the engine output adjusting means 7 in accordance with a control amount calculated by the operation amount corresponding control amount calculating section 71c.

The vehicle engine controlling system 1 further includes an accelerated/decelerated condition detecting means 62 for detecting an inoperative condition of the acceleration/deceleration instructing means 61 to develop a non-operation detecting signal. The accelerated/decelerated condition detecting means 62 is composed, as shown in FIG. 1(ii), of an accelerator pedal release detecting means 62a (corresponding to accelerate switch 15) for detecting canceling of treadling of the accelerator pedal 27 to develop an accelerator pedal release detection signal, a brake pedal operated condition detecting section 62b for developing a brake pedal treadling detection signal when the brake pedal 28 is in a treadled condition and for developing a brake pedal release detection signal when treadling of the brake pedal 28 is canceled, and a signal outputting section 62c (corresponding to brake switch 16) for outputting a non-operation detection signal when an accelerator pedal release detection signal and a brake pedal release detection signal are received simultaneously.

The vehicle engine controlling system 1 further includes a constant speed running designating means 63 for outputting a constant speed running designating signal when the brake pedal 28 is not in an operated condition (when a non-operation detection signal is received). Part of a running condition designating section 3 shown in FIG. 2 functions as the constant speed running designating section 63.

The vehicle engine controlling system 1 further includes an aimed speed setting section 75 for setting, in response to a constant speed running designating signal received, an aimed speed at which the vehicle should make constant speed running. The aimed speed setting means 75 sets, as an aimed speed, a running speed of the vehicle detected by the running speed detecting means 5 when a constant speed running designating signal is received.

Subsequently, the vehicle engine controlling system of the present embodiment will be described more in detail with reference to a block diagram of FIG. 2 which schematically shows general construction of the vehicle engine controlling system.

The vehicle engine controlling system 1 shown includes the treadled amount detecting section 14, the accelerator switch 15, a brake switch 16, a shift selector switch 17, the automatic cruise switch 18, a car weight detecting section 19, an intake air amount detecting section 20, an engine rotational speed detecting section 21, an output shaft rotational speed detecting section 22, a gear position detecting section 23, the speed/acceleration detecting section 24, the control section 25 for developing a control signal in accordance with input signals received from the detecting sections 19 to 24 and the switches 14 to 18, and a throttle valve pivoting section 26 for actuating a throttle valve 31 in response to a control signal received from the control section 25.

The individual components will be described below.

Figure 3:
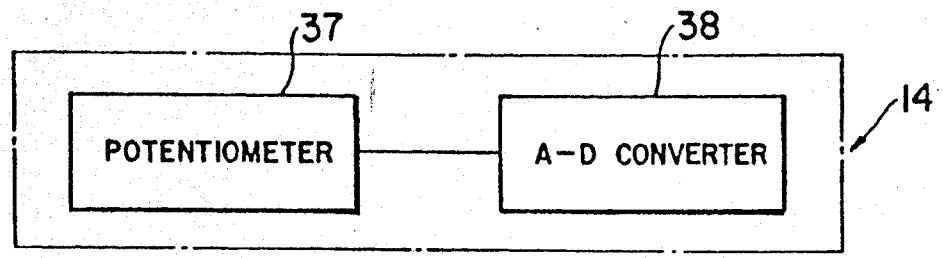
FIG. 3 is a block diagram schematically showing general construction of a treadled amount detecting section of the vehicle engine controlling system of FIG. 2.

The treadled amount detecting section 14 is provided for detecting a treadled amount (i.e., operation amount) of the accelerator pedal 27 in order to artificially adjust the output power of the engine. The treadled amount detecting section 14 includes, as shown in FIG. 3, a potentiometer 37 responsive to the accelerator pedal 27 for developing a voltage which increases in proportion to a treadled amount of the accelerator pedal 27, and an analog to digital (A-D) converter 38 for converting a value of an output voltage of the potentiometer 37 into an accelerator pedal treadled amount APS of a digital value.

The accelerator switch 15 is turned on or off in response to the accelerator pedal 27. In particular, when the accelerator pedal 27 is not treadled, the accelerator switch 15 is on, but when the accelerator pedal 27 is treadled, the accelerator switch 15 is off.

The brake switch 16 is turned on or off in response to a brake pedal 28 which is provided for artificially operating a brake (not shown) for braking the vehicle. When the brake pedal 28 is treadled, the brake switch 16 is on, and when the brake pedal 28 is not treadled, the brake switch 16 is off.

The shift selector switch 17 develops a digital signal indicative of an operating condition of an automatic transmission 32 which is artificially designated by a shift selector 29. Such operating condition of the automatic transmission 32 is one of an N range for a neutral condition, a P range for parking, a D range for driving in automatic gear change, an L range when the automatic transmission 32 is held at its low gear position, and an R range for rearward movement.

Figure 6:
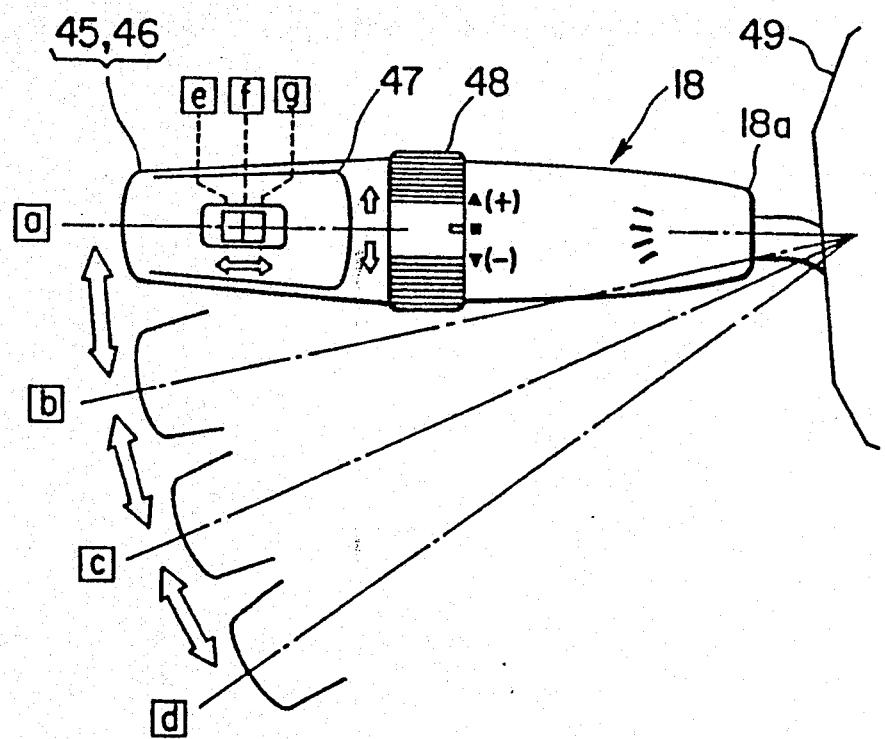
FIG. 6 is a front elevational view of an automatic cruise switch of the vehicle engine controlling system of FIG. 2.

The automatic cruise switch 18 is provided for artificially designating a running condition of the vehicle. Referring to FIG. 6, the automatic cruise switch 18 includes a main lever 18a provided projectingly on a side of a steering column 49 and having functions as an acceleration switch 45 and a changing over switch 46, a throttle switch 47 mounted for sliding leftward and rightward movement in FIG. 6 on the main lever 18a, and an aimed speed changing switch 48 mounted for turning movement around the main lever 18a. The automatic cruise switch 18 will be hereinafter described in detail.

Referring back to FIG. 2, the car weight detecting section 19 is provided for detecting a weight of the vehicle in accordance with a change in relative position between a wheel and a car body, that is, a change in height of the vehicle to develop a detection value as a digital value.

The intake air amount detecting section 20 is provided for detecting an amount of air sucked into the engine 13 through an intake air path 30 to develop a detection value as a digital value.

The engine rotational speed detecting section 21 is provided on a camshaft (not shown) of the engine 13 for detecting a rotational speed of the engine 13 to develop a detection value as a digital value.

The output shaft rotational speed detecting section 22 is provided on an output shaft (not shown) of a torque converter (not shown) of the automatic transmission 32 to develop a detection value as a digital value. It is to be noted that reference numerals 33 and 34 in FIG. 2 denote a left front wheel and a right front wheel, respectively, which are driven by the engine 13 by way of the automatic transmission 32.

The gear position detecting section 23 is provided for detecting a current gear position of the automatic transmission 32 in response to a speed changing instruction signal developed from a gear shifting instructing section (not shown) provided in the automatic transmission 32 to develop a detection value as a digital value.

Figure 5:
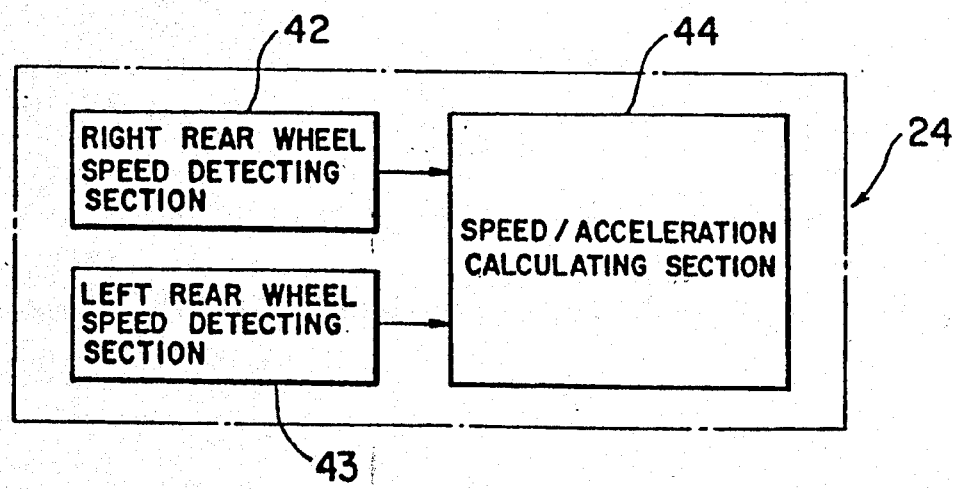
FIG. 5 is a block diagram schematically showing general construction of a speed/acceleration detecting section of the vehicle engine controlling system of FIG. 2.

The speed/acceleration detecting section 24 is provided for detecting an actual running speed of the vehicle and an actual acceleration of the vehicle to develop detection values as digital values. Referring to FIG. 5, the speed/acceleration detecting section 24 includes a right rear wheel speed detecting section 42 for detecting a speed of the right rear wheel 36 to develop a detection value as a digital value, a left rear wheel speed detecting section 43 for detecting a speed of the left rear wheel 35 to develop a detection value as a digital value, and a speed/acceleration calculating section 44 for calculating an actual speed and an actual acceleration of the vehicle in accordance with digital values received from the right rear wheel speed detecting section 42 and the left rear wheel speed detecting section 43.

Referring back to FIG. 2, the control section 25 includes, in addition to the controlling sections 74, 67 and 73 as well as the output controlling section 71, aimed speed setting means 75 and so forth (none is shown in FIG. 2) of the constant speed running controlling means (constant speed running controlling section) 8, a running condition designating section 3, a final aimed speed setting section 6, a final aimed speed modification controlling section 6a, an acceleration controlling section 9, a deceleration controlling section 10, a final condition detecting section 11, and a running condition changing over section (running condition change-over controlling section) 12. In the control section 25, an appropriate opening of the throttle valve 31 is set by an appropriate one of the controlling sections in accordance with a designation by the running condition designating section 3. In short, if constant speed running is designated by the running condition designating section 3, then a throttle opening necessitated for required constant speed running is set by the constant speed controlling section 8. To the contrary, if accelerated running is designated, then a throttle opening necessitated for required accelerated running is set by the acceleration controlling section 9, but on the contrary if decelerated running is designated, then a throttle opening necessitated for required decelerated running is set by the deceleration controlling section 10. The magnitude of a throttle opening set in this manner is delivered as a digital signal to the throttle valve pivoting section 26.

It is to be noted that the running condition designating section 3 designates one of a constant speed running condition, an accelerated running condition and a decelerated running condition when the automatic cruise switch 18 as the manually operable means is manually operated while the transmission (automatic transmission) 32 is in a condition wherein it can transmit an output power of the engine 13 to the driving wheels 33 and 34 and the accelerator pedal 27 and the brake pedal 28 are both in their released condition. In short, when the automatic cruise switch 18 meet requirements for the vehicle to make constant speed running, a constant speed running condition is designated by the running condition designating section 3; when the automatic cruise switch 18 meet requirements for the vehicle to make accelerated running, an accelerated running condition is designated; and when the automatic cruise switch 18 meet requirements for the vehicle to make decelerated running, a decelerated running condition is designated.

The aimed acceleration setting section 4 sets an aimed value of an acceleration for accelerated running when accelerated running is designated by the running condition designating section 3 but sets an aimed value of a deceleration for decelerated running when decelerated running is designated. The aimed acceleration setting section 4 has a function of the operation amount corresponding aimed acceleration setting section 71a and another function of the constant speed running aimed acceleration setting section 64. Setting by the aimed acceleration setting section 4 is effect such that the aimed acceleration may be modified in response to a change in speed of the vehicle.

The final aimed speed setting section 6 sets, when the designation by the running condition designating section 3 is changed over to accelerated running, a running speed at which the vehicle is to run after acceleration. To the contrary, when the designation is changed over to decelerated running, the final aimed speed setting section 6 sets a running speed at which the vehicle is to run after deceleration.

The constant speed controlling section 8 sets, when the designation by the running condition designating section 3 is constant speed running, a control amount of the engine output adjusting means 7 to adjust the output power of the engine 13 so that the vehicle may maintain constant speed running at a predetermined constant speed.

The acceleration controlling section 9 sets, when the designation by the running condition designating section 3 is accelerated running, a control amount of the engine output adjusting means 7 to adjust the output power of the engine 13 so that the vehicle may maintain accelerated running at an acceleration which is set by the aimed acceleration setting section 4.

The deceleration controlling section 10 sets, when the designation by the running condition designating section 3 is decelerated running, a control amount of the engine output adjusting means 7 to adjust the output power of the engine 13 so that the vehicle may maintain decelerated running at a deceleration which is set by the aimed acceleration setting section 4.

The final condition detecting means 11 detects, when the designation by the running condition designating section 3 is either accelerated running or decelerated running, that the running speed of the vehicle detected by the speed detecting section 5 reaches a final aimed speed.

The running condition changing over section 12 changes over designation of a running condition by the running condition setting section 3 when it is detected by the final condition detecting section 11 that a final aimed speed is reached.

Figure 4:
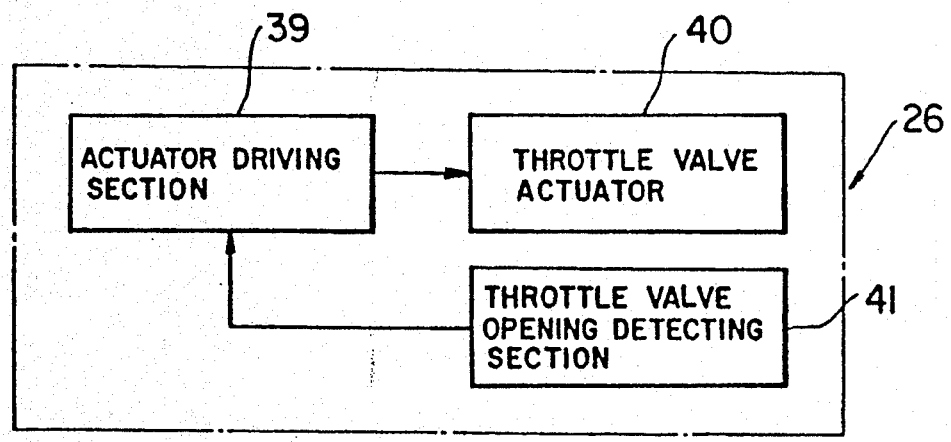
FIG. 4 is a block diagram schematically showing general construction of a throttle valve pivoting section of the vehicle engine controlling system of FIG. 2.

The throttle valve pivoting section 26 pivots the throttle valve 31 so that the throttle valve 31 may assume a throttle opening set by the control section 25. Referring to FIG. 4, the throttle valve pivoting section 26 includes an actuator driving section 39 responsive to a signal from the control section 25 for developing a driving signal for pivoting the throttle valve 31 to a set opening, a throttle valve actuator 40 for pivoting the throttle valve 31 in response to a signal from the actuator driving section 39, and a throttle valve opening detecting section 41 for detecting an opening of the throttle valve 31 pivoted by the throttle valve actuator 40 and for feeding the detection value of the opening as a digital value to the actuator driving section 39. It is to be noted that the throttle valve actuator 40 may be an electric motor such as a stepper motor.

The throttle valve 31 is mounted for pivotal motion in the intake air path 30. The throttle valve 31 is thus adjusted to a suitable angular position to open or close the intake air path 30 (adjust the opening) to adjust the intake air amount to the engine 13.

Here, the automatic cruise switch 18 will be described in detail with reference to FIG. 6.

The acceleration switch 45 is changed over by pivoting the main lever 18a around the steering column 49. Here, the acceleration switch 45 can be changed over between such four positions [a], [b], [c] and [d] as shown in FIG. 6 and presents an on-state at each of the four positions. When the acceleration switch 45 is at the position [a], the vehicle is controlled to run at a designated speed in a constant speed running condition, but when the acceleration switch 45 is at one of the other positions [b], [c] and [d], the vehicle is controlled to run at an individual aimed acceleration in an accelerated running condition. As the acceleration switch 45 is changed over to [b]→[c]→[d], the value of the aimed acceleration increases, and at the position [b], the vehicle is controlled to run at a comparatively low acceleration; at the position [c], the vehicle is controlled to run at a medium acceleration; and at the position [d], the vehicle is controlled to run at a comparatively high acceleration.

The changing over switch 46 serves as a running condition change-over operating means and is turned on by pulling the main lever 18a forwardly to change over a running condition of the vehicle in accordance with a position of the acceleration switch 45. If the hand is released from the main lever 18a after such changing over is made, the lever 18a is automatically returned to its initial position.

For example, when the acceleration switch 45 is at the position [a], the running condition of the vehicle is changed over between constant speed running and decelerated running by the changing over switch 46. In short, if the changing over switch 46 is operated when the acceleration switch 45 is at the position [a] and the vehicle is running at a constant speed, then the running condition of the vehicle is changed over from constant speed running to decelerated running. On the contrary, if the changing over switch 46 is operated when the acceleration switch 45 is at the position [a] and the vehicle is running in deceleration, the running condition is changed over from decelerated running to constant speed running.

To the contrary, when the acceleration switch 45 is at the position [b], [c] or [d], the running condition of the vehicle is changed over between accelerated running and constant speed running by the changing over switch 46. In short, if the changing over switch 46 is operated when the acceleration switch 45 is at the position [b], [c] or [d] and the vehicle is 10 running in acceleration, the running condition is changed over from accelerated running to constant speed running. To the contrary, if the changing over switch 46 is operated when the acceleration switch 45 is at the position [b], [c] or [d] and the vehicle is running at a constant speed, the running condition is changed over from constant speed running to accelerated running.

Further, the final aimed speed can be changed by the changing over switch 46. In particular, if the changing over switch 46 is turned and then kept on in order to change over the running condition of the vehicle from constant speed running to accelerated running, the final aimed speed is increased in proportion to the duration of the on-state of the changing over switch 46. To the contrary, if the changing over switch 40 is turned and then kept on in orde to change over the running condition from constant speed running to decelerated running, the final aimed speed is decreased in proportion to the duration of the on-state of the changing over switch 46.

The throttle switch 47 is provided for changing contents of control over the throttle valve 31 in accordance with a condition of the accelerator pedal 27 or the brake pedal 28. The throttle switch 47 is changed over between three positions [e], [f] and [g] and presents an on-state at each of the three positions.

When the throttle switch 47 is at the position [e], control is effected in such a relationship wherein the accelerator pedal 27 and the throttle valve 31 are mechanically coupled directly to each other. Thus, the throttle valve 31 is adjusted in proportion to movement of the accelerator pedal 27.

To the contrary, when the throttle switch 47 is at the position [f] or [g], the accelerator pedal 27 and the throttle valve 31 do not present a mechanically directly coupled condition and are controlled in the following manner.

In short, when the throttle switch 47 is at the position [f], if the brake pedal 28 is treadled to effect deceleration and then released, such control is effected till subsequent treadling of the accelerator pedal 27 that the throttle valve 31 may maintain a minimum opening thereof corresponding to an idling position of the engine 13.

When the throttle switch 47 is at the position 'g', if the brake pedal 28 is treadled to effect deceleration and then released, such control of opening of the throttle valve 31 is executed until either the accelerator pedal 27 is treadled subsequently or the acceleration switch 45 or the changing over switch 46 is manually operated to designate accelerated running or decelerated running that the speed of the vehicle upon releasing of the brake pedal 28 may be maintained to make constant speed running of the vehicle except when the vehicle during running is to be stopped.

The aimed speed changing over switch 48 is provided for modifying a set value of an aimed speed for constant speed running of the vehicle. The aimed speed changing over switch 48 is turned on when it is turned upwardly (in the direction indicated by the mark (+) in FIG. 6) or downwardly (in the direction indicated by the mark (−) in FIG. 6), and if the hand is released from the switch 48 after such changing over is completed, then the switch 48 is automatically returned to its initial position (a neutral position shown in FIG. 6) at which it presents an off-state. If the aimed speed changing over switch 48 is operated to an on-state on the (+) side, the final aimed speed is increased in proportion to the duration of the on-state. To the contrary, if the aimed speed changing over switch 48 is operated to an on-state on the (−) side, the final aimed speed is decreased in proportion to the duration of the on-state. Thus, if the aimed speed changing over switch 48 is turned to increase or decrease the final aimed speed and then the hand is released from the switch 48, the final aimed speed is set to a value at a point of time when the hand is released.

Figure 7:
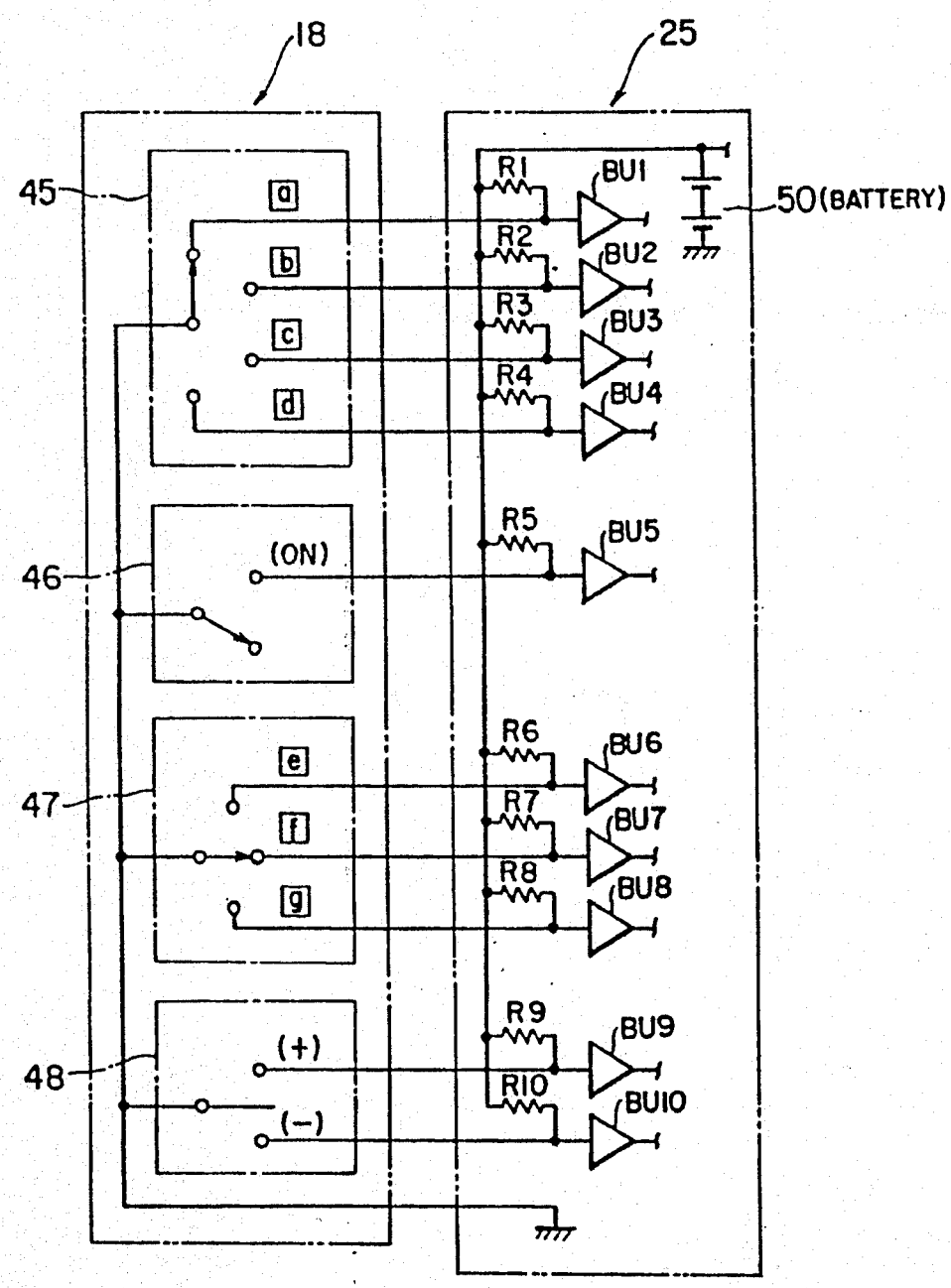
FIG. 7 is a circuit diagram showing an electric circuit which connects the automatic cruise switch of FIG. 6 to a control section of the vehicle engine controlling system of FIG. 2.

It is to be noted that an electric circuit of a connecting portion between the automatic cruise switch 18 and the control section 25 has such a construction as shown in FIG. 7.

Referring to FIG. 7, the control section 25 includes a plurality of buffers BU1 to BU10 at which it receives signals, and a plurality of pull-up resistors R1 to R10 provided on the input sides of the buffers BU1 to BU10, respectively. The pull-up resistors R1 to R10 are connected in parallel to each other to a power source 50 for the buffers BU1 to BU10.

Different contacts of the acceleration switch 45, changing over switch 46, throttle switch 47 and aimed speed changing switch 48 which constitute the automatic cruise switch 18 are individually connected to input terminals of the buffers BU1 to BU10.

It is to be noted that the marks [a] to [d] applied to the individual contacts of the acceleration switch 45 in FIG. 7 correspond to the positions [a] to [d] shown in FIG. 6, respectively, and the contact (ON) of the changing over switch 46 is a contact which makes when the main lever 18a is pulled forwardly to an on position. Meanwhile, the marks [e] to [g] applied to the individual contacts of the throttle switch 47 correspond to the positions [e] to [g] in FIG. 6, respectively, and the marks (+) and (−) applied to the individual contacts of the aimed speed changing switch 48 are contacts which make when the aimed speed changing switch 48 is manually operated to turn to the (+) side or the (−) side in FIG. 6, respectively.

At the input terminals of those ones of the buffers BU1 to BU10 which are connected to those contacts of the switches which are in an on-state, electric current flows from the power source 50 for the buffers BU1 to BU10 to the pull-up resistors R1 to R10 connected to the input terminals. Consequently, a low level digital signal is provided to each of those buffers connected to the contacts which are in an on-state. Meanwhile, a high level digital signal is provided to each of those buffers connected to the other contacts which are in an off-state.

Accordingly, when the contacts are, for example, in such a connecting condition as shown in FIG. 7, a low level digital signal is supplied to the input terminals of the buffers BU1 and BU7 of the control section 25 while a high level digital signal is supplied to the input termianls of the buffers BU2 to BU6 and BU8 to BU10.

Contents of control by the engine controlling device 1 will be described in detail below.

Figure 8I:
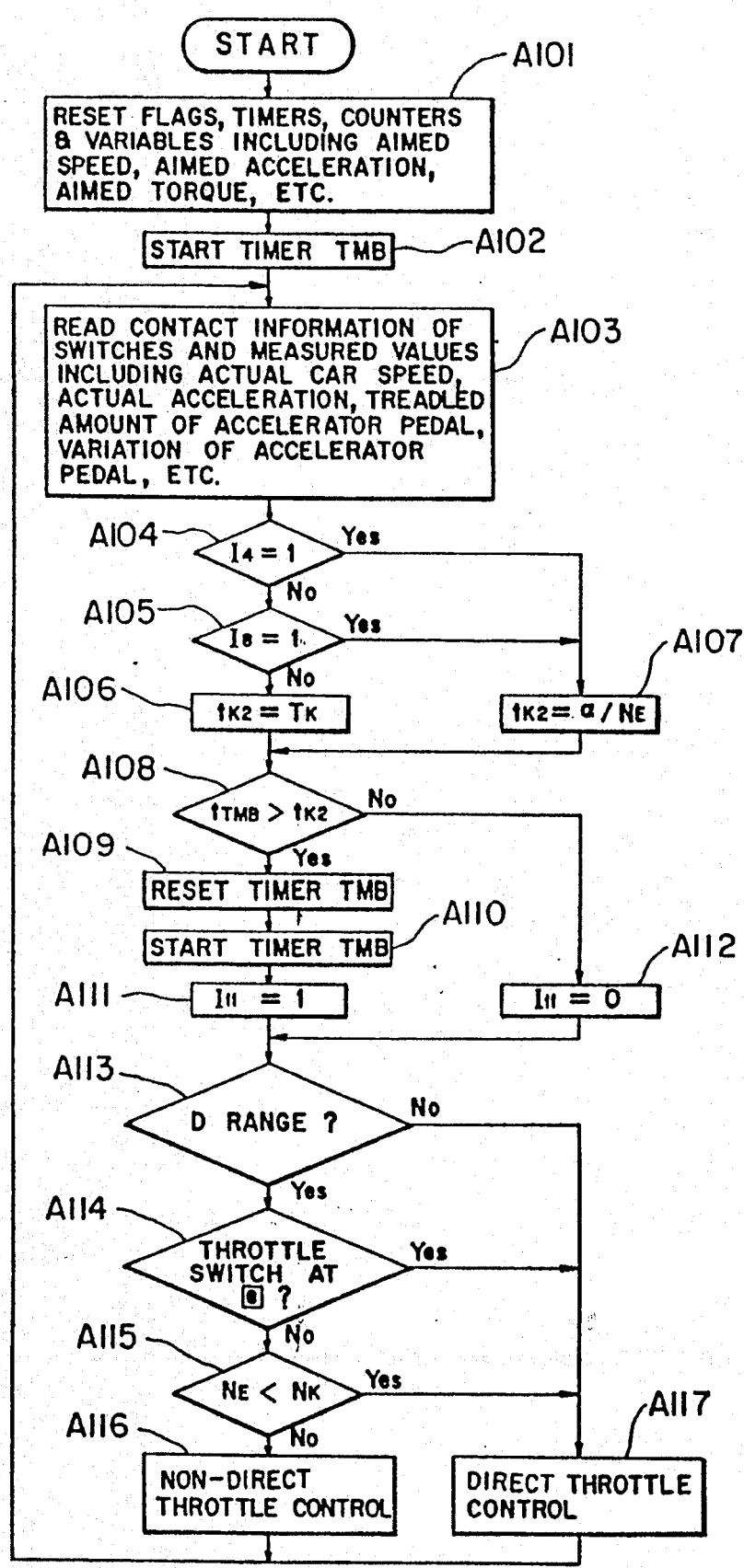
FIG. 8(*i*) is a flow chart of a main routine illustrating general operation of the vehicle engine controlling system of FIG. 2, FIGS. 8(*ii*) to 8(*iv*) are flow charts of interrupt routines illustrating operation of the vehicle engine controlling system of FIG. 2, and FIG. 8(*v*) is a flow chart showing contents of fail safe control for compensating for an error in actual acceleration calculated by third interrupt control illustrated in FIG. 8(*iv*)
Figure 8:
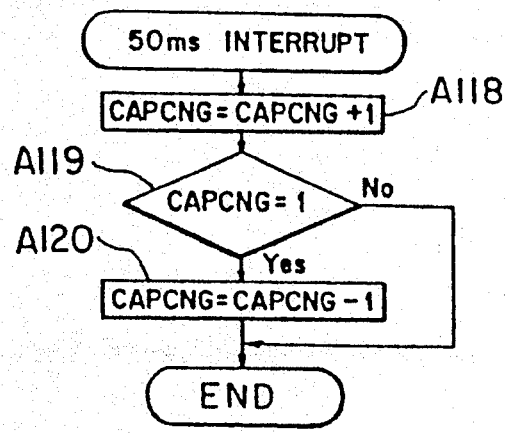
Figure 8:
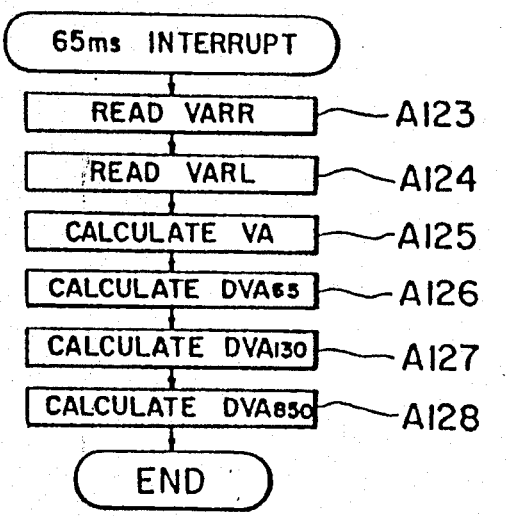

FIGS. 8(i) to 18 are flow charts illustrating contents of control by the engine controlling device. and FIG. 8(i) is a main flow chart illustrating contents of main operation of the present control. While the control is executed in accordance with the main flow chart, it is periodically interrupted by such interrupt controls as illustrated in FIGS. 8(ii) to 8(iv).

FIG. 8(ii) is a flow chart illustrating contents of interrupt control (hereinafter referred to as first interrupt control) which is executed preferentially by an interrupt for each 50 milliseconds while the main control shown in FIG. 8(i) is being executed and which is executed in response to a counter CAPCNG.

FIG. 8(iii) is a flow chart illustrating contents of interrupt control (hereinafter referred to as second interrupt control) which is executed preferentially by an interrupt for each 10 milliseconds similarly during execution of the main control shown in FIG. 8(i) in order to find out, in response to an accelerator pedal treadled amount APS detected by the treadled amount detecting section 11, a changing rate DAPS of the treadled amount APS.

FIG. 8(iv) is a flow chart illustrating contents of interrupt control (hereinafter referred to as third interrupt control) which is executed preferentially by an interrupt for each 65 milliseconds similarly during execution of the main control shown in FIG. 8(i) in order to find out an actual speed VA and an actual acceleration DVA of the vehicle in accordance with a right rear wheel speed VARR detected by the right rear wheel speed detecting section 42 of the speed/acceleration detecting section 24 and a left rear wheel speed VARL detected by the left rear wheel speed detecting section 43. The control is executed by the speed/acceleration calculating section 44.

Figure 8V:
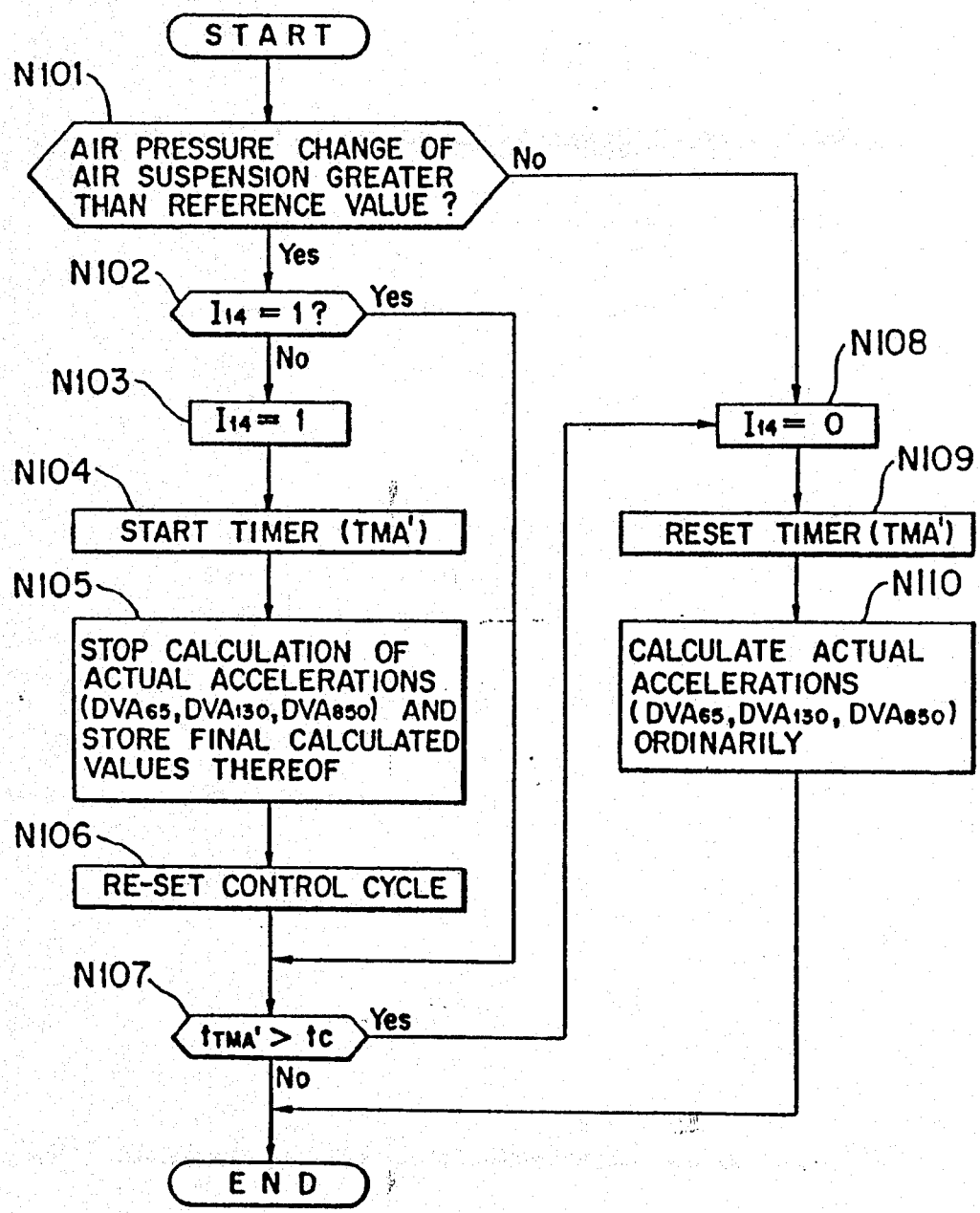

Meanwhile, FIG. 8(v) is a flow chart showing contents of fail safe control for compensating for an error in actual acceleration DVA found out by the third interrupt control shown in FIG. 8(iv). In short, while in the third interrupt control an actual acceleration DVA is calculated using a detection value obtained by the speed/acceleration detecting section 24, since a speed of the vehicle is detected from a speed of a wheel by the speed/acceleration detecting section 24, if a bump, a rebound or the like should take place at the wheel 35 or 36 due to an uneven condition of a road surface, then there is the possibility that a value which is instantaneously different from an actual speed VA may be detected as a car speed. The fail safe control is provided to prevent an actual acceleration DVA from being calculated from such an erred car speed value. Here in the present embodiment, the fail safe control is executed relying upon a detection value of a device (not shown) for detecting an air pressure of an air suspension which is provided as one of the car weight detecting section 19. A change in air pressure is thus employed as a scale of reliability of a measured value as an actual speed VA because, when an error takes places in a wheel speed due to a bump, a rebound or the like, the air pressure of the air suspension changes simultaneously.

While control of various contents is executed in the main control shown in FIG. 8(i), details of contents of the control are illustrated in FIGS. 9 to 18.

Figure 9:
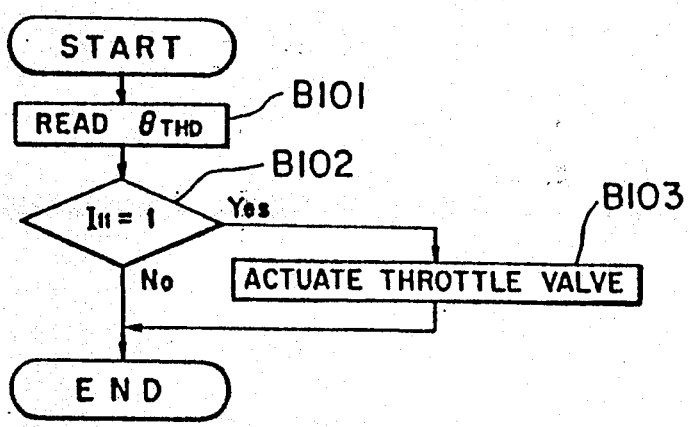
FIG. 9 is a flow chart illustrating details of operation of direct throttle movement control at step A117 of the main routine of FIG. 8(i)

FIG. 9 is a flow chart illustrating details of control of direct throttle movement executed at step A117 to FIG. 8(i). The direct throttle movement control is control of the engine 13 by control of the throttle valve 31 by way of the accelerator pedal 27 in such a relationshiip that the accelerator pedal 27 and the throttle valve 31 are mechanically coupled directly to each other.

Figure 10:
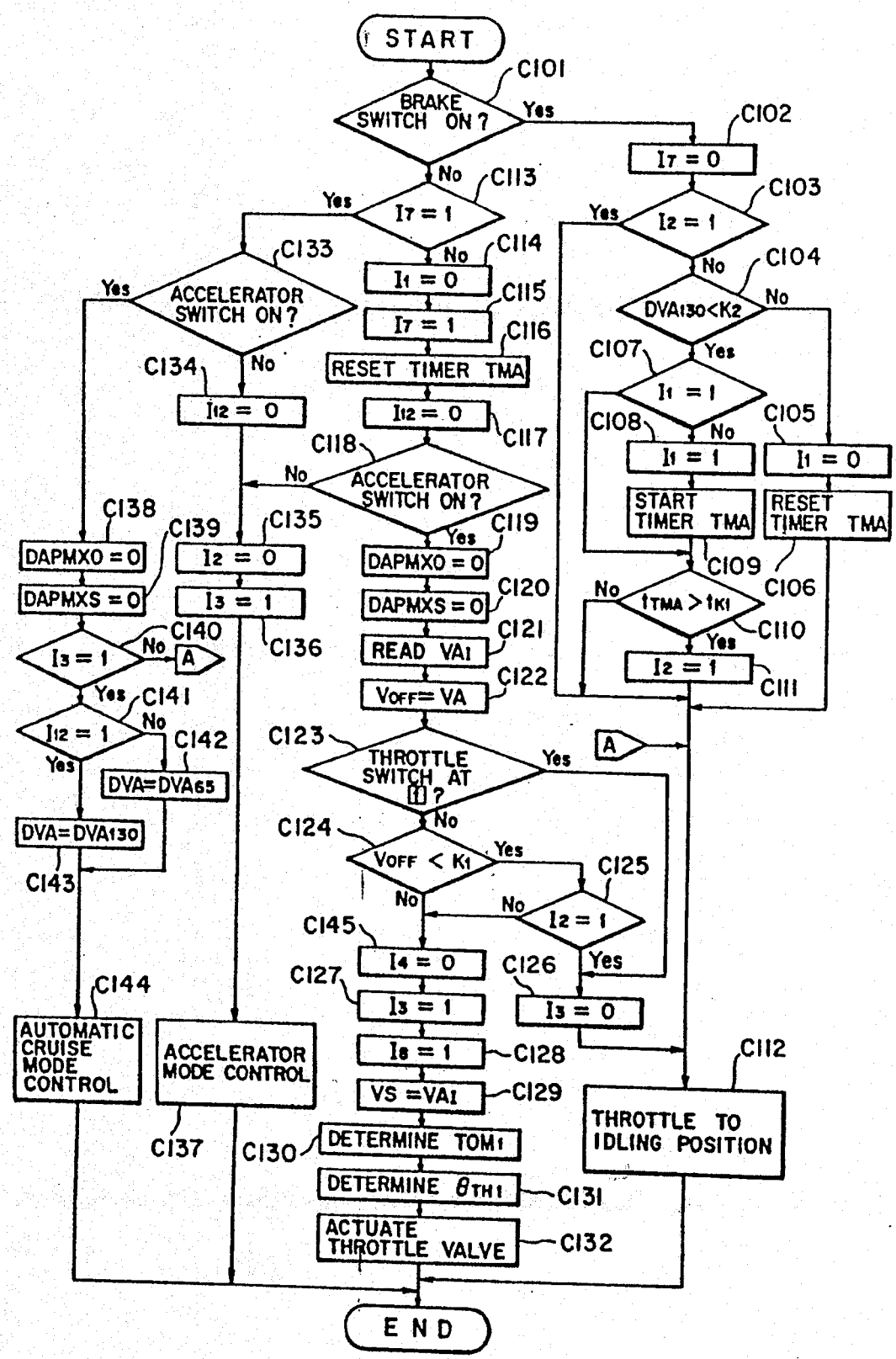
FIG. 10 is a flow chart illustrating details of operation in non-direct throttle movement control at step A116 of the main routine of FIG. 8(i)

FIG. 10 is a flow chart illustrating details of control of non-direct throttle movement executed at step A116 of FIG. 8(i). The non-direct throttle movement control is control of the engine 13 by control of the throttle valve 31 in such a manner that the accelerator pedal 27 and the throttle valve 31 do not always have a mechanically directly coupled relationship.

Figure 11:
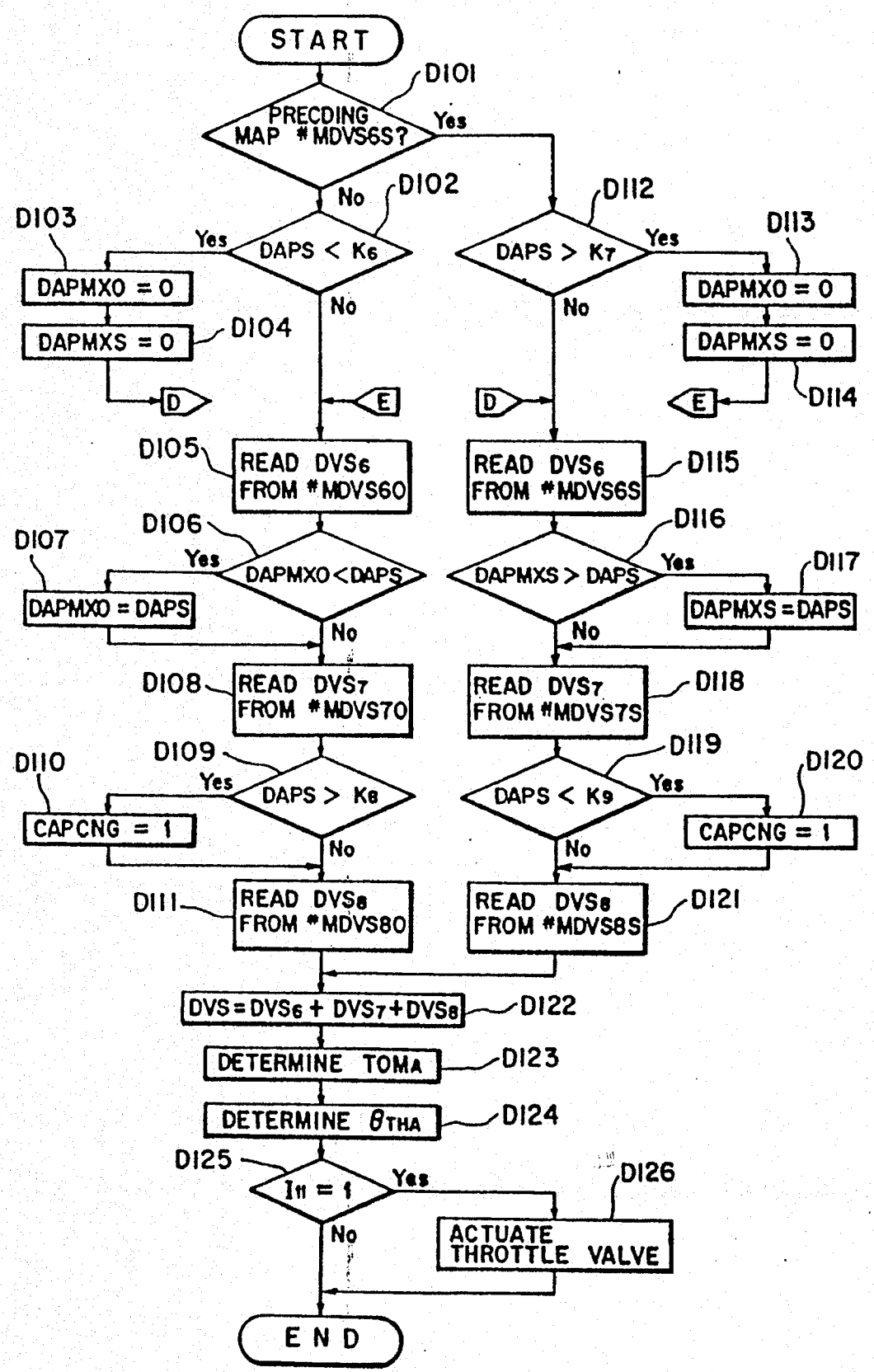
FIG. 11 is a flow chart illustrating details of operation of acceleration mode control at step C137 of the flow of FIG. 10.

FIG. 11 is a flow chart illustrating details of accelerator mode control executed at step C137 of FIG. 10. The accelerator mode control is control of the engine 13 by determining an aimed acceleration of the vehicle in accordance with an accelerator pedal treadled amount APS detected by the treadled amount detecting section 14, an accelerator pedal treadled amount changing rate DAPS calculated by the controlling section 22 in accordance with the treadled amount APS and a value of the counter CAPCNG and by pivoting the throttle valve 31 so as to obtain an output power of the engine 13 with which the aimed acceleration will be attained.

Figure 12:
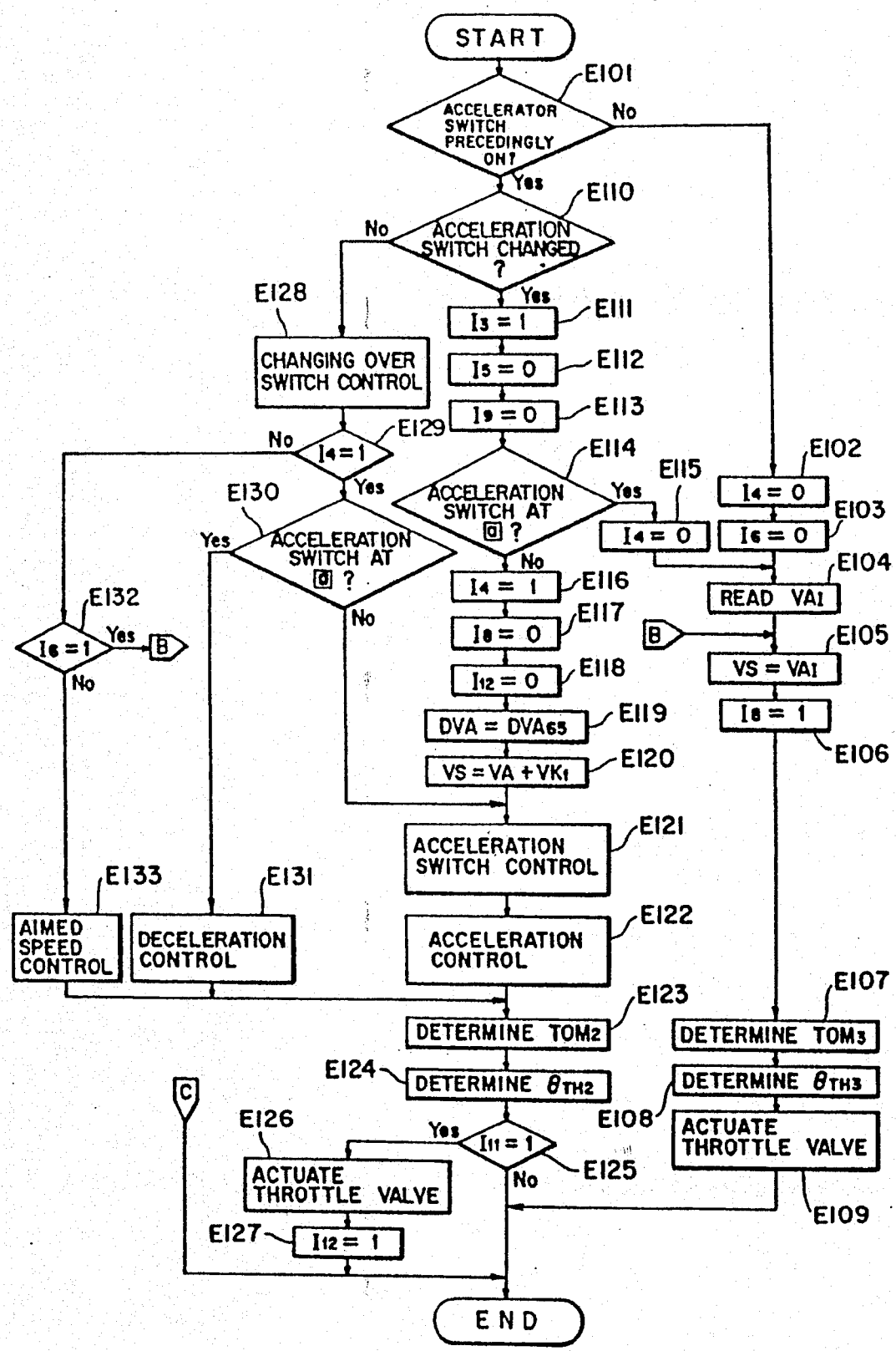
FIG. 12 is a flow chart illustrating details of operation of automatic cruise mode control at step C144 of the flow of FIG. 10.

FIG. 12 is a flow chart illustrating details of automatic cruise mode control executed at step C144 of FIG. 10. The automatic cruise mode control is control of the engine 13 to place the vehicle into an accelerated running condition, a decelerated running condition or a constant speed running condition by setting an opening of the throttle valve 31 by the acceleration controlling section 9, the deceleration controlling section 10 or the constant speed controlling section 8 of the control section 25 in accordance with information from the detecting sections 14 and 19 to 24 and the switches 15 to 18 of FIG. 2 when the accelerator pedal 27 and the brake pedal 28 are not in a treadled condition and by pivoting the throttle valve 31 by the throttle valve pivoting section 26.

Figure 13:
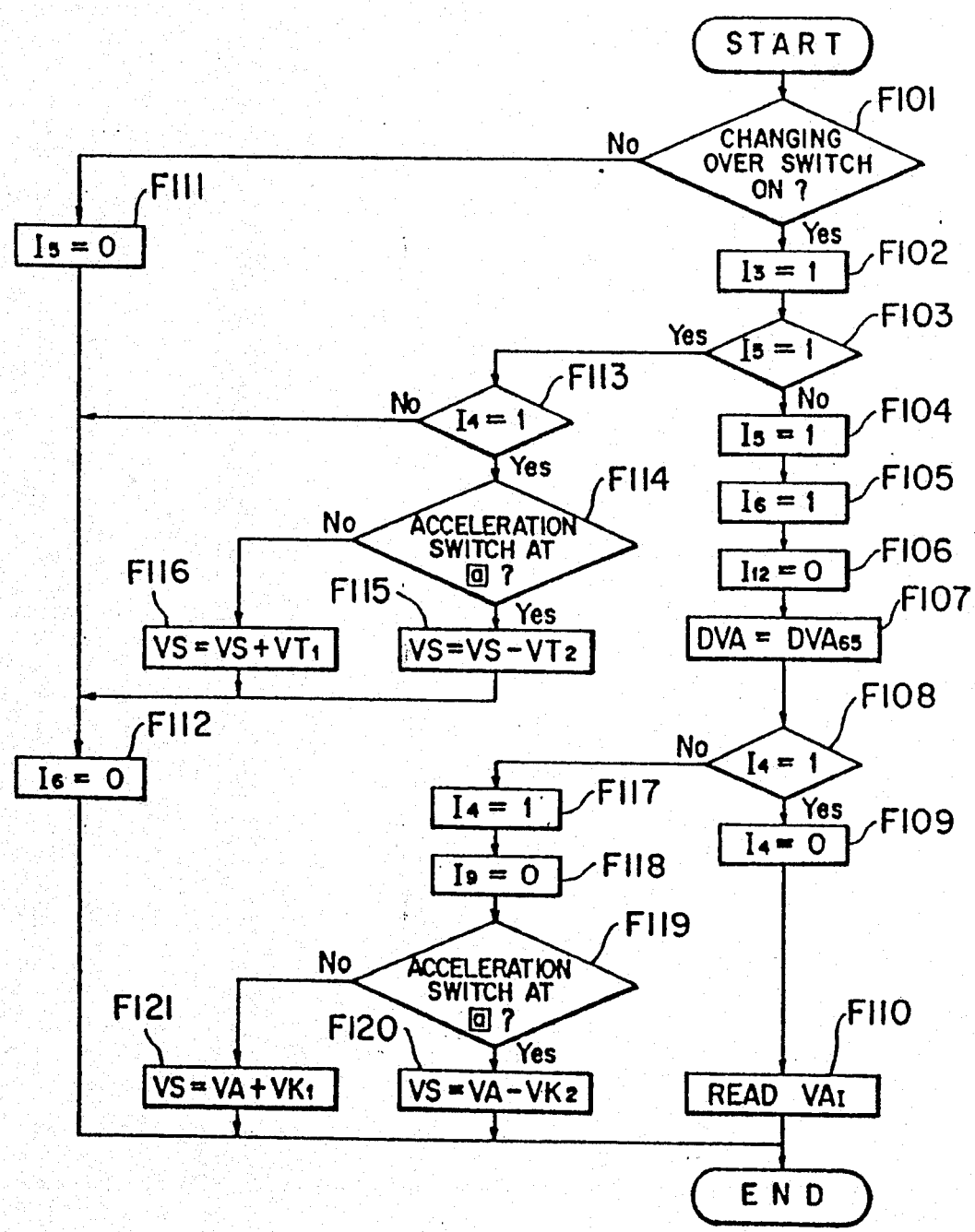
FIG. 13 is a flow chart illustrating details of operation of changing over switch control at step E128 of the flow of FIG. 12.

FIG. 13 is a flow chart illustrating details of changing over switch control executed at step E128 of FIG. 12. The changing over switch control is executed in relation to designation of a running condition of the vehicle by the running condition designating section 3 of the control section 25, to changing over by the changing over switch 46 and the running condition changing over section 12 of the control section 25, to setting of a final aimed speed by the final aimed speed setting section 6 of the control section 25 and also to modification of the final aimed speed by the final aimed speed modification controlling section 6a of the control section 25.

Figure 14:
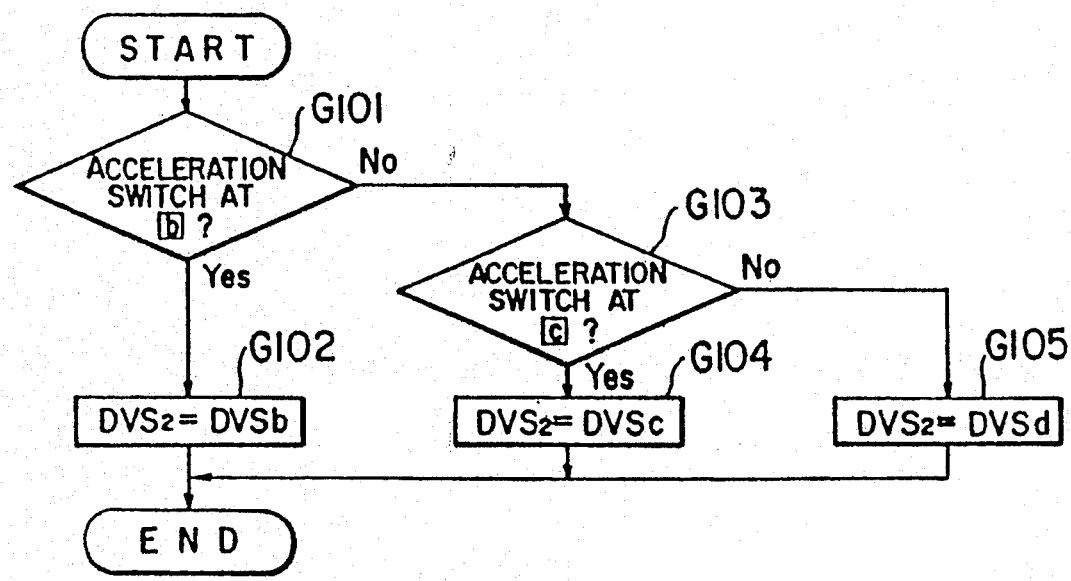
FIG. 14 is a flow chart illustrating details of operation of acceleration switch control at step E121 of the flow of FIG. 12.

FIG. 14 is a flow chart illustrating details of acceleration switch control executed at step E121 of FIG. 12. The acceleration switch control is control of setting of an aimed acceleration $DVS_2$ which is executed, when the acceleration switch 45 is changed over to one of the positions [b] to [d] in FIG. 6, in accordance with the thus changed over position of the acceleration switch 45 by the aimed acceleration setting section 4 of the control section 25. The aimed acceleration $DVS_2$ is an aimed value of an acceleration which becomes fixed after the vehicle starts acceleration as a result of operation of the acceleration switch 45 or the changing over switch 46 to change over the designation of the running condition designating section 3 of the controlling section to accelerated running.

Figure 15:
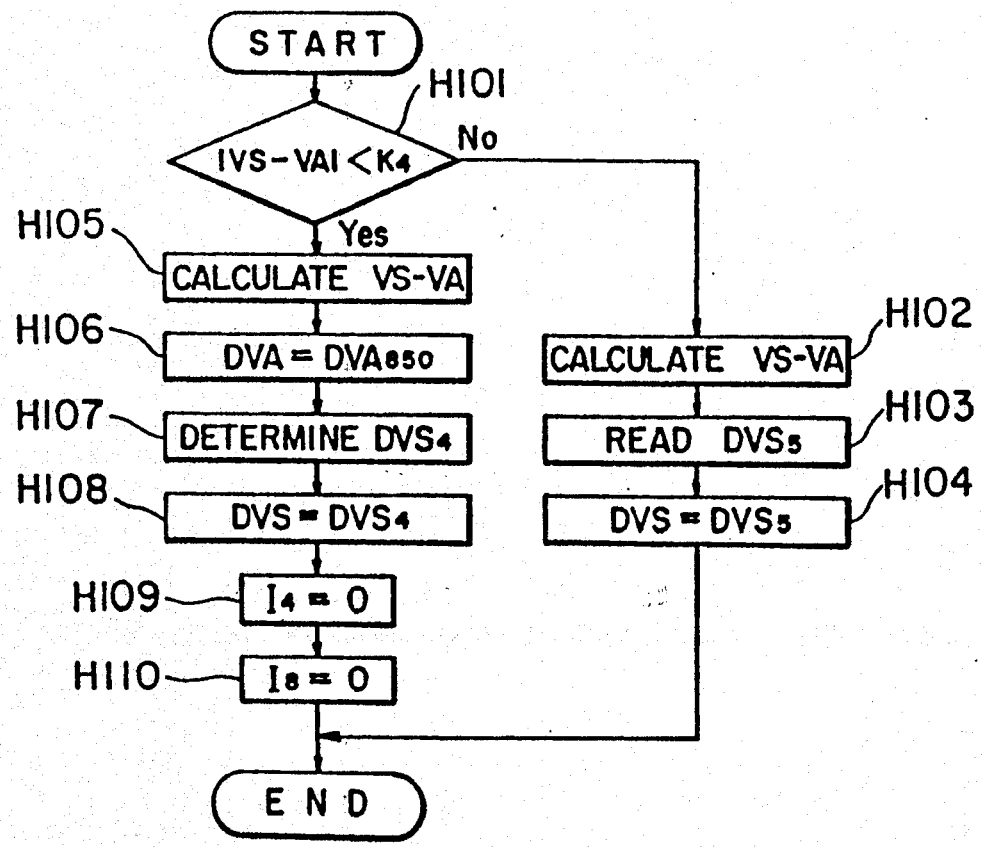
FIG. 15 is a flow chart illustrating details of operation of deceleration control at step E131 of the flow of FIG. 12.

FIG. 15 is a flow chart illustrating details of deceleration control executed at step E131 of FIG. 12. The deceleration control is such control that, when the designation of the running condition designating section 3 of the control section 25 is changed over to decelerated running by operation of the acceleration switch 45 or the changing over switch 46, decelerated running may be effected at a deceleration which can be realized and is nearest to a negative aimed acceleration (that is, an aimed deceleration) set by the aimeda acceleration setting section 4 of the control section 25. The deceleration control is executed mainly by the deceleration controlling section 10 and the aimed acceleration setting section 4 of the control section 25.

Figure 16:
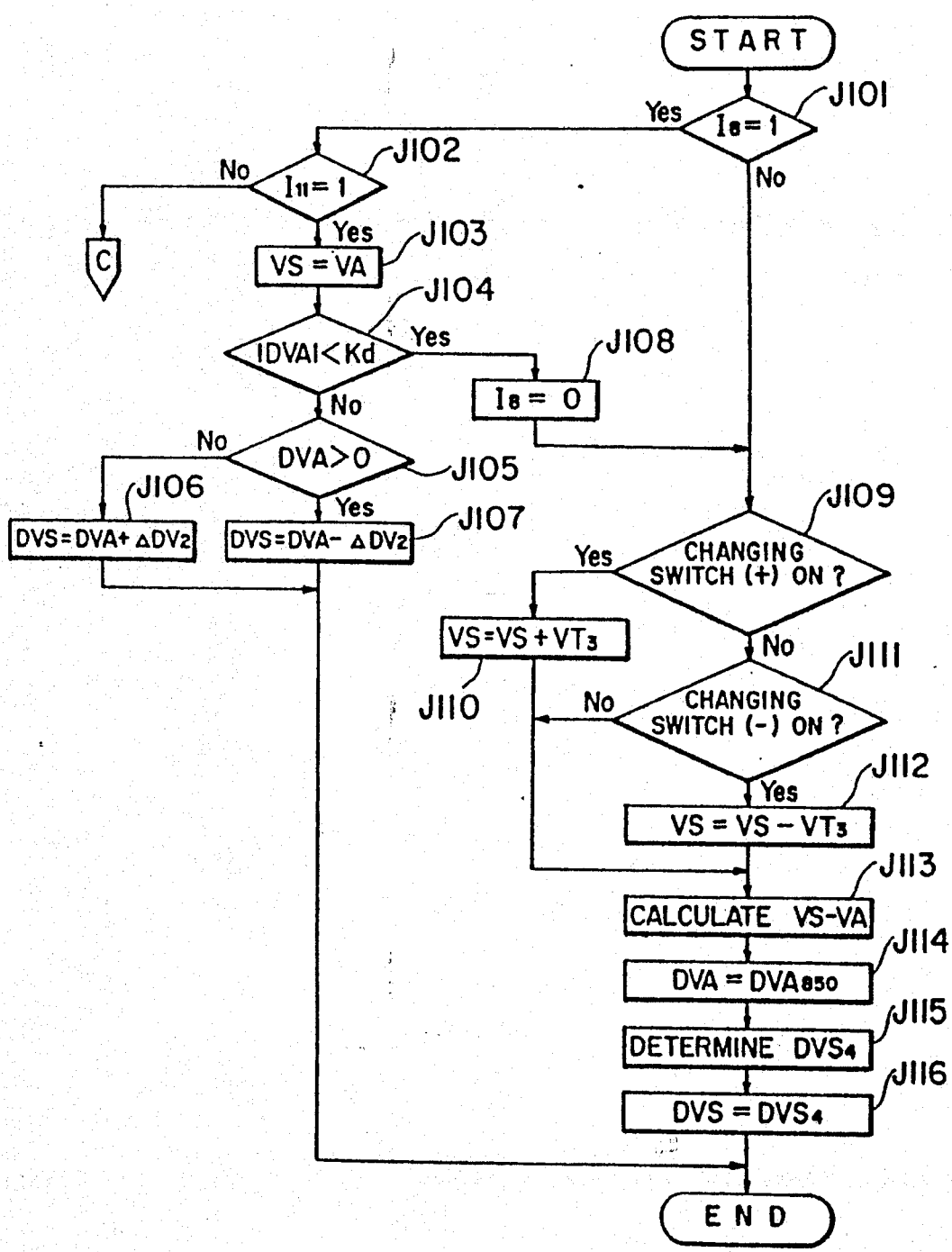
FIG. 16 is a flow chart illustrating details of operation of aimed speed control at step E133 of the flow of FIG. 12.

FIG. 16 is a flow chart illustrating details of aimed speed control executed at step E133 of FIG. 12. The aimed speed control is executed in order to attain, when the designation by the running condition designating section 3 of the control section 25 is changed over to constant speed running by operation of the acceleration switch 45 or the changing over switch 46 or the like, constant speed running wherein the running speed of the vehicle is maintained at an equal value to the running speed at a point of time when the designation is changed over to constant speed running and in order to modify the aimed value of a running speed for aimed constant speed running by means of the aimed speed changing switch 48. The aimed speed control is executed mainly by the constant speed controlling section 8 of the control section 25.

Figure 17:
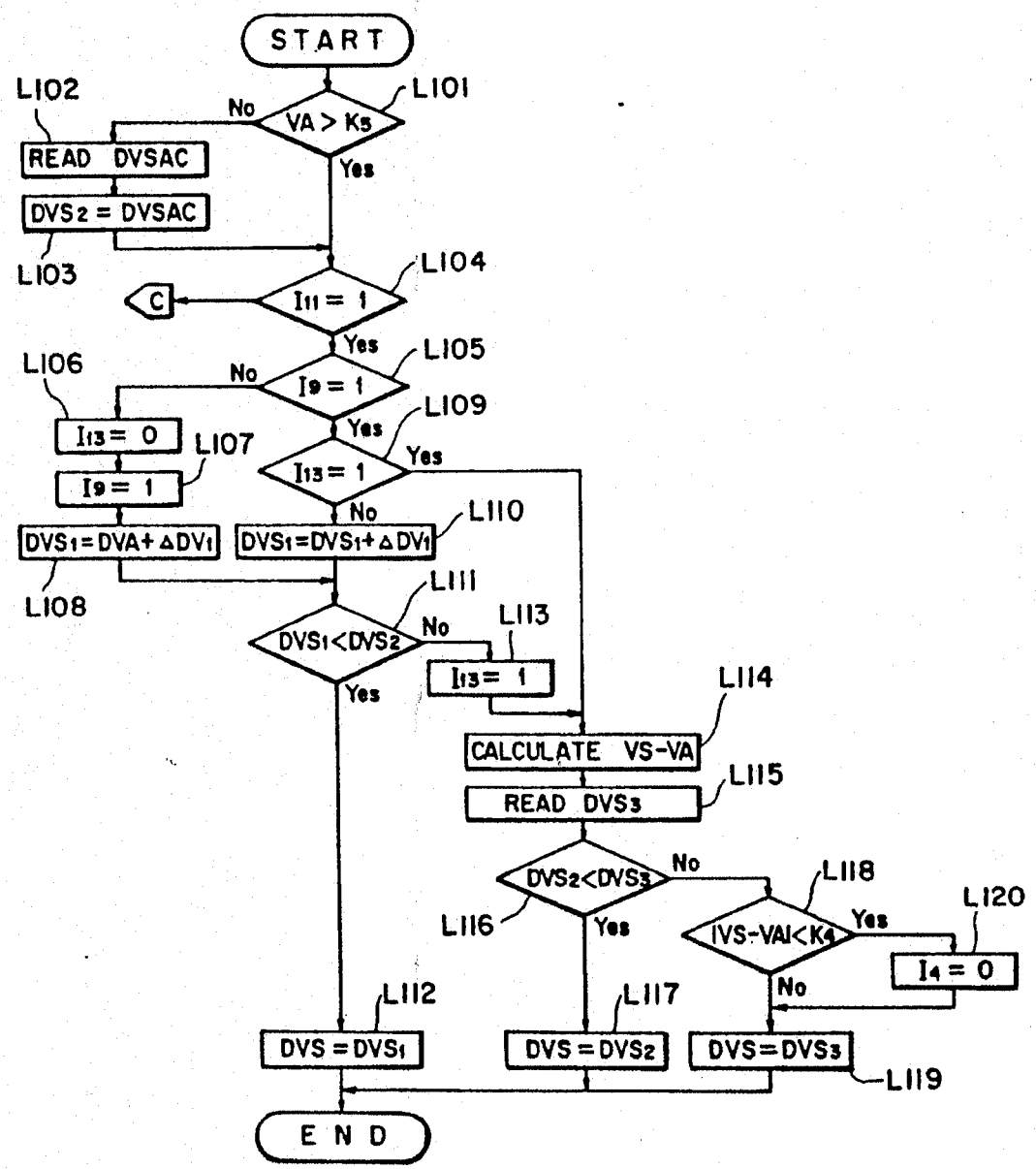
FIG. 17 is a flow chart illustrating details of operation of acceleration control at step E122 of the flow of FIG. 12.

FIG. 17 is a flow chart illustrating details of acceleration control executed at step E122 of FIG. 12. The acceleration control is control which is executed in order to make a change (increase or decrease) in acceleration smooth. For example, when the designation by the running condition designating section 3 of the control section 25 is changed over to accelerated running by operation of the the acceleration switch 25 or the changing over switch 46, an increase or decrease in acceleration of the vehicle to an aimed acceleration set by the aimed acceleration setting section 6 of the control section 25 in accordance with the position of the acceleration switch 45 is made smooth, or a change in acceleration when the running speed of the vehicle reaches, as a result of accelerated running, a final aimed speed set by the final aimed speed setting section 6 and the final aimed speed modification controlling section 6a of the control section 25 is made smooth.

Figure 18:
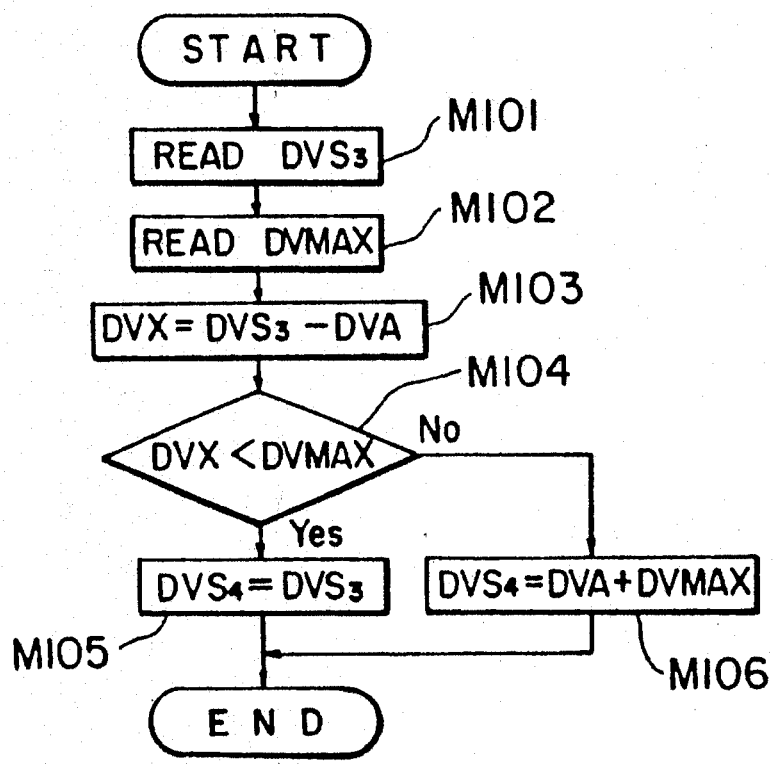
FIG. 18 is a flow chart illustrating details of operation of control of determination of an aimed acceleration $DVS_4$ at step J115 of the flow of FIG. 16.

FIG. 18 is a flow chart illustrating details of control of determination of an aimed acceleration $DVS_4$ executed at step J115 of FIG. 16. The aimed acceleration $DVS_4$ is an aimed value of an acceleration of the vehicle for maintaining the running speed of the vehicle at a value equal to an aimed speed when the designation by the running condition designating section 3 of the control section 25 is constant speed running.

FIGS. 19 to 26 are graphs illustrating relationships between parameters of maps used for control by the engine controlling system 1 and variables read out in accordance with the parameters.

FIGS. 27($i$) to 27($ii$) are graphs showing exemplary changes of an aimed acceleration and a running speed with respect to an interval of time elapsed after the acceleration switch 45 is changed over to change the designation by the running condition designating section 3 of the control section 25 to accelerated running.

Operation of the engine controlling system 1 having such a construction as described hereinabove will be described below with reference to FIGS. 1($i$) to 27($ii$).

At first, if an ignition switch (not shown) of the vehicle is turned on to start the engine 13, a crankshaft (not shown) of the engine 13 starts to be rotated by a starter motor (not shown), and an amount of fuel necessary for starting of the engine 13 determined by a fuel controlling device (not shown) is supplied into the engine 13 by a fuel injection device (not shown). Meanwhile, fuel is ignited by an ignition device (not shown) at a timing determined by an ignition timing controlling device (not shown). Consequently, the engine 13 start its operation by itself.

Simultaneously, a power source is connected to the engine controlling system 1 to start control of the engine 13 in accordance with the flow charts shown in FIGS. 8($i$) to 18.

The control will be described in detail below.

At first at step A101 of FIG. 8($i$), various variables, flags, timers and counters which are used in the control are all reset so that they may have a value of zero, and then the sequence advances to step A102.

In this instance, in preference to the control of the main flow shown at steps A101 to A117 of FIG. 8($i$), the first, second and third interrupt controls are executed. The first interrupt control is executed for each 50 milliseconds in accordance with the flow chart of steps A118 to A120 of FIG. 8($ii$). The second interrupt control is executed for each 10 milliseconds in accordance with the flow chart of steps A121 to A122 of FIG. 8($iii$). The third interrupt control is executed for each 65 milliseconds in accordance with the flow chart of steps A123 to A128 of FIG. 8($iv$).

Among the interrupt controls, the first interrupt control is executed by the control section 25 and is an interrupt control entered in response to the counter CAPCNG as mentioned hereinabove. In short, at a time directly after control by the engine controlling system 1 is started, the value of the counter CAPCNG is 0 as a result of resetting at step A101, and accordingly, if the counter CAPCNG is incremented by one at step A118, then the value of the counter CAPCNG will be 1. As a result, the requirement of CAPCNG=1 at subsequent step A119 is met, and consequently the sequence advances to step A120. At step A120, the counter CAPCNG is decremented by one and now has a value equal to 0.

Then, when the first interrupt control is started again after lapse of 50 milliseconds, the value of the counter CAPCNG is 0 similarly as at the time of starting of the preceding execution of the first interrupt control as described above. Accordingly, contents of the control for the present time will be quite the same as those of the first interrupt control for the preceding time, and consequently, the counter CAPCNG will have a value equal to 0 again when the first interrupt control for the present time is completed. In short, unless the counter CAPCNG is set to a value other than zero at any step of the control of the main flow, the first interrupt control which is executed for each 50 milliseconds is repeated with the quite same contents, and the resulted value of the counter CAPCNG always remains 0.

The second interrupt routine is executed by the control section 25. Here in the second interrupt control, a changing rate DAPS of an accelerator pedal treadled amount APS detected by the treadled amount detecting section 14 is found out in response to such treadled amount APS. It is to be noted that the value of an accelerator pedal treadled amount APS is a value which is obtained by converting a voltage, which is developed from the potentiometer 37 of the treadled amount detecting section 14 interlocked with the accelerator pedal 27 and increases in proportion to a treadled amount of the accelerator pedal 27, into a digtal value by the analog to digital converting section 38 of the treadled amount detecting section 14.

In the second interrupt control, an accelerator pedal treadled amount APS is read in at step A121, and then at step A122, a difference between the value APS thus read in and another accelerator pedal treadled amount APS' which was read in 100 milliseconds ago in a similar manner and stored in the control section 25, that is, |APS−APS'|, is calculated as a value DAPS. Since the interrupt control is repeated for each 10 milliseconds, the values APS, APS' and DAPS are updated for each 10 milliseconds.

The third interrupt control is executed by the speed-/acceleration detecting section 24 to calculate an actual speed VA and an actual acceleration DVA.

After starting of the third interrupt control, at first at step A123, a wheel speed of the right rear wheel 36 detected by the right rear wheel speed detecting section 42 is read in as VARR, and then at step A124, a wheel speed of the left rear wheel 35 detected by the left rear wheel speed detecting section 43 is read in as VARL. Then at step A125, an average of the values VARR and VARL is calculated and stored as an actual speed VA of the vehicle. Subsequently at step A126, a variation of the actual speed VA calculated at step A125 from another actual speed VA' which was calculated and stored in a similar manner in the preceding interrupt control executed 90 milliseconds before the present interrupt control, that is, VA−VA', is calculated as an actual acceleration $DVS_{65}$. Then at step A127, a variation of an average value VAA between VA and VA' from an average value VAA' between VA' and a further actual speed VA" which had been calculated and stored in a similar manner in the further preceding interrupt control executed further 390 milliseconds before the interrupt control in which VA' was calculated, that is, VAA−VAA', is calculated and stored as an actual acceleration $DVA_{130}$. Further at step A128, an average of the actual acceleration $DVA_{130}$ calculated at step A127 and four latest actual accelerations $DVA_{130}$ calculated in a similar manner in the preceding interrupt controls is calculated as an actual acceleration $DVA_{850}$.

The values VA, VA', VA", VAA, VAA', $DVA_{65}$, $DVA_{130}$ and $DVA_{850}$ calculated in this manner are updated for each 65 milliseconds because the third interrupt control is executed for each 65 milliseconds.

Since the value $DVA_{65}$ among the actual accelerations is calculated in accordance with the two actual speeds VA and VA' as described above, the follow-up performance to an actual change in acceleration of the vehicle is at the highest, but, the influence when an error of an actual speed is increased by a disturbance or the like is great and accordingly the stability is low. To the contrary, since the value $DVA_{850}$ is calculated from five actual accelerations $DVA_{130}$ which are each calculated in accordance with three actual speeds VA, VA' and VA" as described above, the influence of a disturbance is small and the stability is high contrary to the value $DVA_{65}$, but the follow-up performance is low. On the other hand, the value $DVA_{130}$ has an intermediate stability and an intermediate follow-up performance between the values $DVA_{65}$ and $DVA_{850}$.

Here, contents of the fail safe control executed to compensate for an error in actual acceleration DVA found out by the third interrupt control will be decribed with reference to FIG. 8(v). In particular, at first at step N101, it is detected whether or not a change in detection value detected by the air pressure detecting device for the air suspension provided as one of components of the car weight detecting section 19, that is, a rate of change in air pressure, is greater than a preset reference value.

When the change in detection value is not greater than the reference value, it is determined that no error is involved in a measured value of the actual speed VA, and the sequence advances to step N108 at which the value of a flag $I_{14}$ is reset to 0 and then to step N109 at which a timer TMA' is reset, whereafter the sequence advances to step N110. At step N110, actual accelerations $DVA_{65}$, $DVA_{130}$ and $DVA_{850}$ are calculated in a normal manner in accordance with the steps A126 to A128 described hereinabove.

It is to be noted that, in case the condition whwerein a change in detection value is not greater than the reference value continues from a stage before the fail safe control is executed, the flag $I_{14}$ remains 0 from the first, and the timer TMA' is already in a reset state.

The flag $I_{14}$ indicates a value equal to 1 when the change in air pressure of the air suspension is already greater than the reference value. Meanwhile, the timer TMA' is provided to count a duration while a change in air pressure of the air suspension continues to remain greater than the preference value.

To the contrary, in case the change in detection value is greater than the reference value, it can be judged at step N101 that an error has taken place in a measured value of the actual speed VA. In this instance, the sequence advances at first to step N102 at which it is judged whether or not the value of the flag $I_{14}$ is equal to 1.

Now, if it is assumed that the change in air pressure of the air suspension has become greater than the reference value for the first time, then since the value of the flag $I_{14}$ still remains equal to 0, the sequence advances to step N103 at which the value of the flag $I_{14}$ is changed to 1 and then to step N104 at which counting of the timer TMA' is started. Subsequently at step N105, calculations of actual accelerations $DVA_{65}$, $DVA_{130}$ and $DVA_{850}$ are stopped, and calculated values obtained immediately before then (final calculated values) are stored as output data.

Subsequently, the sequence advances to step N106 at which a control cycle is re-set. Such re-setting of a control cycle signifies returning of the control shown in the main flow of FIG. 8(i) which will be hereinafter described to its initial state, that is, to the stage of step A101 to start a new control cycle. After then, the sequence advances to step N107.

To the contrary, in case it was judged in the preceding control cycle that the change in air pressure of the air suspension was greater than the reference value, the flag $I_{14}$ already assumes a value equal to 1. Consequently, it is judges at step N102 that the value of the flag $I_{14}$ is equal to 1. In this instance, the steps N103 to N106 are bypassed, and the sequence advances directly to step N107.

At step N107, it is judged whether or not a count value $t_{TMA'}$ of the timer TMA' is greater than a predetermined value $t_C$. Here, the count value $t_{TMA'}$ denotes a period of time while a condition wherein the change in air pressure of the air suspension is greater than the reference value continues. Meanwhile, the predetermined value $t_C$ is a reference time and is set to a value suitably greater than a natural period of oscillations of the suspension of the vehicle, for example, to 750 ms or so.

Judgment at step N107 is a discrimination whether the change in air pressure of the air suspension arises from a bump, a rebound or the like of a wheel of the vehicle or from an actual change in speed of the vehicle. In short, if the change in air pressure of the air suspension arises from a bump, a rebound or the like of a wheel, then such change disappears after lapse of the reference time $t_C$ or so during which the bump, rebound or the like goes down. Accordingly, if on the contrary the condition wherein the change in air pressure of the air suspension is greater than the reference value continues for a period of time longer than the reference time $t_C$, then it can be regarded that the air pressure of air suspension is changing because the car speed changes actually.

In short, if the count value $t_{TMA'}$ of the timer TMA is greater than the predetermined value $t_C$, then the change in air pressure arises because the car speed varies actually, and it is determined that the calculated actual acceleration data can be adopted. To the contrary, if the count value $t_{TMA'}$ of the timer TMA' is not greater than the predetermined value $t_C$, then there is the possibility that the change in air pressure of the air suspension may be caused by a bump, a rebound or the like, and it is determined that the calculated actual acceleration data cannot be adopted.

In case it is not judged at step N107 that the count value $t_{TMA'}$ is greater than the predetermined value $t_C$, the fail safe control comes to an end, but on the contrary if it is judged at step N107 that the count value $t_{TMA'}$ is greater than the predetermined value $t_C$, the sequence advances to step N108. At step N108, the value of the flag $I_{14}$ is reset to 0, and then at step N109, the timer TMA' is reset. After then, the sequence advances to step N110 at which actual accelerations $DVA_{65}$, $DVA_{130}$ and $DVA_{850}$ are calculated in an ordinary manner in accordance with the steps A126 to A128.

It is to be noted that the fail safe control executed to compensate for an error in actual acceleration DVA shown in FIG. 8(v) is repeated after each lapse of a predetermined interval of time which is suitably shorter than the reference time $t_C$.

In case it is judged that the actual acceleration data are reliable in this manner, an actual acceleration is calculated regularly, and actual acceleration data substantially equal to an acceleration at present are adopted. To the contrary, in case it is judged that an error has taken placed in an actual acceleration DVA, latest ones of already calculated proper data (final calculated values) are adopted as data of the actual accelerations DVA ($DVA_{65}$, $DVA_{130}$ and $DVA_{850}$).

In the meantime, in the main flow of steps A101 to A117 of FIG. 8(i), at step A102 subsequent to step A101, a timer TMB for determining a timing of opening or closing of the throttle valve 31 starts its counting operation of time, and then the sequence advances to step A103.

At step A103, various data are read in which include the actual speed VA, actual accelerations $DVA_{65}$, $DVA_{130}$ and $DVA_{850}$ all calculated in the third interrupt control of steps A123 to A128 by the speed/acceleration detecting section 24, the accelerator pedal treadled amount APS detected by the treadled amount detecting section 14, the changing rate DAPS of the accelerator pedal treadled amount APS calculated by the control section 25 in the interrupt control of steps A121 to A122, the intake air amount AE detected by the intake air amount detecting section 20, the engine rotational speed $N_E$ detected by the engine rotational speed detecting section 21, the car weight W detected by the car weight detecting section 19, and the rotational speed $N_D$ of a torque converter output shaft (not shown) of the automatic transmission 32 detected by the output shaft rotational speed detecting section 22. Simultaneously, contact information of the switches including the accelerator switch 15, brake switch 16, shift selector switch 17, and acceleration switch 45, changing over switch 46, throttle switch 47 and aimed speed changing switch 48 of the automatic cruise switch 18 and information of the current gear position of the automatic transmission 32 detected by the gear position detecting section 23 are read in.

Subsequently at step A104, it is judged whether or not the value of a flag $I_4$ is equal to 1. The flag $I_4$ indicates, when it assumes a value equal to 0, that constant speed running should be designated by the running condition designating section 3 of the control section 25. Thus, at step A104, it is judged, when a constant speed running condition is to be designated, that the flag $I_4$ is not equal to 1 ($I_4 \neq 1$), and then the sequence advances to step A105. On the contrary, when a constant speed running condition is not to be designated, it is judged that the flag $I_4$ is equal to 1 ($I_4 \neq 1$), and then the sequence advances to step A107.

At step A105, it is judged whether or not another flag $I_8$ is equal to 1. The flag $I_8$ indicates, when it assumes a value equal to 0, that control after the speed of the vehicle has become substantially equal to an aimed speed for constant speed running should be executed in the aimed speed control at step E133 of FIG. 12 which will be hereinafter described. When it is judged at step A105 that the flag $I_8$ is equal to 1 ($I_8 \neq 1$), the sequence advances to step A107, but on the contrary when $I_8 = 1$ is not judged, the sequence advances to step A106.

At step A106, a preset fixed value $T_K$ is designated as a cycle $t_{K2}$ in which the throttle valve 31 is to be opened and closed.

At step A107, a cycle $t_{K2}$ is defined by a product of an inverse number of the engine rotational speed $N_E$ read in at step A103 and a coefficient $\alpha$ of a preset fixed value. Accordingly, if constant speed running is designated by the running condition designating section 3 of the control section 25, opening or closing movement of the throttle valve is performed in a cycle which decreases as the rotational speed of the engine 13 increases until the speed of the vehicle reaches an aimed car speed in the aimed speed control, and when control is to be executed after the speed of the vehicle has become substantially equal to the aimed speed, the throttle valve 31 is opened and closed in the fixed cycle.

At step A108 to which the sequence advances from step A106 or A107, the cycle $t_{K2}$ is compared with an interval of time counted by the timer TMB to judge whether $t_{TMB} > t_{K2}$ or not. Then, in case $t_{TMB} > t_{K2}$ is judged, the sequence advances to step A109, but on the contrary if $t_{TMB} > t_{K2}$ is not judged, the sequence advances to step A112.

In case $t_{TMB} > t_{K2}$, the present control cycle falls on a timing at which opening or closing movement of the throttle valve 31 should be performed. Thus, at step A109, the timer TMB is reset to change the value $t_{TMB}$ to zero in order to enable determination of a timing for subsequent next opening or closing movement of the throttle valve 31, and then at step A110, counting of time by the timer TMB is started again, whereafter a flag $I_{11}$ is changed to 1 at step A111. The flag $I_{11}$ indicates, when it assumes a value of 1, that opening or closing movement of the throttle valve 31 should be performed in the present control cycle after counting of time by the timer TMB has been started again at step A110.

To the contrary, in case $t_{TMB} > t_{K2}$ is not judged at step A108, the present control cycle does not fall on a timing at which opening or closing movement of the throttle valve 31 should be performed, and consequently, the value of the flag $I_{11}$ is changed to 0 at step A112.

At step A113 to which the sequence advances from step A111 or step A112, it is judged in accordance with the contact information of the shift selector switch 17 read in at step A103 whether or not the shift selector 29 is at the position for the D range. In case it is judged that the shift selector 29 is at the position for the D range, the sequence advances to step A114, but on the contrary, if it is judged that the shift selector 29 is at any position other than the position for the D range, the sequence advances to step A117 at which direct throttle movement control is executed because complicated control depending upon a running condition of the vehicle and so on is unnecessary.

When the sequence advances to step A114, it is judged whether or not the throttle switch 47 of the automatic cruise switch 18 is positioned at the position [e] shown in FIG. 6. In case the throttle switch 47 is at the position [e], the sequence advances to step A117 at which direct throttle movement control is executed wherein the throttle valve 31 is operated in such a manner that the throttle valve 31 is mechanically coupled directly to the accelerator pedal 27.

On the contrary, if it is judged at step A114 that the the throttle switch 47 is not at the position [e], the sequence advances to step A115. At step A115, it is judged whether or not the engine rotational speed $N_E$ read in at step A103 is smaller than a preset reference value $N_K$ ($N_E < N_K$) which is set a little lower than a rotational speed during idling after completion of warming up of the engine 13. Then, in case $N_E < N_K$ is judged, the sequence advances to step A117 in order to execute direct throttle movement control, but if $N_E < N_K$ is not judged, then the sequence advances to step A116 in order to execute non-direct throttle movement control.

Accordingly, while the rotational speed of the engine 13 rises from an engine halt condition to a rotational speed in a normal condition upon starting of the engine 13, or when the running condition of the engine 13 becomes unstable by some causes so that the engine rotational speed is lowered, the throttle valve 31 operates only in accordance with movement of the accelerator pedal 27 to control the engine 13.

The control cycle for the present time is completed with completion of the non-direct throttle movement control at step A116 or the direct throttle movement control at step A117, and the sequence thus returns to step A103 in order to repeat the control of the steps A103 to A116 or A117 described above. Accordingly, in each control cycle, various detection values and contact information are read in an updated at step A103, and such control as described above is executed in accordance with the detection values and contact information.

Subsequently, the direct throttle movement control at step A117 of FIG. 8(i) will be described in detail. The direct throttle movement control is executed in accordance with the flow chart shown in FIG. 9.

Figure 19:
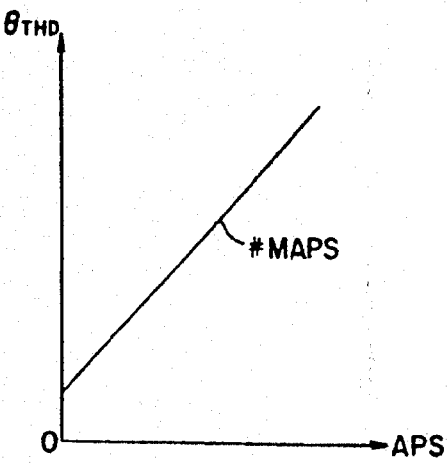
FIGS. 19 to 26 are graphs illustrating relationships between parameters of a map used for control by the engine controlling system and variables read out in accordance with such parameters.

Referring to FIG. 9, at first at step B101, a throttle valve opening $O_{THD}$ corresponding to the accelerator pedal treadled amount APS read in at step A103 of FIG. 8(i) is read out from a map #MAPS shown in FIG. 19 using the accelerator pedal treadled amount APS as a parameter, and then the sequence advances to step B102.

At step B1021, it is judged whether or not the flag $I_{11}$ mentioned hereinabove is equal to 1. In case $I_{11} = 1$ is judged, this indicates that the present control cycle falls on a timing at which opening or closing movement of the throttle valve 31 should be performed. Accordingly, the sequence advances to step B103 at which opening or closing movement of the throttle valve 31 is performed, thereby completing the direct throttle movement control for the present control cycle. To the contrary, in case $I_{11} = 1$ is not judged at step B102, this indicates that the present control cycle does not fall on a timing at which opening or closing movement of the throttle valve 31 should be performed, and accordingly, the direct throttle movement control for the present control cycle is completed without executing any further operation.

At step B103, a signal indicative of the throttle valve opening $\theta_{THD}$ read out at step B101 is delivered from the control section 25 to the throttle valve pivoting section 26. The throttle valve pivoting section 26 receives such signal at the actuator driving section 39 thereof and delivers a driving signal to the throttle valve actuator 40 to pivot the throttle valve 31 to a position at which the throttle valve opening presents a value equal to $\theta_{THD}$. The throttle valve actuator 40 thus pivots the throttle valve 31 in response to such driving signal.

In this instance, the opening of the throttle valve 31 is detected by the throttle valve opening detecting section 41, and results of the detection are fed back to the actuator driving section 39. Thus, in response to the detection results, the actuator driving section 39 continuously delivers a pivotally driving signal for the throttle valve 31 for changing the throttle valve opening toward the value $\theta_{THD}$. When it is detected by the throttle valve opening detecting section 41 that the throttle valve 31 has been pivoted to such position, the actuator driving section 39 stops delivery of the driving signal in response to such detection results. Consequently, the throttle valve 31 is stopped at the position at which the throttle valve opening is equal to the value $\theta_{THD}$.

In the direct throttle movement control, the throttle valve opening $\theta_{THD}$ is determined only depending upon a treadled amount of the accelerator pedal 27 as described above. Meanwhile, the throttle valve opening $\theta_{THD}$ and the accelerator pedal treadled amount APS have such a proportional mutual relationship as shown in FIG. 19. Accordingly, the throttle valve 31 is moved in accordance with movement of the accelerator pedal 27 in such a condition that the accelerator pedal 27 and the throttle valve 31 are mechanically coupled directly to each other.

It is to be noted that, when the throttle valve 31 operates in this manner to open or close the intake air path 30, the amount of air sucked into the engine 13 is changed, and consequently, the amount of fuel supply to the engine 13 which is determined by a fuel controlling device (not shown) in accordance with the amount of air detected by the intake air amount detecting section 20 and also with a running condition of the engine 13 is changed. As a result, the amount of fuel actually injected into the intake air path 30 by a fuel injection device (not shown) is changed, and consequently, the output power of the engine 13 is changed.

Subsequently, the non-direct throttle movement control at step A116 of FIG. 8(i) will be described. The non-direct throttle movement control is executed in accordance with the flow chart shown in FIG. 10.

Referring to FIG. 10, at first at step C101, it is judged in accordance with the contact information read in at step A103 of FIG. 8(i) whether or not the contact of the brake switch 16 is in an on-state.

In this instance, in case the brake pedal 28 is in a treadled condition in order to brake the vehicle, the contact of the brake switch 16 is in an on-state at step C101, and consequently the sequence advances to step C102. To the contrary, if the brake pedal 28 is not in a treadled condition, the contact of the brake switch 16 is not in an on-state, and consequently the sequence advances to step C113. Accordingly, control of different contents is executed whether the brake pedal 28 is in a treadled condition or not.

At step C102 to which the sequence advances from step C101 at which it is judged that the brake pedal 28 is in a treadled condition, a flag $F_7$ is reset to 0. The flag $I_7$ indicates, when it assume a value of 0, that the brake pedal 28 was in a treadled condition in the preceding control cycle. Then at step C103, it is judged whether or not the value of another flag $I_2$ is equal to 1.

The flag $I_2$ indicates, when it assumes a value equal to 1, that, when the brake pedal 28 was treadled to decelerate the vehicle by means of a brake (not shown), a quick braking condition wherein the deceleration is greater than a reference value has continued for an interval of time longer than a reference interval of time. It is to be noted that the reference value and the reference interval of time are set in advance.

In case it is judged at step C103 that $I_2=1$, the sequence advances directly to step C112 which will be hereinafter described, but on the contrary if it is not judged that $I_2=1$, the sequence advances to step C104.

At step C104 to which the sequence advances from step C103, it is judged whether or not the actual acceleration $DVA_{130}$ read in at step A103 of FIG. 8(i) is smaller than a preset negative reference value $K_2$ ($DVA_{130}<K_2$). Since the actual acceleration $DVA_{130}$ present a positive value when the vehicle is being accelerated but presents a negative value when the vehicle is being decelerated, the judgment whether or not the actual deceleration $DVA_{130}$ is smaller then the negative reference value $K_2$, that is, $DVA_{130}<K_2$, is the same judgment whether or not the deceleration of the vehicle is greater than a preset reference value.

When quick braking wherein the deceleration is high is being performed by the brake (not shown), it is judged at step C104 that $DVA_{130}<K_2$, and then the sequence advances to step C107. When quick braking is not being performed, it is not judged at step C104 that $DVA_{130}<K_2$, and then the sequence advances to step C105.

At step C107, it is judged whether or not the value of a flag $I_1$ is equal to 1. The flag $I_1$ indicates, when it assumes a value equal to 1, that a timer TMA which measures a duration of a condition wherein the actual acceleration $DVA_{130}$ is smaller than the reference value $K_2$ (that is, a condition wherein the deceleration is greater than the preset reference value) is counting time. If the timer TMA is already counting time, it is judged at step C107 that $I_1=1$, and then the sequence advances to step C110. To the contrary, in case the timer TMA is not counting time, it is not judged that $I_1=1$, and the sequence advances to step C108 at which the value of the flag $I_1$ is changed to 1. Then at step C109, counting of time by the timer TMA is started again, and then the sequence advances to step C110.

At step C110, it is judged whether or not the time $t_{TMA}$ counted by the timer TMA is greater than a preset reference time $t_{K1}$ ($t_{TMA}>t_{K1}$). In case it is judged that $t_{TMA}>t_{K1}$, the sequence advances to step C111 at which the value of the flag $I_2$ is changed to 1, whereafter the sequence advances to step C112. To the contrary, if it is not judged at step C110 that $t_{TMA}>t_{K1}$, the sequence directly advances to step C112. Consequently, the value of the flag $I_2$ is left as 0.

On the other hand, in case it is not judged at step C104 that $DVA_{130}<K_2$ and consequently the sequence advances to step C105, the deceleration by the brake (not shown) is lower than the reference value and accordingly counting by the timer TMA is unnecessary. Thus, in preparation for such a possible case wherein counting by the timer TMA becomes necessary, the value of the flag $I_1$ is changed to zero at step C105, and then at step C106, the timer TMA is reset to stop counting of time and change the value of the count time $t_{TMA}$ to zero, whereafter the sequence advances to step C112.

It is to be noted that, if the condition wherein the deceleration by the brake (not shown) is higher than the reference value continues for an interval of time longer than a reference interval of time by the control at such steps C103 to C111 as described above, the value of the flag $I_2$ is changed to 1, and once the value of the flag $I_2$ is set to 1, it will not be changed any more even if the deceleration becomes lower than the reference value unless the value of the flag $I_2$ is changed to 0 at any step other than the steps C103 to C111.

At step C112, a signal to designate a throttle valve opening of a minimum value corresponding to the idling position of the engine 13 is delivered from the controlling section 25 to the throttle valve pivoting section 26. The throttle valve pivoting section 26 receives the signal and causes the actuator driving section 39 thereof to deliver to the throttle valve actuator 40 a driving signal to pivot the throttle valve 31 to the throttle valve opening of the minimum value. The throttle valve actuator 40 thus pivots the throttle valve 31 in accordance with the driving signal thus received.

In this instance, the opening of the throttle valve 31 is detected by the throttle valve opening detecting section 41, and results of such detection are fed back to the actuator driving section 39 to effect feedback control. In short, the actuator driving section 39 continues, in response to results of the detection of the throttle valve opening, to deliver a driving signal necessary for pivotal motion of the throttle valve 31 until it is confirmed that the throttle valve 31 has been pivoted to a predetermined position. When it is detected by the throttle valve opening detecting section 41 that the throttle valve 31 has been pivoted to the predetermined position, delivery of the driving signal from the actuator driving section 39 is stopped, and consequently the throttle valve 31 is stopped at a predetermined position so that a braking force is caused by engine brake.

As described so far, if the brake pedal 28 is treadled, then this is intended for deceleration of the vehicle, and accordingly, braking of the vehicle by engine brake is performed together with braking by the brake (not shown) by maintaining the throttle valve 31 at the minimum opening corresponding to the engine idling position after the control at steps C103 to C111 has been executed.

In case the brake pedal 28 is not treadled and consequently the sequence advances from step C101 to step C113, it is judged whether or not the value of the flag $I_7$ is equal to 1. While the flag $I_7$ indicates whether or not the brake pedal 28 was treadled in the preceding control cyle as described hereinabove, if the brake pedal 28 was not treadled, then the flag $I_7$ has a value equal to 1, but if the brake pedal 28 was treadled, the flag $I_7$ presents a value equal to 0. Accordingly, at step C113, it is judged whether or not the present control cycle is the first control cycle after the brake pedal 28 has been released.

In case it is judged at step C113 that $I_7=1$, that is, the present control cycle is not the first control cycle after the brake pedal 28 has been released, the sequence advances to step C133. On the contrary if it is judged that $I_7 \neq 1$, that is, the present control cycle is the first control cycle after the brake pedal 28 has been released, the sequence advances to step C114.

When the sequence advances from step C113 to step C114, various settings and judgments are accomplished at steps C114 to C118.

At first at step C114, since the brake pedal 28 is not treadled any more, there is no necessity of performing such counting of time by the timer TMA as described above. Accordingly, in preparation for such counting in the following control cycle or cycles, the value of the flag $I_1$ is changed to zero.

Then at step C115, the value of the flag $I_7$ is changed to 1 because the break pedal 28 is not in a treadled condition any more, and then at step C116, the timer TMA is reset to stop counting of time and change the value of the counted time $t_{TMA}$ to 0 by a similar reason as at step C114.

Subsequently at step C117, the value of a flag $I_{12}$ is changed to 0. The flag $I_{12}$ indicates, when it assumes a value equal to 0, either that opening or closing operation of the throttle valve 31 is not yet performed in a control cycle (opening/closing timing cycle) which falls on a timing for opening or closing movement of the throttle valve 31 which is first encountered after the automatic cuise mode control at step C144 has been entered in any control cycle, or that, although such opening or closing movement has been performed, opening or closing movement of the throttle valve 31 is not yet performed in an opening/closing timing cycle which is first encountered after the designation of a running condition of the vehicle has been changed by operation of the acceleration switch 45 or the changing over switch 46 in the automatic cruise mode control.

Then at step C118, it is judged in accordance with the contact information read in at step A103 of FIG. 8(i) whether or not the contact of the accelerator switch 15 is in an on-state. In case the accelerator pedal 27 is treadled and the contact of the accelerator switch 15 is in an off-state, the sequence advances to step C135 at which the value of the flag $I_2$ is changed to 0 and then at step C136, the value of a flag $I_3$ is changed to 1, whereafter the sequence advances to step C137. The flag $I_3$ indicates, when it assumes a value equal to 0, that the throttle valve 31 should be maintained at its minimum opening corresponding to the idling position of the engine 13.

It is to be noted that, in case the value of the flag $I_2$ is set to 1 at step C111, the value of the flag $I_2$ remains 1 until the control at step C135 is executed subsequently. In other words, the value of the flag $I_2$ is changed to 0 when the accelerator pedal 27 is treadled subsequently.

At step C137, an aimed acceleration is determined in accordance with the accelerator pedal treadled amount APS detected by the treadled amount detecting section 14, the changing rate DAPS of the treadled amount calculated from the treadled amount APS by the control section 25 and a value of the counter CAPCNG, and accelerator mode control is executed. In the accelerator mode control, the throttle valve 31 is pivoted to control the output power of the engine 13 so that the vehicle may run at an aimed acceleration. The non-direct throttle movement control in the present control cycle is completed with completion of the accelerator mode control.

In case the sequence advances from step C118 to C119 because the accelerator pedal 27 is not treadled and the contact of the accelerator switch 15 is in an on-state, a value DAPMXO is changed to 0. The value DAPMXO represents a maximum value of the changing rate DAPS of the accelerator pedal treadled amount APS when the treadled amount of the accelerator pedal 27 increases.

Then at step C120, another value DAPMXS is changed to 0. The value DAPMXS represents a minimum value of the changing rate DAPS when the treadled amount of the accelerator pedal 27 decreases.

Further at step C121, the latest actual speed $VA_I$ calculated in the interrupt control at steps A123 to A128 of FIG. 8(iv) is read in.

Subsequently at step C122, the value of the actual speed $VA_I$ read in at step C121 is substituted as a value of $V_{OFF}$ which indicates an actual speed of the vehicle at a point of time directly after the brake pedal 28 has been released.

Then at step C123, it is judged in accordance with the cointact information read in at step A103 of FIG. 8(i) whether or not the position of the throttle switch 47 of the automatic cruise switch 18 is [f] in FIG. 6. It is to be noted that, in case the throttle switch 47 is at the position f, if the brake pedal 28 is released after it has been treadled to decelerate the vehicle, it is designated to maintain the throttle valve 31 at the minimum opening corresponding to the engine idling position until the accelerator pedal 27 is treadled subsequently.

In case it is judged at step C123 that the position of the throttle switch 47 is [f], the sequence advancees to step C126 at which the value of the flag $I_3$ is changed to 0 and then to step C112 at which the throttle valve 31 is pivoted to the minimum opening corresponding to the engine idling position as described hereinbelow.

To the contrary, in case it is judged at step C123 that the position of the throttle switch 47 is not [f], the sequence advances to step C124 at which it is judged whether or not the value $V_{OFF}$ is smaller than a preset reference value $K_1$, that is, $V_{OFF}<K_1$.

In case $V_{OFF}<K_1$ is judged at step C124, the sequence advances to step C125 at which it is judged whether or not the value of the flag $I_2$ is equal to 1. If $I_2=0$ is judged, the sequence advances to step C126 at which the value of the flag $I_3$ is changed to 0 and then to step C112 at which the throttle valve 31 is pivoted to the minimum opening position as described hereinabove.

To the contrary, if $V_{OFF}<K_1$ is not judged at step C124 or if $I_2=1$ is not judged at step C125, the sequence advances to step C145.

Accordingly, in case a condition wherein the deceleration is smaller than a reference value continues for an interval of time longer than a reference interval of time in response to treadling of the brake pedal 28 to perform braking of the vehicle and besides the speed of the vehicle when such braking is interrupted is smaller than a reference value, if the accelerator pedal 28 is not treadled any more, braking of the vehicle is effected preferentially so that, even after the brake pedal 28 has been released, the throttle valve 31 is held at the minimum opening position to effect braking by engine brake.

When deceleration by the brake is to be performed to stop the vehicle, for example, at a crossing, the brake pedal 28 is released once directly before stopping in order to moderate a shock upon stopping. In such an instance, however, the throttle valve 31 is maintained at the minimum opening to automatically effect braking by engine brake as descried hereinabove.

If the sequence advances from step C124 or step C125 to step C145, then the value of a flag $I_4$ is changed to 0 whereafter the sequence advances to step C127. It is to be noted that the flag $I_4$ indicates when it assumes a value equal to 0, that constant speed running should be designated by the running condition designating section 3 of the control section 25.

At step 127, the value of the flag $I_3$ is changed to 1 because there is not necessity of maintaining the throttle valve 31 at the minimum opening. Then at step C128, the value of the flag $I_8$ is changed to 1, and then at step C129, the actual speed $VA_I$ read in at step C121 is substituted into the aimed speed VS for constant speed running.

Subsequently at step C130, an aimed torque $TOM_1$ necessary to maintain running of the vehicle at the aimed speed VS is calculted in accordance with the following equation (1):

$$TOM_1 = [\{(W \cdot r/g) \cdot k_s + k_i\} \cdot (DVS_3 - DVS_{65}) + T_Q \cdot TEM]/T_Q \quad (1)$$

It is to be noted that, in the equation (1) above, W is a weight of the vehicle detected by the car weight detecting section 19 and read in at step A103 of FIG. 8(i), r is an effective radius of a tire of the left front wheel 33 or the right front wheel 34 which is stored in advance, and g is the gravitational acceleration.

Further, $k_s$ is a coefficient set in advance for conversion of any value into a value where the gear position used of the automatic transmission 32 is the low gear position and has a predetermined value corresponding to a gear position of the automatic transmission 32 in use as detected by the gear position detecting section 23 and read in at step A103. Meanwhile, $k_i$ is a correction amount for inertia of the engine 13 and the automatic transmission 32 around a drive shaft of the vehicle.

Furthermore, $T_Q$ is a torque ratio of the automatic transmission 32. The torque ratio $T_Q$ is determined in accordance with a map #MTRATQ (not shown) 1 set in advance in accordance with characteristics of the automatic transmission 32 using a speed ratio e detected by the output rotational speed detecting section 22 as a parameter. It is to be noted that the speed ratio e is obtained by dividing the output shaft rotation speed $N_D$ of the torque converter (not shown) in the automatic transmission 32 read in at step A103 by the engine rotational speed $N_E$ detected by the engine rotational speed detecting section 21 and read in at steo A103.

Figure 23:
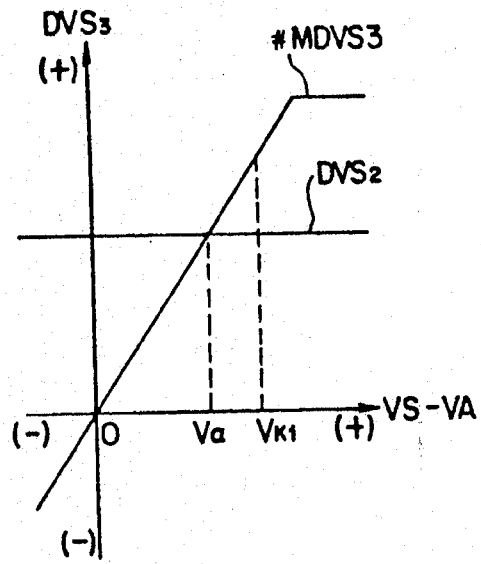

Further, $DVS_3$ is an aimed acceleration for making the speed of the vehicle equal to the aimed speed VS and maintaining the same. The aimed acceleration $DVS_3$ is determined by a map #MDVS3 set in advance as shown in FIG. 23 using a difference VS−VS of the actual speed VA from the aimed speed VS as a parameter. It is to be noted that, at step C130, since the aimed speed VS is an actual speed at a point of time directly after the break pedal 28 has been released as described hereinabove, determination of the aimed acceleration $DVS_3$ is effected on the assumption that the difference VS−VA is 0 in the equation (1) above.

Meanwhile, $DVA_{65}$ is an actual acceleration calculated in the interrupt control at steps A123 to A128 of FIG. 8(i) and read in at step A103 as described hereinabove, and TEM is an actual torque of the output power of the engine 13. The actual torque TEM is determined in accordance with a map #TEMAP (not shown) set in advance in accordance with characteristics of the engine 13, using, as parameters, the engine rotational speed $N_E$ and a value $A_E/N_E$ which is obtained by dividing the intake air amount $A_E$ detected by the intake air amount detecting section 20 and read in at step A103 by the engeine rotational speed $N_E$.

After the aimed torque $TOM_1$ is calculated at step C130 in this manner, a throttle valve opening $\theta_{TH1}$ is read out from a map #MTH (not shown) at subsequent step C131. The map #MTH is set in advance in accordance with characteristics of the engine 13 using an aimed torque TOM and the rotational speed $N_E$ as parameters. The map #MTH is used for determination of a throttle valve opening $\theta_{TH}$ which is necessary to make the output torque of the engine 13 equal to the aimed torque TOM. Accordingly, the value of a throttle valve opening $\theta_{TH1}$ to be read out from the map #MTH corresponds to the aimed torque $TOM_1$ calculated at step C130 and also to the engine rotational speed $N_E$ detected by the engine rotational speed detecting section 21 and read in at step A103.

At step C132, the throttle valve 31 is actuated in accordance with the throttle valve opening $\theta_{TH1}$ read out from the map #MTH at step C131. In short, a signal indicative of the throttle valve opening $\theta_{TH1}$ is delivered from the control sectoion 25 to the throttle valve pivoting portion 26. The throttle valve pivoting section 26 thus receives the signal at the actuator driving section 39 thereof and delivers a driving signal to the throttle valve actuator 40 to pivot the throttle valve 31 to a position at which the throttle valve opening $\theta_{TH1}$ is provided. In response to the driving signal, the throttle valve actuator 40 pivots the throttle valve 31.

Also in this instance, adjustment of the opening of the throttle valve 31 is effected by feedback control by way of the throttle valve opening detection section 41. After the throttle valve 31 is pivoted to a predetermined position, the actuator driving section 39 no more delivers a signal, and consequently the throttle valve 31 is stopped at the predetermined position.

The intake air path 30 is opened or closed by such adjustment of the throttle valve 31 to change the amount of air to be sucked into the engine 13 as described above. An amount of fuel to be supplied to the engine 13 is thus determined in accordance with results of such detection of the air amount by the fuel controlling device (not shown), and also the amount of fuel supply is changed. As a result, the output power of the engine 13 is adjusted so that a torque substantially equal to the aimed torque $TOM_1$ is produced from the engine 13.

The output torque of the engine 13 is substantially equal to a torque which is sufficient to maintain, as an aimed speed, the actual speed of the vehicle at a point of time directly after releasing of the brake pedal 28 as described hereinabove.

By the control at steps C129 to C132 described above, the throttle valve 31 is temporaily pivoted, directly after releasing of the brake pedal 28, to a position of a throttle valve opening which is forcast to maintain the speed of the vehicle at a point of time directly after releasing of the brake pedal 28 even when the present control cycle is not an opening/closing timing cycle determined by the reference time $t_{K2}$ in order to make preparations for subsequent transition to constant speed running at the aimed speed.

In case the sequence advanced from step C113 to step C114 to execute such control as described above in the preceding control cycle and the brake pedal 28 still remains in a released condition in the present control cycle, it is judged at step C113 that $I_7=1$ because the value of the flag $I_7$ was changed to 1 at step C115 in the preceding control cycle. The sequence thus advances to step C133 at which it is judged in accordance with the contact information read in at step A103 whether or not the contact of the accelerator switch 15 is in an on-state.

In case the accelerator pedal 27 is in a treadled condition, it is judged at step C133 that the contact of the accelerator switch 15 is not in an on-state, and the sequence advances to step C134 at which the value of the flag $I_{12}$ is changed to 0 and then to step C135 at which the value of the flag $I_2$ is changed to 0. After then, the value of the flag $I_3$ is changed to 1 at step C136, and then the sequence advances to step C137.

It is to be noted that, once the value of the flag $I_2$ is changed to 1 at step C111, the value will not be changed until the control at step C135 is completed subsequently as described hereinabove. Further, while the sequence advances to step C135 either from step C118 or from step C133 via step C134, either case occurs when the accelerator pedal 27 is treadled to change the contact of the accelerator switch 15 to an off-state. Accordingly, if the accelerator pedal 27 is treadled to accelerate the vehicle again, then the value of the flag $I_2$ is changed to 0 at step C135.

Further, while the accelerator mode control is executed at step C137, such accelerator mode control is executed without fail if the accelerator pedal 27 is treadled similarly as at step C136.

When the accelerator pedal 27 is not in a treadled condition, it is judged at step C133 that the contact of the accelerator switch 15 is in an on-state, and the sequence thus advances to step C138. At step C138, the value of the maximum valyue DAPMXO is changed to 0, and then at step C139, the value of the minimum value DAPMXS is changed to 0, whereafter it is judged at step C140 whether or not the value of a flag $I_3$ is equal to 1.

It is to be noted here that the accelerator switch 15 is in an on-state only when the accelerator pedal 27 is not treadled after deceleration performed by the brake (not shown) has been completed by releasing the brake pedal 28. This corresponds to a case wherein the control at steps C113 to C132 described hereinabove was executed in the preceding control cycle.

The flag $I_3$ indicates, when it assumes a value equal to 0, that the throttle valve 31 should be kept at the minimum opening position corresponding to the engine idling position. Thus, in case $I_3=1$ it is judged at step C140, the sequence advances to step C141, but on the contrary if $I_3=1$ is not judged, the sequence advances to step C112 to move the throttel valve 31 to the minimum opening corresponding to the engine idling position.

It is to be noted that the value of the flag $I_3$ is changed to 0 when the sequence advances to step C126 as described hereinabove. Accordingly, when the throttle switch 47 is at the position [f] shown in FIG. 6 and when the condition wherein the deceleration is higher than the reference value continues for an interval of time longer than the reference interval of time upon deceleration by the brake (not shown) and the speed of the vehicle upon completion of the deceleration is lower than the reference value, the throttle valve 31 is maintained at the minimum opening to effect braking by engine brake so long as the accelerator pedal 27 and the brake pedal 28 are both in a released condition.

To the contrary, in case the sequence advances from step C140 to step C141, it is judged at step C141 whether or not the value of the flag $I_{12}$ is equal to 1, and in case it is judged that $I_{12}=1$, the sequence advances to step C143, but on the contrary if it is not judged that $I_{12}=1$, the sequence advances to step C142.

The flag $I_{12}$ having a value equal to 0 indicates, as described hereinabove, either that opening or closing operation of the throttle valve 31 is not yet performed in a control cycle which falls on a timing for opening or closing movement of the throttle valve 31 which is first encountered after the automatic cruise mode control at step C144 has been entered in any control cycle, or that, although such opening or closing operation has been performed, opening or closing operation of the throttle valve 31 is not yet performed in a control cycle which falls on a timing for opening or closing of the throttle valve 31 which is first encountered after the designation of a running condition of the vehicle has been changed by operation of the acceleration switch 45 or the changing over switch 46 in the automatic cruise mode control.

Accordingly, in case the value of the flag $I_{12}$ is equal to 0, there is the possibility that the opening of the throttle valve 31 may vary significantly when the running condition of the vehicle is changed in response to operation of the acceleration switch 45 or the changing over switch 46 upon or afer transition to a running condition of the vehicle by the automatic cruise mode control.

Therefore, in order to assure more accurate opening or closing movement of the throttle valve 31 to a required opening to effect rapid transition or change, a data is required which best follows a change in actual value to a point of time directly before such opening or closing movement of the throttle valve 31 and has a value nearest to the actual value.

Thus, the sequence advances to step C142 at which the actual acceleration $DVA_{65}$ which has a value nearest to the actual acceleration of the vehicle and has a highest follow-up performance to such change in acceleration is adopted as a value of the actual acceleration DVA which is to be used in the automatic cruise control.

To the contrary, in case the value of the flag $I_{12}$ is equal to 1, the opening of the throttle valve 31 is not changed by a great amount because opening or closing movement has been performed already upon such transition or change as described above. Accordingly, even if the follow-up performance is lowered a little, the difference between the actual value and the measured data is small, and rather, stress should be laid on the stability in control. Thus, the sequence advances to step C143 at which the actual acceleration $DVA_{130}$ which is lower in follow-up performance but is higher in stability is adopted as a value of the actual acceleration DVS.

After setting of a value of the acceleration DVA at step C142 or step C143, the sequence advances to step C144 at which such automatic cruise mode control as hereinafter described is executed, thereby completing the non-direct throttle movement control in the present control cycle.

By execution of the non-direct throttle movement control shown at steps C101 to C144 of FIG. 10 in such a manner as described above, when the brake pedal 28 is treadled to effect braking of the vehicle by means of the brake (not shown), the throttle valve 31 is held at the minimum opening corresponding to the engine idling position to effect braking by engine brake in addition to the braking by the brake. To the contrary, when the brake pedal 28 is released while the accelerator pedal 27 is treadled, the accelerator mode control which will be hereinafter described is executed.

On the other hand, when the condition wherein the deceleration by the brake pedal 28 is higher than the reference value continues for an interval of time longer than ther reference interval of time and the speed of the vehicle directly after the brake pedal 28 is released is lower than the reference value, although the brake pedal 28 has been released, the throttle valve 31 is maintained until the accelerator pedal 27 is treadled again.

When the deceleration is lower than the reference value or when the condition wherein the deceleration is higher than the reference value continues for an interval of time shorter than the reference interval of time or when the speed of the vehicle after releasing of the brake pedal 28 is higher than the reference value, the throttle valve 31 is temporarily pivoted to such a throttle valve opening at which the vehicle makes constant speed running wherein the speed of the vehicle directly after releasing of the brake pedal 28 is maintained until the accelerator pedal 27 is subsequently treadled. After then, the automatic cruise mode control is executed.

In the automatic cruise mode control, constant speed running of the vehicle is performed as hereinafter described until contact information of the automatic cruise switch 18 exhibits some change after releasing of the brake pedal 28. In this instance, however, there is no relationship between a timing of such releasing of the brake pedal 28 and a timing of opening or closing movement of the throttle valve 31, and the timing at which the brake pedal 28 is released may not always coincide with the timing of opening or closing movement of the throttle valve 31.

Therefore, directly after releasing of the brake pedal 28, the throttle valve 31 is temporarily pivoted to a position thereof at which such a throttle valve opening as described above (throttle valve opening at which the vehicle can maintain constant speed running at the speed directly after releasing of the brake pedal 28) is provided, and then the automatic cruise mode control is executed in a throttle valve opening/closing timing cycle in the subsequent control cycle or cycles.

Where the speed of the vehicle is controlled in this manner, transition to constant speed running proceeds with little variation in speed of the vehicle from a point of time directly after releasing of the brake pedal 28.

Also when the accelerator pedal 27 is released after the accelerator mode control described below has been executed by releasing the brake pedal 28 and then treadling the accelerator pedal 27, such automatic cruise mode control is executed.

Subsequently, description will be given of details of the accelerator mode control which is executed at step C137 (FIG. 10) of the non-direct throttle movement control. The accelerator mode control is executed by the control section 25 in accordance with the flow chart of steps D101 to D126 shown in FIG. 11.

Figure 20:
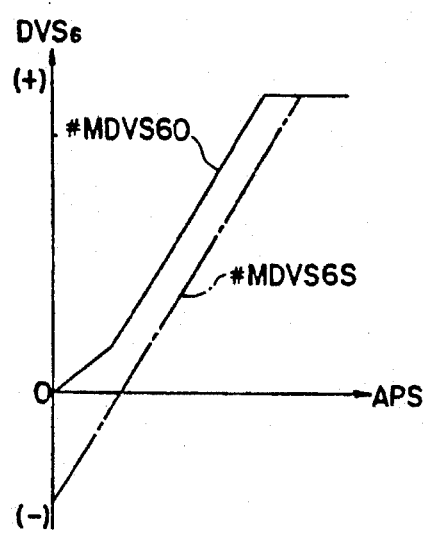

Referring to FIG. 11, at first at step D101, it is judged whether or not a map #MDVS6S has been used to find out an aimed acceleration $DVS_6$ in the preceding control cycle. The map #MDVS6S is provided to find out an aimed acceleration $DVS_6$ using an accelerator pedal treadled amount APS as a parameter as shown in FIG. 20 and is used when the treadled amount of the accelerator pedal 27 is decreased. It is to be noted that the accelerator pedal treadled amount APS is detected by the treadled amount detection section 14 and read in at step A102 of FIG. 8(i).

In case it is judged at step D101 that the map #MDVS6S was used in the preceding control cycle, it is determined that the control for decrease in treadled amount has been executed in the preceding control cycle, and the sequence advances to step D112. To the contrary, in case it is judged at step D101 that the map #MDVS6S was not used in the preceding control cycle, it is determined that the control for decrease in treadled amount was not executed in the preceding control cycle, that is, the control for increase in treadled amount was executed in the preceding control cycle, and the sequence advances to step D102.

At step D102, it is judged whether or not the changing rate DAPS of the accelerator pedal treadled amount APS is smaller than a preset negative reference value $K_6$ (DAP<$K_6$). It is to be noted that the changing rate DAPS of the accelerator pedal treadled amount APS is calculated in the interrupt control at steps A121 to A122 of FIG. 8(iii) and read in at step A103 of FIG. 8(i).

In case DAPS<$K_6$ is judged at step D102, it is determined that the treadled amount of the accelerator pedal 27 is being decreased, and the sequence advances to step D103. But on the contrary if DAPS<$K_6$ is not judged, it is determiend that the treadled amount of the accelerator pedal 27 is being increased, and the sequence advances to step D105.

In case the sequence advances to step D103, this means that the control in the preceding control cycle was executed for increase in treadled amount and the control in the present control cycle is to be executed on the contrary for decrease in treadled amount. Thus, the value of the maximum value DAPMXO of the changing rate DAPS during increase in treadled amount is changed to 0 at step D103, and then at subsequent step D104, the value of the minimum value DAPMXS of the changing rate DAPS during decrease in treadled amount is changed to 0, whereafter the sequence advances to step D115. It is to be noted that the value DAPMXO normally presents a value greater than 0 because it is a value during increase in treadled amount of the accelerator pedal 27, and on the contrary, the value DAPMXS always presents a value smaller than 0 because it is a value during decrease in treadled amount of the accelerator pedal 27.

To the contrary, in case the sequence advances from step D101 to step D112, it is judged at step D112 whether or not the changing rate DAPS is greater than a preset positive reference value $K_7$ (DAPS>$K_7$). In case DAPS>$K_7$ is judged at step D112, it is determined that the treadled amount of the accelerator pedal 27 is being increased, and the sequence advances to step D113. But on the contrary if DAPS>$K_7$ is not judged at step D112, it is determined that the treadled amount of the accelerator pedal 27 is being decreased, and the sequence advances to step D115.

When the sequence advances to step D113, the control in the preceding control cycle was executed for decrease in treadled amount and the control in the present control cycle is to be executed on the contrary for increase in treadled amount. Thus, the value of DAPMXO is changed to 0 at step D113, and then the value of DAPMXS is changed to 0 at subsequent step D114, whereafter the sequence advances to step D105.

Accordingly, in case it is judged that the treadled amount of the accelerator pedal 27 is being increased (being increased continuously), control of steps D122 to D126 is executed after execution of steps D105 to D111. On the contrary, in case it is judged that the treadled amount of the accelerator pedal 27 is being decreased (being decreased continuously), control of steps D122 to D126 is executed after execution of steps D115 to D121.

In case the sequence advances to step D105, an aimed acceleration $DVS_6$ corresponding to the accelerator pedal treadled amount APS detected by the treadled amount detecting section 14 and read in at step A103 of FIG. 8(i) is read out from a map #MDVS6O. The map #MDVS6O is provided to find out an aimed acceleration $DVS_6$ during increase in treadled amount of the accelerator pedal 27 using the accelerator pedal treadled amount APS as a parameter. The values of APS and $DVS_6$ have such a relationship as illustrated in the map #MDVS6O of FIG. 20.

At subsequent step D106, the value of DAPMXO stored in the preceding control cycle is compared with the value of DAPS of the present control cycle. Then, if it is judged that DAPMXO<DAPS, DAPS is substituted into the DAPMXO as a new value at step C107, and then the sequence advances to step D108. To the contrary, if DAPMXO<DAPS is not judged at step D106, DAMPXO stored in the preceding control cycle remains stored as it is, and then the sequence advances to step D108.

At step D108, an aimed acceleration $DVS_7$ corresponding to the value DAPMXO is read out from a map #MDVS7O in such a manner as described above. The map #MDVS7O is provided to find out an aimed acceleration $DVS_7$ during increase in treadled amount of the accelerator pedal 27 using DAPMXO as a parameter. The values of DAPMXO and $DVS_7$ have such a relationship as illustrated in the map #MDVS7O of FIG. 21.

Figure 21:
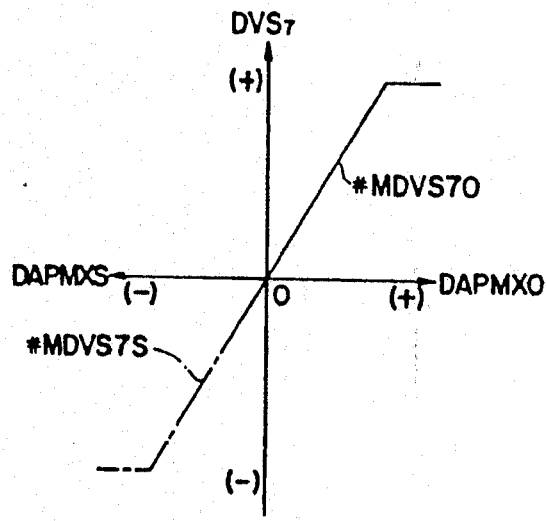

As apparently seen from the relationship illustrated in the map #MDVS7O of FIG. 21, the value of the aimed acceleration $DVS_7$ increases as the increase in treadled amount of the accelerator pedal 27 occurs at a high ratio in the control of steps D106 to D108. Since, however, the value of the aimed acceleration $DVS_7$ becomes fixed if the value DAPMXO exceeds a certain level, such excessively rapid acceleration as will cause deterioration in safety is inhibited.

In particular, at subsequent step D109, it is judged whether or not the chainging rate DAPS of the accelerator pedal treadled amount APS is higher than a preset reference value $K_8$ (DAPS>$K_8$). If DAPS>$K_8$ is judged, then it is determined that the change in treadled amount of the accelerator pedal 27 during increase is excessively great, and the sequence thus advances to step D110. To the contrary, if DAPS>$K_8$ is not judged, it is determiend that the change is not excessively great, and the sequence thus advances to step D111. In case the sequence advances from step D109 to step D110, the value of the counter CAPCNG is changed to 1, and then the sequence advances to step D111.

At step D111, an aimed acceleration $DVS_8$ corresponding to the value of the counter CAPCNG is read out from a map #MDVS8O. The map #MDVS8O is provided to find out an aimed acceleration $DVS_8$ during increase in treadled amount of the accelerator pedal 27 using the value of the counter CAPCNG as a parameter. The value of the counter CAPCNG and the value of the aimed acceleration $DVS_8$ have such a relationship as iillustrated in the map #MDVS8O of FIG. 22.

The value of the counter CAPCNG used at step D111 is set in the interrupt routine of steps A118 to A120 of FIG. 8(i) as described hereinabove and remains 0 so far as any value other than 0 is substituted into the counter CAPCNG. When the value of the counter CAPCNG is equal to 0, an aimed acceleration $DVS_8$ which is read out from the map #MDVS8O at step D111 also presents a value 0 as apparently seen from the map MDVS8O of FIG. 22. To the contrary, when the changing rate DAPS is greater than the reference value $K_8$, the value of the counter CAPCNG is changed to 1 at step D110 as described above. Accordingly, so long as the changing rate DAPS is greater than the reference value $K_8$, the value of the counter CAPCNG remains 1. Accordingly, in this instance, an aimed acceleration $DVS_8$ read out from the map #MDVS8O at step D111 presents a maximum value in the map #MDVS8O as apparently seen from the map #MDVS8O shown in FIG. 22.

When the sequence comes to step D109 again past step D102 in the subsequent next control cycle after the value of the counter CAPCNG is changed to 1 at step D110, now $DAPS>K_8$ is not judged at step D109 because the increase in treadled amount of the accelerator pedal 27 was either moderated or interrupted. Consequently, the sequence now advances to step D111 by-passing step D110. At step D111, the value of the counter CAPCNG becomes a value which is determiend in the interrupt control of steps A118 to A120 of FIG. 8(ii). In the interrupt routine, the value of the counter CAPCNG is incremented by 1 as a new value of the counter CAPCNG.

At subsequent step A119, it is judged whether or not the value of the counter CAPCNG is equal to 1. Here, if the value of the counter CAPCNG is changed to 1 at step D110 as described hereinabove, then the value of the counter CAPCNG is updated to 2 at step A118. Accordingly, the sequence bypasses step A120 depending upon such judgement at step A119, and the value of the counter CAPCNG upon completoion of the interrupt control for the present time is 2.

Also in the following control cycles, the control at step D109 is executed, and accordingly, while the condition wherein $DAPS>K_8$ is not satisfied continues, the value of the counter CAPCNG is incremented by 1 in each such interrupt control as described above.

In case the sequence advances to step D109 via steps D102 to D105, judgment at step D102 has been such that the relationship between the changing rate DAPS and the reference value $K_6$ is not $DAPS<K_6$ but $DAPS \geq K_6$. Accordingly, the sequence advances from step D109 directly to step D111 when the changing rate DAPS has a value defined by $K_6 \leq DAPS \leq K_8$. As described hereinabove, the reference value $K_6$ has a negative value while the reference value $K_8$ has a positive value. Accordingly, if the treadled amount of the accelerator pedal 27 is held constant, then the value of the counter CAPCNG is increased one by one as described above.

Figure 22:
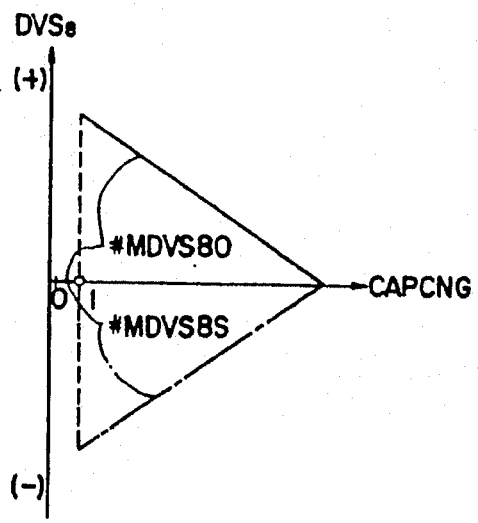

In this instance, the aimed acceleration $DVS_8$ read out from the map MDVS8O at step D111 decreases in value as the value of the counter CAPCNG increases and finally decreases to 0 as apparently seen from the map #MDVS8O in FIG. 22. Accordingly, if the treadled amount of the accelerator pedal 27 is held substantially constant after it has been increased, then the value of the aimed acceleration $DVS_8$ having a positive value gradually approaches 0 as time passes.

To the contrary, in case the sequence advances to step D115 either from step D104 or from stepp D112, an aimed acceleration $DVS_6$ corresponding to the accelerator pedal treadled amount APS detected by the treadled amount detecting section 14 and read in at step A103 of FIG. 8(i) is read out at sttep D115 from a map #MDVS6S. It is to be noted that the map #MDVS6S is provided to find out an aimed acceleration $DVS_6$ during reduction in treadled amount of the accelerator pedal 27 using the accelerator pedal treadled amount APS as a parameter. The values of APS and $DVS_6$ have such a relationship as seen in #MDVS66S shown in FIG. 20.

At subsequent step D116, the value DAPMXS stored in the preceding control cycle is compared with the value DAPS in the present control cycle. In case it is judged that DAPMXS>DAPS, the value of DAPS is substituted, at step D117, into DAPMXS as a new value of DAPMXS, and then the sequence advances to step D118. To the contrary, if it is not judged that DAPMXS>DAPS, the value DAPMXS stored in the preceding control cycle remains stored as it is, and the sequence advances to step D118.

At step D118, an aimed acceleration $DVS_7$ corresponding to the DAPMXS determined in such a manner as described above is read out from a map #MDVS7S. The map #MDVS7S is provided to find out an aimed acceleration $DVS_7$ during reduction in treadled amount of the accelerator pedal 27 using DAPMXS as a parameter. The values of DAPMXS and $DVS_7$ have such a relationship as illustrated in the map #MDVS7S shown in FIG. 21. It is to be noted that, since the value of DAPMXS is a changing rate in treadled amount when the treadled amount of the accelerator pedal 27 is being decreased, it has a value equal to 0 or a negative value as described hereinabove, and accordingly the aimed acceleration $DVS_7$ has a negative value as illustrated in the map #MDVS7S shown in FIG. 21. Accordingly, the absolute value of the aimed acceleration $DVS_7$ is a deceleration.

In this manner, in the control of steps D116 to D118, the aimed acceleration $DVS_7$ decreases in negative value as the rate in reduction in treadled amount of the accelerator pedal 27 increases as apparently seen from the relationship shown in FIG. 21.

At subsequent step D119, it is judged whether or not the changing rae DAPS of the accelerator pedal treadled amount APS is smaller than a preset negative reference value $K_9$ ($DAPS<K_9$). In case $DAPS<K_9$ is judged, it is determined that the change in reduction in treadled amount of the accelerator pedal 27 is greater, and the sequence advances to step D120. To the contrary, if $DAPS<K_9$ is not judged at step D119, it is determined that the change is smaller, and the sequence advances to step D121. In case the sequence advances from step D119 to step D120, the value of the counter CAPCNG is changed to 1, and then the sequence advances to step D121.

At step D121, an aimed acceleration $DVS_8$ corresponding to the value of the counter CAPCNG is read out from a map #MDVS8S. The map #MDVS8S is provided to find out an aimed acceleration $DVS_8$ during reduction in treadled amount of the accelerator pedal 27 using the value of the counter CAPCNG as a parameter. The value of the counter CAPCNG and the value of $DVS_8$ have such a relationship as illustrated in the map #MDVS8S shown in FIG. 22. It is to be noted that, since the aimed acceleration $DVS_8$ assumes a value equal to 0 or a negative value as seen in the map #MDVS8S of FIG. 22, it indicates a deceleration.

The value of the counter CAPCNG used at step D121 is set in the interrupt control of steps A118 to A120 of FIG. 8(ii) and is normally equal to 0 unless any value other than 0 is substituted into the counter CAPCNG. Then, when the value of the counter CAPCNG is equal to 0, the aimed acceleration $DVS_8$ read out from the map #MDVS8S at step D121 also assumes a value equal to 0 as apparently seen from the map #MDVS8S shown in FIG. 22. To the contrary, when the changing rate DAPS is smaller than the reference value $K_9$, the value of the counter CAPCNG is changed to 0 at step D120 as described hereinabove. Accordingly, while the changing rate DAPS remains smaller than the reference value $K_9$, the counter CAPCNG always has a value equal to 1, and in this instance, the aimed acceleration $DVS_8$ read out from the map #MDVS8S at step D121 has the smallest negative value in the map #MDVS8S as apparently seen from the map #MDVS8S shown in FIG. 22 and accordingly presents a maximum deceleration.

For example, if the value of the counter CAPCNG is changed to 1 at step D120 and then it is judged at step D119 to which the sequence advances again via step D112 in the subsequent next control cycle that DAPS<$K_9$ is not satisfied because reduction in treadled amount of the acceleratr pedal 27 has been moderated or interrupted, the sequence advances from step D119 to step D121. In this instance, since step D120 is bypassed, the value of the counter CAPCNG is a value determined in the interrupt control of steps A118 to A120 of FIG. 8(ii). In the interrupt control, the value of the counter CAPCNG added by 1 is designated as a new value of the counter CAPCNG at step A118.

At subsequent step A119, it is judged whether or not the value of the counter CAPCNG is equal to 1. However, since the value of the counter CAPCNG is updated to 2 at step D120 as described above, the sequence bypasses step A120 depending upin such judgment at step A119. Consequently, the value of the counter CAPCNG at a point of time when the present interrupt control is completed is equal to 2. Also in the following control cycle or cycles, the control at step D119 is executed. Thus, so long as the condition wherein DAPS<$K_9$ is not satisfied continues, the value of the counter CAPCNG is increased one by one in each such interrupt control as described above.

In case the sequence advances from step D112 to step D119 via step D115, the judgment at step D112 has revealed that the changing rate DAPS and the reference value $K_7$ do not have a relationship of DAPS>$K_7$ but have a relationship of DAPS≦$K_7$. Accordingly, the sequence advances from step D119 directly to step D121 when the changing rate DAPS has a value defined by $K_9$≦DAPS≦$K_7$. Further, since the reference value $K_7$ has a positive value while the reference value $K_9$ has a negative value as described hereinabove, if the treadled amount of the accelerator pedal 27 is kept constant, then the value of the counter CAPCNG is increased one by one as described hereinabove.

In this instance, the aimed acceleration $DVS_8$ read out from the map #MDVS8S at step D121 increases as the value of the counter CAPCNG increases and finally reaches 0 as apparently seen from the map #MDVS8S shown in FIG. 22. Accordingly, if the treadled amount of the accelerator pedal 27 is reduced and then the treadled amount is kept substantially fixed, then the value of the aimed acceleration $DVS_8$ having a negative value gradually approaches 0 as time passes.

In case the sequence advances from step D111 or D121 to step D122, either a sum total of the aimed accelerations $DVS_6$, $DVS_7$ and $DVS_8$ found out in the control of steps D105 to D111 or a sum total of the aimed accelerations $DVS_6$, $DVS_7$ and $DVS_8$ found out in the control of steps D115 to D121 is calculated as a general aimed acceleration DVS for the accelerator mode control.

Subsequently at step D123, an aimed torque $TOM_A$ necessary to attain the aimed acceleration DVS as an actual acceleration of the vehicle is calculated in the following equation (2):

$$TOM_A = \{[(W \cdot r/g) \cdot ks + ki] \cdot DVS + R' \cdot r\}/T_Q \qquad (2)$$

It is to be noted that W, r, g, ks, ki and $T_Q$ in the equation (2) above are same as those used in the equation (1) given hereinabove for description of the non-direct throttle movement control, and R' is a running resistance to running of the vehicle calculated in accordance with the following equation (3):

$$R' = \mu r \cdot W + Mair \cdot A \cdot VA^2 \qquad (3)$$

It is to be noted that, in the equation (3) above, $\mu r$ is a coefficient of rolling resistance of the vehicle, W is a car weight which is the same as that used in the equation (2) above, $\mu air$ is a coefficient of air resistance of the vehicle, A is a frontal projected area of the vehicle, and VA is an actual speed of the vehicle calculated in the interrupt control of steps A123 to A128 of FIG. 8(iv) and read in at step A103 of FIG. 8(i).

At step D124 to which the sequence advances from step D123, a throttle valve opening $\theta_{THA}$ corresponding to the aimed torque $TOM_A$ calculated at step D123 and the rotational speed $N_E$ of the engine 13 detected by the engine rotational speed detecting section 21 and read in at step A103 of FIG. 8(i) is read out from the map #MTH. The map #MTH is the same map as that used at step C131 of FIG. 10 for the non-direct throttle movement control described hereinabove.

At subsequent step D125, it is judged whether or not the flat $I_{11}$ is equal to 1. As described hereinabove, the flat $I_{11}$ indicates, when it assumes a value equal to 1, that the present control cycle is a control cycle in which opening or closing movement of the throttle valve 31 should be performed.

Since here the present control cycle is a control cycle in which such opening or closing movement should be performed when the flag $I_{11}$ has a value equal to 1, the sequence advances to step D126. On the contrary, if the value of the flag $I_{11}$ is not equal to 1, the present control cycle is not a control cycle in which such opening or closing movement is to be performed, and accordingly the sequence bypasses step D126, thereby completing the accelerator mode control in the present control cycle.

At step D126, a signal indicative of the throttle valve opening $\theta_{THA}$ read out at step D124 is delivered from the control section 25 to the throttle valve pivoting section 26. The throttle valve pivoting section 26 receives such signal at the actuator driving section 39 thereof and delivers a required driving signal (to pivot the throttle valve 31 to a position at which the throttle valve opening $\theta_{THA}$ is provided) to the throttle valve actuator 40. The throttle valve actuator 40 thus pivots the throttle valve 31 in response to the driving signal received.

In this instance, the opening of the throttle valve 31 is detected by the throttle valve opening detecting section 41, and results of the detection are fed to the actuator driving section 39 to effect feedback control.

After the throttle valve 31 is pivoted to a predetermined position, the actuator driving section 39 no more delivers the driving signal, and consequently, the throttle valve 31 is stopped at the predetermined position, thereby completing the accelerator mode control in the present control cycle.

By opening or closing of the intake air path 30 by the throttle valve 31 in this manner, the amount of air and the amount of fuel sucked into the engine 13 are changed to adjust the output power of the engine 13 as described above. Consequently, the vehicle is accelerated at an acceleration substantially equal to the aimed acceleration DVS.

As described so far, the accelerator mode control involves determination of an aimed acceleration in accordance with a treadled amount of the accelerator pedal 27, a changing rate of the treadled amount and the direction of such change of the treadled amount as well as opening or closing movement of the throttle valve 31 in accordance with the aimed acceleration thus determined to control the engine 13.

In particular, when the treadled amount APS of the accelerator pedal 27 is increased, the values of the three aimed accelerations of $DVS_6$, $DVS_7$ and $DVS_8$ from which the aimed acceleration DVS is to be calculated exhibit the following variations.

At first, the value of $DVS_6$ increases as the treadled amount APS increases because the value of $DVS_6$ is determined in accordance with such a relationship to the value of the treadled amount APS as illustrated in the map #MDVS60 of FIG. 20. Particularly, the faster the increase of the treadled amount APS proceeds, the greater the rate of increase of the value of $DVS_6$.

Meanwhile, the value of $DVS_7$ presents a greater value as the increase of the treadled amount APS proceeds at a higher speed because the value of $DVS_7$ is determined in accordance with such a relationship to the maximum value DAPMXO of the changing rate in treadled amount while the increase of the treadled amount APS continues as illustrated in the map #MDVS70 of FIG. 21.

On the other hand, because the value of $DVS_8$ is determined in accordance with such a relationship to the value of the counter CAPCNG as illustrated in the map #MDVS80 of FIG. 22, when the increase of the treadled amount APS proceeds at a rate higher than the reference level, the counter CAPCNG presents a value equal to 1, and the value of $DVS_8$ presents a maximum value.

Since the aimed accelerations $DVS_6$, $DVS_7$ and $DVS_8$ vary in such manners as described above, the faster the increase in treadled amount of the accelerator pedal proceeds, the quicker the vehicle makes an acceleration.

To the contrary, in case the increase in treadled amount is stopped and the treadled amount of the accelerator pedal 27 is kept at a fixed value, the aimed acceleratoins $DVS_6$, $DVS_7$ and $DVS_8$ present the following variations.

The value of $DVS_6$ presents a fixed value because it is determined in accordance with such a relationship to the treadled amount APS as illustrated in the map #MDVS60 of FIG. 20.

Meanwhile, the value of $DVS_7$ also remains constant because a value which has been determined in accordance with such a relationship as illustrated in the map #MDVS70 of FIG. 21 in a similar manner to that described above upon increase of the treadled amount before the treadled amount APS is kept constant is maintained as it is.

On the other hand, the value of $DVS_8$ is reduced gradually as time passes and finally reduced to 0 as illustrated in the map #MDVS80 of FIG. 22 because the value of the counter CAPCNG increases in accordance with a time elapsed after the increasing rate of the treadled amount APS has reduced to a value lower than the reference value.

Accordingly, in case the increase in treadled amount is stopped and the treadled amount of the accelerator pedal 27 is kept constant, the aimed acceleration DVS will gradually approach a fixed value.

In short, if the treadled amount APS of the accelerator pedal 27 is increased to a suitable level, then the acceleration varies smoothly from a quickly accelerating condition to a moderately accelerating condition.

To the contrary, if the treadled amount APS of the accelerator pedal 27 is decreased, then the values of the aimed accelerations $DVS_6$, $DVS_7$ and $DVS_8$ vary in the following manners.

The value of $DVS_6$ is determined in accordance with such a relationship to the treadled amount APS are illustrated in the map #MDVS6S of FIG. 20. Accordingly, the value of $DVS_6$ decreases as the treadled amount APS decreases. The rate of such reduction of $DVS_6$ increases as the speed of the reduction of the treadled amount APS increases.

Meanwhile, the value of $DVS_7$ is determined in accordance with such a relationship to the minimum value DAPMXS of the changing rate of the treadled amount (that is, the maximum value of the decreasing ratio) while the decrease of the treadled amount APS continues as illustrated in the map #MDVS7S of FIG. 21. Accordingly, the faster the decrease of the treadled amount APS proceeds, the smaller the value of $DVS_7$ (negative value having a small absolute value).

On the other hand, the value of $DVS_8$ presents a minimum value (negative value having a maximum absolute value) as illustrated in the map #MDVS8S of FIG. 22 when the decrease of the treadled amount APS proceeds at a speed higher than the reference value so that the value of the counter CAPCNG is changed to 1.

Accordingly, the faster the decrease of the treadled amount APS of the accelerator pedal 27, the earlier the acceleration of the vehicle decreases, and finally the vehicle is brought into a decelerated condition.

It is to be noted that the value of $DVS_6$ while the treadled amount is being increased is greater than the value of $DVS_6$ for a same treadled amount while the treadled amount is being decreased as seen from the maps #MDVS60 and #MDVS6S of FIG. 20.

Accordingly, even if the treadled amount is equal, quicker acceleration occurs when the treadled amount is being increased than when the treadled amount is being decreased.

Further, if the treadled amount is further decreased after the value of $DVS_6$ has been decreased to 0, the value of $DVS_6$ becomes negative, as seen from the map #MDVS6S of FIG. 20. Consequently, also the aimed acceleration DVS calculated from the aimed accelerations $DVS_6$, $DVS_7$ and $DVS_8$ become negative, and as a result, the vehicle is decelerated in accordance with the negative aimed acceleration.

To the contrary, in case the decrease oif the treadled amount APS is stopped and then the treadled amount of the accelerator pedal 27 is kept constant, the aimed accelerations present the following variations.

The value of $DVS_6$ exhibits a fixed value because it is determined in accordance with such a relationship to the treadled amount APS as illustrated in the map #MDVS6S of FIG. 20.

Meanwhile, the value of $DVS_7$ presents a fixed value because a value which has been determined in accordance with such a relationship to the minimum value DAPMXS of the changing rate of the treadled amount (that is, maximum value of the decreasing ratio) upon decrease of the treadled amount before the treadled amount APS is kept constant as illustrated in the map #MDVS7S of FIG. 21 is maintained as it is.

On the other hand, the value of $DVS_8$ increases gradually as time passes and finally becomes equal to 0 as illustrated in the map #MDVS8S of FIG. 22 because the value of the counter CAPCNG increases in accordance with a time elapsed after a point of time at which the decelerating rate of the treading amount APS becomes lower than the reference value.

When the treadled amount of the accelerator pedal 27 is decreased in this manner, the acceleration is decreased smoothly from the acceleration decreasing condition or the decelerating condition and transition to an accelerated condition at a fixed acceleration takes place.

The automatic cruise mode control at step C144 of FIG. 10 executed in the non-direct throttle movement control proceeds in accordance with the flow chart of steps E101 to E133 of FIG. 12.

The automatic cruise mode control is executed when neither of the accelerator pedal 27 and the brake pedal 28 is treadled in the non-direct throttle movement control described hereinabove.

Referring to FIG. 12, it is judged at first at step E101 whether or not the contact of the accelerator switch 15 was in an on-state in the preceding control cycle without the accelerator pedal 27 being treadled. In case the present cycle is a first cycle after the accelerator pedal 27 has been released and the contact of the accelerator switch 15 has been brought into an on-state, the sequence advances to step E102 depending upon such judgement at step E101. On the contrary, in case the accelerator pedal 27 was released and the contact of the accelerator switch 15 was already in an on-state already in the preceding control cycle, the sequence advances to step E110 depending upon such judgement at step E101.

Accordingly, the control in a first control cycle after the accelerator pedal 27 is treadled to effect acceleration of the vehicle and is then released is different from the control in control cycles following the first control cycle or in control cycles after the automatic cruise mode control is entered by releasing the brake pedal 28 while the accelerator pedal 27 is not treadled.

At step E102 to which the sequence advances in a first control cycle after the accelerator pedal 27 has been released, the value of a flag $I_4$ is charged to 0, and then the sequence advances to step E103. The flag $I_4$ indicates, when it assumes a value equal to 0, that constant speed running should be designated by the running condition designating section 3 of the control section 25.

At step E103, the value of a flag $I_6$ is changed to 0, and then the sequence advances to step E104. The flag $I_6$ indicates, when it assumes a value equal to 1, that the present control cycle is a first cycle after the contact of the changing over switch 46 has been brought into an on-state.

At step E104, the latest actual speed $VA_I$ calculated in the interrupt control at steps A123 to A128 of FIG. 8(iv) is read in as an actual speed of the vehicle directly after releasing of the accelerator pedal 27, and then at step E105, the actual speed $VA_I$ is substituted into the aimed speed VS.

Then at step E106, the value of a flag $I_8$ is changed to 0. The flag $I_8$ indicates, when it assumes a value equal to 0, that the speed of the vehicle is maintained substantially constant by the automatic cruise mode control.

Subsequently at step E107, an aimed torque $TOM_3$ of the engine 13 necessary to maintain the speed of the vehicle at the aimed speed VS is calculated in the following equation (4), and then the sequence advances to step E108.

$$TOM_3 = [\{(W \cdot r/g) \cdot ks + ki\} \cdot (DVS_3 - DVS_{65}) + T_Q \cdot TEM] / T_Q \qquad (4)$$

It is to be noted that the equation (4) above is substantially the same as the equation (1) used at step C130 in the flow chart of FIG. 10.

At step E108, a throttle valve opening $\theta_{TH3}$ corresponding to the aimed torque $TOM_3$ calculated at step E107 and the engine rotational speed $N_E$ detected by the engine rotational speed detecting section 18 and read in at step A103 of FIG. 8(i) is read out from the map #MTH described hereinabove.

Subsequently at step E109, a signal indicative of the throttle valve opening $\theta_{TH3}$ is delivered from the control section 25 to the actuator driving section 39 of the throttle valve pivoting section 26. Consequently, a required driving signal is delivered from the actuator driving section 39 to the throttle valve actuator 40 so that the throttle valve actuator 40 pivots the throttle valve 31. In this instance, the opening of the throttle valve 31 is fed back to the actuator driving section 39 by the throttle valve opening detecting section 41 to effect feedback control.

Then, after the throttle valve 31 is pivoted to a predetermined position, the actuator driving section 39 no more delivers the driving signal, and consequently the throttle valve 31 is stopped at the predetermined position, thereby completing the automatic cruise mode control in the present control cycle.

As the throttle valve 31 is operated to open or close the intake air path 30 in this manner, the amount of air sucked into the engine 13 and the amount of fuel supply is also changed. Consequently, a torque substantially equal to the aimed torque $TOM_3$ is produced from the engine 13.

The torque produced from the engine 13 in this manner is substantially equal to a torque necessary to maintain the speed of the vehicle at the aimed speed which is equal to the actual speed of the vehicle at a point of time directly after releasing of the accelerator pedal 17 as described hereinabove. Then, by the control at steps E104 to E109 described above, the throttle valve 31 is temporarily pivoted, directly after releasing of the accelerator pedal 27, to a position of a throttle valve opening which will maintain the speed of the vehicle directly after releasing of the accelerator pedal 27 even when the present control cycle is not a control cycle which fails on a timing at which opening or closing movement of the throttle valve 31 is to be performed in order to make preparations for subsequent transition to a constant speed running condition at the aimed speed.

Such pivotal motion of the throttle valve 31 by the control at steps E104 to E109 described above is substantially same as pivotal motion of the throttle valve 31 by the control at steps C121 and C129 to C132 of FIG. 10 in the non-direct throttle movement control described hereinabove, but only the difference resides in requirements for starting the control.

In case the sequence advances to step E101 either in a control cycle after such control as described above has been executed in a first control cycle after releasing of the accelerator pedal 27 or in a control cycle in which transition to the automatic cruise mode control is effected after the treadling of the brake pedal 28 has been canceled to execute the control at steps C121 and C129 to C132, the sequence advances to step E110 because the contact of the accelerator switch 15 was in an on-state also in the preceding control cycle. At step E110, it is judged whether or not the position of the acceleration switch 45 in the present control cycle is different from the position of the acceleration switch 45 in the preceding cycle.

In case the acceleration switch 45 has not been changed over, the sequence advances from step E110 to step E128 at which changing over switch control regarding the changing over switch 46 is executed.

The changing over switch control at step E128 is executed in accordance with the flow chart shown at steps F101 to F121 of FIG. 13 principally by the running condition changing over section 12, final aimed speed setting section 6 and final aimed speed modification controlling section 6a of the control section 25 in order to effect changing over of a running condition of the vehicle in response to operation of the changing over switch 44, modification of the final aimed speed of the vehicle when the running condition of the vehicle designated in response to operation of the changing over switch 44 is either an accelerated running condition or a decelerated running condition, and so on.

Referring to FIG. 13, at first at step F101, it is judged in accordance with the contact information read in at step A103 of FIG. 8(i) whether or not the contact of the changing over switch 46 is in an on-state. In case the changing over switch 46 has not been operated, the contact thereof is not in an on-state, and consequently, the sequence advances to step F111.

At step F111, the value of a flag $I_5$ is changed to 0, and then the sequence advances to step F112. The flag $I_5$ indicates, when it assumes a value equal to 1, that the contact of the changing over switch 46 was in an on-state in the preceding control cycle.

Then at step F112, the value of the flag $I_6$ is changed to 0.

The changing over switch control in the present control cycle is completed with this is case no operation of the changing over switch 46 has been made. The sequence thus advances to step E129 of FIG. 12 at which it is judged whether or not the value of a flag $I_4$ is equal to 1. The value of the flag $I_4$ is changed to 0 at step C145 of FIG. 10 or at a step E102 of FIG. 12 but is changed to 1 either in case the control when the contact of the changing over switch 46 is in an on-state is executed or in case the control when the position of the acceleration switch 45 is different from that in the preceding control cycle is executed in the changing over switch control at step E128. Accordingly, if neither of the changing over switch 46 and the acceleration switch 45 is operated, then the value of the flag $I_4$ is equal to 0, and the sequence thus advances to step E132 depending upon such judgement at step E129. It is to be noted that, in this instance, the designation by the running condition designating section 3 of the controlling section is constant speed running.

Then at step E132, it is judged, depending upon whether or not the value of the flag $I_6$ is equal to 1, whether or not the present control cycle is a first control cycle after the contact of the changing over switch 26 has been brought into an on-state. In case the changing over switch 46 has not been operated, the contact of the changing over switch 46 is not yet in an on-state and the flag $I_6$ has a value equal to 0. Thus, the sequence advances to step E133 at which aimed speed control is executed.

The aimed speed control involves control of changing the speed of the vehicle to approach the aimed speed when constant speed running is designated by the running condition designating section 3 and control of modifying the present value of the aimed speed by the aimed speed changing switch 46. The aimed speed control is executed in accordance with the flow chart of steps J101 to J116 of FIG. 16 principally by the constant speed controlling section 8 of the control section 25.

In short, in the aimed speed control, it is judged at first at step J101 whether or not the value of the flag $I_8$ is equal to 1. The value of the flag $I_8$ is changed to 1 at step C128 of FIG. 10 in case treadling of the brake pedal 26 is canceled to cause transition to a running condition of the vehicle by the automatic cruise mode control, but in case treadling of the accelerator pedal 26 is canceled to cause transition to a running condition of the vehicle by the automatic cruise mode control, the value of the flag $I_8$ is changed to 1 at step E106 of FIG. 12. Accordingly, in case the sequence advances to step J101 without making an operation of any of the acceleration switch 45 and the changing over switch 46 after transition to a running condition of the vehicle by the automatic cruise mode control, the sequence advances to step J102 depending upon such judgment at step J101.

At step J102, it is judged, depending upon whether or not the value of the flag $I_{11}$ is equal to 1, whether the present control cycle falls on a timing at which opening or closing movement of the throttle valve 31 should be performed. In case of the value of the flag $I_{11}$ is equal to 1, the sequence advances to step J103 at which control necessary for opening or closing movement of the throttle valve 31 is executed. To the contrary, in case the value of the flag $I_{11}$ is not equal to 1, the automatic cruise mode control for the present control cycle is completed.

After the sequence advances to next step J103 because the value of the flag $I_{11}$ is equal to 1 at step J102, the actual speed VA read in at step A103 of FIG. 8(i) is substituted into the aimed speed VS for constant speed running as a temporary value. Such setting of the aimed speed VS is made in preparation for control after the speed of the vehicle becomes substantially fixed, and such setting is thus executed before the speed of the vehicle becomes substantially constant. The set value is updated for each control cycle which falls on a timing for opening or closing movement of the throttle valve 31 until the speed of the vehicle becomes substantially fixed.

Then at step J104, it is judged whether or not the absolute value of the actual acceleration DVA for which the value of $DVA_{65}$ or $DVA_{130}$ has been designated by the control of steps C141 to C143 of FIG. 10 as described hereinabove is smaller than a preset reference value $K\alpha$, that is, $|DVA| < K\alpha$. In case the speed of the vehicle has become substantially fixed as a result of the aimed speed control involving reduction in acceleration of the vehicle, $|DVA| < K\alpha$ is judged at step J104, and the sequence thus advances to step J108 at which the value of the flag $I_8$ is changed to 0, whereafter the sequence advances to step J109. To the contrary, in case the speed of the vehicle has not yet become substantially fixed and the acceleration of the vehicle has not yet decreased, $|DVA_1| < K\alpha$ is not judged at step J104, and the sequence thus advances to step J105.

At step J105, it is judged, depending upon whether or not the actual acceleration DVA has a positive value, whether the vehicle is either in an accelerated condition or in a decelerated condition. In case the actual acceleration DVA has a positive value, the vehicle is in an accelerated condition, and accordingly, in order to put the vehicle into a constant speed running condition, the sequence advances to step J107 at which the value of a preset correction amount $\Delta DV_2$ subtracted from the actual acceleration DVA is set to the aimed acceleration DVS. To the contrary, in case the actual acceleration DVA has a negative value, the vehicle is in a decelerated condition, and accordingly, in order to put the vehicle into a constant speed running condition, the sequence advances to step J106 at which the value of the correction amount $\Delta DV_2$ added by the actuall acceleration DVA is set to the aimed acceleration DVS. The aimed speed control in the present control cycle is completed with this, and the sequence now advances to step E123 of FIG. 12.

At steps E123 to E127 of FIG. 12, control is executed for making the acceleration of the vehicle coincide with the aimed acceleration DVS. Accordingly, if the control of steps J101 to J107 of FIG. 16 is repeated before the speed of the vehicle becomes substantially fixed, the aimed acceleration DVS gradually approaches 0 so that the absolute value of the actuall acceleration DVS is decreased and the speed of the vehicle gradually approaches a fixed value.

Then, if $|DVA| < K\alpha$ is judged at step J104 of FIG. 16, the sequence advances to step J109 via step J108 as described hereinabove, and in the control cycle then, the aimed speed VS set at step J103 is used as an aimed speed in the control for constant speed running at step J109 to J116 described below.

To the contrary, in the following control cycle or cycles subsequent to a control cycle in which the sequence advances to step J109 via step J108, the automatic cruise mode control is executed continuously. Then, since the value of the flag $I_8$ remains 0 unless the acceleration switch 45 or the changing over switch 46 is operated, the sequence advances, depending upon such judgment at step J101, to step J109 at which the following control is executed.

At step J109, it is judged in accordance with the contact information read in at step A103 of FIG. 8(i) whether or not the aimed speed changing switch 48 of the automatic cruise switch 18 is in a position turned in the (+) direction in FIG. 6. In case it is judged that the (+) side contact of the aimed speed changing switch 48 is in an on-state, the sequence advances to step J110 at which the value of the aimed speed VS for the preceding control cycle added by a preset correction amount $VT_3$ is set as a new aimed speed VS, whereafter the sequence advances to step J113. To the contrary, if the (+) side contact of the aimed speed changing switch 48 is not in an on-state at step J109, the sequence advances to step J111.

At step J111, it is judged whether or not the aimed speed changing switch 48 is in a position turned in the (−) direction in FIG. 6. In case the (−) side contact of the aimed speed changing switch 48 is in an on-state, the sequence advances to step J112 at which the value of the aimed speed VS in the preceding control cycle subtracted by the correction amount $VT_3$ is set as a new aimed speed VS, whereafter the sequence advances to step J113. To the contrary, if the (−) side contact of the aimed speed changing switch 48 is not in an on-state at step J111, the sequence advances directly to step J113.

By such control at steps J109 to J112 as described above, mdification of the aimed speed VS by the aimed speed changing switch 48 is executed, and if the on-state of the (n+) side contact of the aimed speed changing switch 48 is continued, then the aimed speed VS is increased for each control cycle by the control at step J110. To the contrary, if the on-state of the (−) side contact of the aimed speed changing switch 48 is continued, the aimed speed VS is decreased for each control cycle by the control at step J112.

Thus, if such modification of the aimed speed VS by the aimed speed changing switch 48 as described above is executed and then the turning motion of the in the (+) or (−) direction in FIG. 6 is stopped whereafter the aimed speed changing switch 48 is returned to the intermediate stopping position, then the aimed speed VS modified in the just preceding control cycle will be employed as an aimed speed in the following control cycle or cycles. Accordingly, in case the aimed speed changing switch 48 is not operated at all after the sequence advances from step J104 to step J109 via step J108, the aimed speed VS set at step J103 will be employed as an aimed speed in the following control cycle or cycles.

Such modification of the aimed speed VS by the control at steps J109 to J112 as described above is performed only after the absolute value of the actual acceleration DVA has decreased to a value smaller than the reference value $K\alpha$ as described above. Accordingly, modification of the aimed speed VS by the aimed speed changing switch 48 is enabled only when the vehicle is in a constant speed running condition after the speed thereof has become substantially fixed.

Subsequently at step J113, a difference VS−VA between the aimed speed VS and the actual speed VS read in at step A103 of FIG. 8(i) is calculated, whereafter the sequence advances to step J1149

At step J114, control of high stability is required rather than control of high responsibility because the speed of the vehicle is alread substantially constant. Accordingly, among the three actual accelerations $DVA_{65}$, $DVA_{130}$ and $DVA_{850}$ calculated in the interrupt control of step A123 to A128 of FIG. 8(iv) and read in at step A103 of FIG. 8(i), the actual acceleration $DVA_{850}$ which has a highest stability as described hereinabove is designated as a value of the actual acceleration DVA which is to be used at step E123 of FIG 12 which will be hereinafter described.

Then at step J115, an aimed acceleration $DVS_4$ corresponding to the difference VS−VA between the aimed speed VS and the actual speed VA calculated at step J113 is found out by control executed in accordance with the flow chart of steps M101 to M106 of FIG .18. Then at step J116, the aimed acceleration $DVS_4$ is substituted as a value of the aimed acceleration DVS which is to be used at step E123 of FIG. 12 which will be hereinafter described, thereby completing the present aimed speed control. The sequence then advances to step E123 of FIG. 12.

Determination of the aimed acceleration $DVS_4$ at step J115 is performed in accordance with the flow chart shown in FIG. 18 by the constant speed controlling section 8 of the control section 25. Referring to FIG. 18, at first at step M101, an aimed acceleration $DVS_3$ corresponding to the difference VS−VA calculated at step J113 of FIG. 16 is read out from a map #MDVS3. The map #MDVS3 is provided to find out an aimed acceleration DVS3 using the difference VS−VA as a parameter. The difference VS−VA and the aimed acceleration $DVS_3$ have such a relationship as illustrated in FIG. 23.

Figure 24:
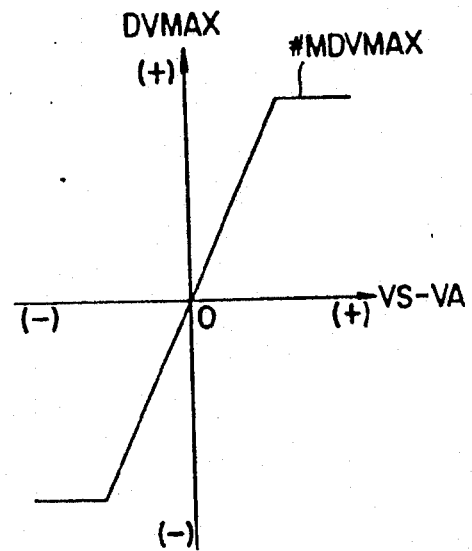

Subsequently at step M102, an acceleration allowance DVMAX corresponding to thee difference VS−VA is read out from a map #MDVMAX. The map #MDVMAX is provided to find out an acceleration allowance DVMAX using the difference VS−VA as a parameter. The difference VS−VA and the acceleration allowance DVMAX have such a relationship as illustrated in FIG. 24.

Then at step M103, the value of the aimed acceleration $DVS_3$ subtracted by the value of $DVS_{850}$ designated as the actual acceleration DVA at step J114 of FIG. 16 (that is, the value of $DVS_3-DVA$) is calculated as an acceleration difference DVX. Then at subsequent step M104, it is judged whether or not the acceleration difference DVX is smaller than the acceleration allowance DVMAX (DVX<DVMAX).

In case DVX<DVMAX is judged at step M1048 the sequence advances to step M105 at which the aimed acceleration $DVS_3$ is designated as as aimed acceleration $DVS_4$. To the contrary, if DVS<DVMAX is not judged at step M104, the sequence advances to step M106 at which the actual speed DVA added by the acceleration allowance DVMAX is designated as an aimed acceleration $DVS_4$.

By making a determination of the aimed acceleration $DVS_4$ by such control of steps M101 to M106 as described above, the amount of variation of the aimed acceleration $DVS_4$ is restricted within the acceleration allowance DVMAX. Accordingly, a change in acceleration of the vehicle which is performed to restore a speed of the vehicle which has suddenly changed by some causes during constant speed running of the vehicle will proceed moderately.

In case the sequence advances to step E123 of FIG. 12 either after the aimed acceleration $DVS_4$ determined in value by the control of steps M101 to M106 has been substituted into the aimed acceleration DVS at step J116 of FIG. 16 or after the value of the aimed acceleration DVS has been set by the control of step J106 or J107, an aimed torque $TOM_2$ of the engine 13 necessary to make the acceleration of the vehicle equal to the aimed acceleration DVS is calculated in accordance with the following equation (5):

$$TOM_2 = [\{(W \cdot r/g) \cdot k_3 + k_i\}(DVS - DVA) + t_Q \cdot TEM]/T_Q \quad (5)$$

It it is to be noted that the equation (5) above is subtantially same as the equation (1) or (4) given hereinabove, but, in case the sequence advances from step J106 or J107 of FIG. 16 to step E123, DVA in the equation (5) is the value designated by the control of steps C141 to C143 of FIG. 10. To the contrary, in case the sequence advances from step J116 of FIG. 16 to step E123, DVA in the equation (5) is $DVA_{850}$ designated at step J114 of FIG. 16.

After then, the sequence advances to step E124 at which a throttle valve opening $\theta_{TH2}$ corresponding to the aimed torque $TOM_2$ calculated at step E123 and the engine rotational speed $N_E$ detected by the engine rotational speed detecting section 21 and read in at step A103 or FIG. 8(i) is read out from the aforementioned map #MTH (not shown), and then the sequence advances to step E125.

The control at steps E123 and E124 is executed commonly by the constant speed controlling section 8, acceleration controlling section 9 and deceleration controlling section 10 of the control section 25. Thus, in case the sequence advances from step E133 to step E123, control is executed at steps E123 and E124 by the constant speed controlling section 8 to set a throttle valve opening $\theta_{TH2}$ as described above.

Subsequently at step E125, it is judged whether or not the value of the flag $I_{11}$ is equal to 1. In case $I_{11}=1$ is judged, then the sequence advances to step E126 because the present control cycle falls on a timing at which opening or closing movement of the throttle valve 31 should be performed. To the contrary, if $I_{11}=1$ is not judged, the present control cycle does not fall on such timing, and accordingly, the automatic cruise mode control for the present control cycle is completed without performing opening or closing movement of the throttle valve 31.

In case the sequence advances to step E126, the throttle valve 31 is pivoted, in a similar manner as at step E109, to a position which provides the throttle valve opening $\theta_{TH2}$ determined at step E124. Consequently, a torque substantially equal to the aimed torque $TOM_2$ is produced from the engine 13. Then, since such opening or closing movement of the throttle valve 31 in the present control cycle falls on a timing for opening or closing movement, the value of the flag $I_{12}$ is changed to 0 at subsequent step E127, thereby completing the automatic cruise mode control in the present control cycle.

As described above, either if treadling of the accelerator pedal 27 is canceled in a released condition of the brake pedal 28 or if treadling of the brake pedal 28 is canceled in a released condition of the accelerator pedal 27, then transition to a running condition by the automatic cruise mode control takes place, and then if neither of the acceleration switch 45 and the changing over switch 46 is operated, then the throttle valve 31 is temporarily pivoted directly after such canceling so that the speed of the vehicle directly after canceling of treadling of the accelerator pedal 27 or the brake pedal 28 may be maintained. Then, after transition to the automatic cruise mode control, the throttle valve 31 is pivoted, for each timing for opening or closing movement of the throttle valve 31, in accordance with a throttle valve opening set by the constant speed controlling section 8 of the control section 25.

In particular, since, even if such pivotal motion of the throttle valve 31 that may assure maintenance of the speed of the vehicle directly after releasing of the pedal 27 or 28 is performed temporarily without waiting a controlling cycle which falls on a timing for opening or closing movement of the throttle valve 31 after canceling of treadling of the pedal 27 or 28, the speed of the vehicle varies to some degree after then, the throttle valve 31 is pivoted for each control cycle which falls on a timing for opening or closing movement of the throttle valve 31, thereby reducing variation in speed of the vehicle until a substantially fixed speed is finally reached.

Accordingly, in case neither of the acceleration switch 45 and the changing over switch 46 is operated after canceling of treading of the pedal 27 or 28, the following control takes place except an instance wherein more sudden braking than a reference level by the brake (not shown) continues for an interval of time longer than the reference interval of time and the speed of the vehicle upon ending of such braking is lower than the reference value.

In short, a throttle valve opening is set by the constant speed controlling section (not shown) of the control section 25 so that such an output power may be obtained from the engine 13 that a speed of the vehicle substantially equal to the speed of the vehicle at a point of time when the designation by the running condition designating section 3 of the control section 25 is changed to constant speed running (at an instant at which treadling of the pedal is canceled) can be maintained. Then, the throttle valve 31 is pivoted for each timing for opening or closing movement thereof in accordance with the throttle valve opening, and as a result, the vehicle makes constant speed running at a predetermined speed.

After the speed of the vehicle has become substantially fixed by such pivotal motion of the throttle valve 31, it is enabled to modify the aimed speed of the vehicle during constant speed running by operation of the aimed speed changing switch 48, and an amount of variation of the aimed speed of the vehicle can be obtained which increases in proportion to the duration of a condition wherein the aimed speed changing switch 48 is held turned in the (+) direction or in the (−) direction in FIG. 6.

After transition to a running condition of the vehicle by the automatic cruise mode control, if neither of the acceleration switch 45 and the changing over switch 46 is operated, then the control is such as described above. Now, control when the acceleration switch 45 or the changing over switch 46 is operated after such transition as described above is described.

In case the acceleration switch 45 is operated so that it is changed over to any one of the positions [b] to [d] shown in FIG. 6 after the speed of the vehicle has become substantially fixed by the control described above after transition to a running condition of the vehicle by the automatic cruise mode control, the sequence advances via step E101 of FIG. 12 to step E110 at which it is judged whether or not the position of the acceleration switch 45 has been changed from that in the preceding control cycle as described hereinabove.

In case the sequence advances to step E110 in a first cycle after the position of the acceleration switch 45 has been changed, the sequence advances, depending upon such judgment at step E110, to step E111 at which the value of the flag $I_5$ is changed to 0 and then to step E112 at which the value of a flag $I_9$ is changed to 0, whereafter the sequence advances to step E114. It is to be noted that the flag $I_9$ indicates, when it assumes a value equal to 1, that control for smoothly raising the acceleration of the vehicle to an aimed acceleration set in accordance with the position of the acceleration switch 45 after changing of the designation by the running condition designating section 3 of the control section 25 to accelerated running as a result of operation of the acceleration switch 45 or the changing over switch 46 was executed already in the preceding control cycle.

At step E114, it is judged in accordance with the contact information read in at step A103 of FIG. 8(i) in the present control cycle whether or not the position of the acceleration switch 45 is [a] in FIG. 6. In case it is judged that the position is [a], the sequence advances to step E115, but on the contrart if it is judged that the position is not [a], then the sequence advances to step E116.

In case the sequence advances to step E116, the designation by the running condition designating section 3 of the control section 25 has been changed over to accelerated running and the value of the flag $I_4$ is changed to 1. Then at step E117, the value of the flag $I_8$ is changed to 0, whereafter the sequence advances to step E118.

It is to be noted that the control cycle then is a first control cycle after the position of the acceleration 45 has been changed and opening or closing movement of the throttle valve 31 is not yet performed after such changing. Thus, the value of the flag $I_{12}$ is changed to 0 at step E118, and then at step E119, the value $DVA_{65}$ read in at step A103 of FIG. 8(i) is adopted as a value of the actual acceleration DVA to be used subsequently in the present control cycle from a similar reason as at step E118. After then, the sequence advances to step E120.

At step E120, a final aimed speed VS of the vehicle which is an aimed value of the speed of the vehicle after acceleration is set by the final aimed speed setting section 6 of the control section 25. The value of VS is set to a value of the sum between a preset correction amount $V_{K1}$ and the actual speed VA detected by the speed/acceleration detecting section 24 and read in by the control section 25 (refer to step A103 of FIG. 8(i)) in the present control cycle.

Then, the sequence advances to step E121 at which the aimed acceleration setting section 4 of the control section 25 executes acceleration switch control in accordance with the flow chart of steps G101 to G105 shown in FIG. 14. In the acceleration switch control, a value of an aimed acceleration $DVS_2$ is set in accordance with the position [b], [c] or [d] of the acceleration switch 45 shown in FIG. 6.

In short, it is judged at steps G101 and G103 of FIG. 14 at which one of positions [b], [c] and [d] the acceleration switch 45 is, and setting of the value of the acceleration $DVS_2$ is executed at step G102, G104 and G105 for the individual positions [b], [c] and [d].

In particular, referring to FIG. 14, it is judged at first at step G101 whether or not the acceleration switch 45 is at the position [b] shown in FIG. 6, and in case the acceleration switch 45 is at the position [b], the sequence advances to step G102 at which a value DVSb set in advance for the position [b] is substituted into the aimed acceleration $DVS_2$. To the contrary, in case it is judged at step G101 that the acceleration switch 45 is not at the position [b], the sequence advances to step G103 at which it is judged whether or not the acceleration switch 45 is at the position [c] shown in FIG. 6. In case it is judged that the acceleration switch 45 is at the position [c], the sequence advances to step G104 at which a value DVSc set in advance for the position [c] is substituted into the aimed acceleration $DVS_2$.

To the contrary, in case it is judged at step G103 that the accdeleration switch 45 is not at the position [c], this means that the acceleration switch 45 is at the position [d] 8 and accordingly, a value DVSd set in advance for the position [d] is substituted into the aimed acceleration $DVS_2$. It is to be noted that the reason why it can be judged at step G103 that the acceleration switch 45 is at the position [d] is that it has been judged already at step E114 of FIG. 12 before the acceleration switch control is entered that the position of the acceleration switch 45 is not ⓐ and it has been judged already at steps G101 and G103 that the position of the acceleration switch 45 is neither ⓑ nor ⓒ.

Setting of a value of the aimed acceleration DVS$_2$ corresponding to the position of the acceleration switch 45 is executed in this manner. However, since the aimed acceleration DVS$_2$ is an aimed value of the acceleration of the vehicle when it becomes fixed after acceleration /-has been started as a result of designation of accelerated running by the running condition designating section 3 of the control section 25, one of the three accelerated conditions (DVSb, DVSc and DVSd) of the vehicle is selected in accordance with the position ⓑ, ⓒ or ⓓ of the acceleration switch 45. Such DVSb, DVSc and DVSd have values having a relationship of DVSb<DVSc<DVSd and corresponding to moderate acceleration, imtermediate acceleration and quick acceleration, respectively.

The acceleration switch control is thus completed, and the sequence then advances to step E122 of FIG. 12 at which acceleration control is executed principally by the acceleration controlling section 9 of the control section 25.

The acceleration control is executed in accordance with the position of the acceleration switch 45 when accelerated running is designated by the running condition designating section 3 of the control section 25 as described hereinabove. Inthe acceleration control, the acceleration of the vehicle is raised smoothly to the aimed acceleration DVS$_2$ designated in accordance with the position (ⓑ, ⓒ or ⓓ) of the acceleration switch 45 by the aimed acceleration setting section. By such accelerated running, the change in acceleration is made smooth when the speed of the vehicle reaches the final aimed speed set by the final aimed speed setting section 6 and the final aimed speed modification controlling section 6a of the control section 25.

Such acceleration control is executed in accordance with the flow char illustrated at steps L101 to L120 of FIG. 17.

Referring to FIG. 17, it is judged at first at step L101 whether or not the actual speed VA read in at step A103 of FIG. 8(i) is greater than the preset reference value K$_5$ (VA>K$_5$). In case VA>K$_5$ is judged, the sequence advances directly to step L104, but on the contrary if VA>K$_5$ is not judged, the sequence advances to step L104 via steps S102 and L103.

In case the sequence advances from step L101 to L102, an aimed acceleration DVSAC corresponding to the actual speed VA and the position of the acceleration switch 45 as represented by the contact information read in at step A103 of FIG. 8(i) is read out from a map #MDVSAC.

Figure 26:
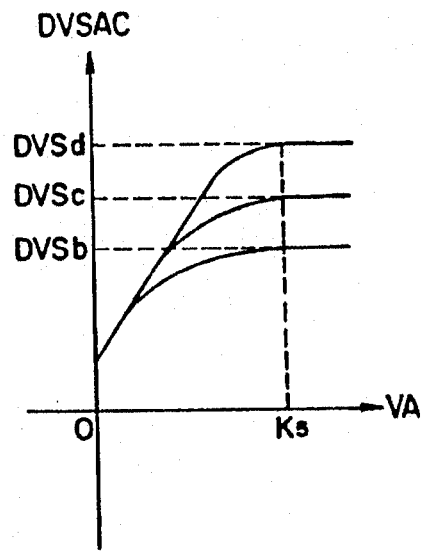

The map #MDVSAC is provided to find out an aimed accelerated DVSAC using the actual speed VA and the position of the acceleration switch 45 as parameters. The actual speed VA and the position of the acceleration switch 45 have such a relationship to the aimed acceleration DVSAC as illustrated in FIG. 26.

In particular, while the actual speed VA varies from 0 to the reference value K$_5$, the aimd acceleration DVSAC increases in a corresponding relationship to an increase of the actual speed VA for each of the positions ⓑ to ⓓ of the acceleration switch 45 shown in FIG. 6. Thus, when the actual speed VA becomes equal to the reference value K$_5$, the value of the aimed acceleration DVSAC becomes equal to the value of the aimed acceleration DVS$_2$ set for each of the position ⓑ to ⓓ of the acceleration switch 45 in the acceleration switch control (refer to FIG. 14) at step E121 of FIG. 12.

Then, the sequence advances to step L103 at which the value of the aimed acceleration DVS$_2$ set by the acceleratoin switch control is changed to DVSAC read out at step L102, and then the sequence advances to step L104.

In short, when the speed of the vehicle is higher than the reference value K$_5$, the value of the aimed acceleration DVS$_2$ remains the value set in the acceleration switch control. To the contrary, when the speed of the vehicle is lower than the reference value K$_5$ as at a time directly after starting, the value of the aimed acceleration DVS$_2$ increases as the speed increases, and a value smaller than the value set in the acceleration switch control is used as the value of the aimed acceleraton DVS$_2$.

Subsequently at step L104, it is judged whether or not the value of the flag I$_{11}$ is equal to 1. The flag I$_{11}$ indictes, when it assumes a value equal to 1, that the present control cycle falls on a timing at which opening or closing movement of the throttle valve 31 should be performed (a throttle valve opening/closing timing cycle) as described hereinabove. In case it is judged at step L104 that the value of the flag I$_{11}$ is not equal to 1, the acceleration control in the present control cycle is completed immediately because the present control cycle does not fall on a throttle valve opening/closing timing cycle.

To the contrary, in case it is judged at step L104 that the value I$_{11}$ is equal to 1, this means that the present control cycle falls on a throttle valve opening/closing timing cycle, and the sequence advances to step L105 to continuously execute the acceleration control.

At step L105, it is judged whether or not the value of a flag I$_9$ is equal to 1. The flag I$_9$ indicates, when it assumes a value equal to 1, that control at step L108 or L110 which will be hereinafter described was executed in the preceding control cycle. In case the sequence advances to step L105 for the first time after changing over of the acceleration switch 45 has been effected, it is judged at step L105 that the value of the flag I$_9$ is not equal to 1 because the value of the flag I$_9$ has been changed to 0 at step E113 of FIG. 12 as described hereinabove, and the sequence thus advances to step L106.

At step L106, the value of a flag I$_{13}$ is changed to 0, and then the sequence advances to step L107. The flage I$_{13}$ indicates, when it assumes a value equal to 1, that an aimed acceleration DVS$_1$ designated in value at step L108 or step L110 which will be hereinafter described and the aimed acceleration DVS$_2$ set in the acceleration switch control do not have a relationship of DVS$_1$<DVS$_2$.

At subsequent step L107, the value of the flag I$_9$ is changed to 1, and then the sequence advance to step L108.

At step L108, a sum of the actual acceleration DVA into which DVS$_{65}$ has been substituted at step E119 of FIG. 12 and the preset correction amount $\Delta$DV$_1$ DVA+$\Delta$DV$_1$) is designated as a value of the aimed acceleration DVS$_1$, and then the sequence advances to step L111.

At step L111, it is judged whether or not the two aimed accelerations DVS$_1$ and DVS$_2$ set in this manner have a relationship of DVS$_1$<DVS$_2$. In case there is no significant difference between the actual acceleration DVA and the aimed acceleration $DVS_2$ and consequently it is judged at step L111 that the aimed acceleration $DVS_1$ and the aimed acceleration $DVS_2$ do not have a relationship of $DVS_1 < DVS_2$, the sequence advances to step L113 at which the value of the flag $I_{13}$ is changed to 1, whereafter the sequence advances to step L114.

To the contrary, in case it is judged at step L111 that the relationship of $DVS_1 < DVS_2$ is satisfied, the sequence advances to step L112 at which the aimed acceleration $DVS_1$ is designated as a value of the aimed acceleration DVS which is to be used for accelerated running of the vehicle in the automatic cruise mode control in the present control cycle.

It is to be noted that, in case the present control cycle is a control cycle in which the sequence advances to step L105 for the first time after the acceleration switch 45 has been changed over to any one of the positions ⓑ to ⓓ in FIG. 6 and further changing over of the acceleration switch 45 is not performed so that the acceleration control is executed continuously in the following control cycle as described hereinabove, since the flag $I_9$ have been changed to 1 in value at step L107 in the present control cycle, the sequence will advance, in the following control cycle, to step L109 depending upon such judgment at step L105.

At step L109, it is judged whether or not the value of the flag $I_{13}$ is eqaul to 1. Here, in case the sequence advanced from step L111 to step L113 in one of the preceding cycles to change the value of the flag $I_{13}$ to 1, the sequence now advances fromstep L109 to L114. To the contrary, in case the sequence did not advance from step L111 to step L113 in the preceding control cycles, the sequence advances to step L110 because the value of the flag $I_{13}$ is not equal to 1.

At step L110, a sum of the value of the aimed acceleration $DVS_1$ in the preceding cycle and the correction amount $\Delta DV_1$ is designated as a new value of the aimed acceleration $DVS_1$, and then the sequence advances to step L111.

Accordingly, the value of the aimed acceleration $DVS_1$ is increased in proportionn to a time elapsed as the sequence advances repetitively to step L110 until it is judged at step L109 tha the value of the flag $I_{13}$ is equal to 1.

Then, if the aimed acceleration $DVS_1$ increases until it is judged at step L111 that the relationship of $DVS_1 < DVS_2$ is satisfied no more, the sequence now advances from step L111 to L113 at which the value of the flag $I_{13}$ is changed to 1. Consequently, in the following control cycle, the sequence will advance from step L109 to L114 so that the value of the aimed acceleration $DVS_1$ may not increase any more.

To the contrary, the aimed acceleration $DVS_1$ the value of which increases in such a manner as described above is designated as a value of the aimed acceleration DVS at step L112 until it is judged at step L111 that the relationship $DVS_1 < DVS_2$ is satisfied no more. However, if $DVS_1 < DVS_2$ is not judged at step L111, then the sequence will advance to step L114 in the following cycle as described above. Accordingly, such designation of $DVS = DVS_1$ does not take place any more.

After the sequence advances to step L114, a difference $VS - VA$ between the final aimed speed VS set in value at step E120 of FIG. 12 and the actual speed VA read in at step A103 of FIG. 8 (i) is calculated. Then at subsequent step L115, an aimed acceleration $DVS_3$ corresponding to the difference $VS - VA$ is read out from the map #MDVS3.

The map #MDVS3 is provided to find out an aimed acceleration $DVS_3$ using the difference $VS - VA$ as a parameter as described hereinabove, and the difference $VS - VA$ and the aimed acceleration $DVS_3$ have such a relationship as illustrated in FIG. 23.

Then the sequence advances to step L116. At step L116, it is judged whether or not the aimed acceleration $DVS_2$ and the aimed acceleration $DVS_3$ have a relationship of $DVS_2 < DVS_3$. Here, if it is judged that the relationship $DVS_2 < DVS_3$ is satisfied, then the sequence advances to step L117 at which the aimed acceleration $DVS_2$ is designated as a value of the aimed acceleration DVS, thereby completing the acceleration control. To the contrary, in case it is judged at step L116 that the relationship $DVS_2 < DVS_3$ is not satisfied the sequence advances to step L118 at which it is judged by the final condition detecting section 11 of the control section 25 whether or not the absolute value $|VS - VA|$ of the difference $VS - VA$ is smaller than a preset reference value $K_4$.

As shown in FIG. 23, when the value of the difference $VS - V_S$ is equal to the correction amount $V_{K1}$ correction amount added to the actual speed VA in order to set the final aimed speed VS at step E120 of FIG. 12), an aimed acceleration $DVS_3$ determined in accordance with the map #DVS3 has a greater value than the aimed acceleration $DVS_2$.

Accordingly, in case the sequence advances to step L116 in a control cycle in which the sequence has advanced to step L116 for the first time after changing over of the acceleration switch 45, the difference $VS - VA$ is substantially equal to the correction amount $V_{K1}$. Consequently, $DVS_2 < DVS_3$ is judged at step L116, and the sequence advances to step L117.

To the contrary, if changing over of the acceleration switch 45 does not take place and the acceleration control is continued to accelerate the vehicle in such a manner as hereinafter described in the following control cycle, the actual speed VA approaches the final aimed speed VS so tha the value of the difference $VS - VA$ decreases. In response to such decrease of the difference VS-VA, the aimed acceleration $DVS_3$ is decreased as seen in FIG. 23.

Then, if the difference $VS - VA$ becomes smaller than $V\alpha$ shown in FIG. 23 and the aimed acceleration $DVS_3$ becomes smaller than the aimed acceleration $DVS_2$, then the sequence advances to step L118 depending upon such judgment at step L116.

Here, in case it is judged at step L118 that a relationship of $|VS - VA| < K_4$ is not satisfied, the sequence directly advances to step L119, but on the contrary if it is judged that the relationship of $|VS - VA| < K_4$ is satisfied, the sequence advances to step L119 via step L120 as it is determined that the speed of the vehicle has reached the final aimed speed. At step L119, the aimed acceleration $DVS_3$ is designated as a value of the aimed acceleration DVS, thereby completing the acceleration control.

Accordinbgly, in a control cycle after the aimed acceleration $DVS_3$ has become smaller than the aimed acceleration $DVS_2$, the aimed acceleration $DVS_3$ is designated as a value of the aimed acceleration DVS. Since the aimed acceleration DVS is an aimed value of the acceleration upon accelerated running of the vehicle, after the aimed acceleration $DVS_3$ is designated, the actual acceleration decreases as the actual spped VA approaches the final aimed speed VS.

After the actual speed VA becomes substantially equal to the final aimed speed VS. $|VS-VA|<K_4$ is judged at step L118, and the sequence advances to step L120 as described hereinabove.

Such judgment detects that the final aimed speed VS has been reached by the speed of the vehicle as a result of accelerated running. Thus, after such detection is achieved, the value of the flag $I_4$ is changed to 0 at step L120 by the running condition changing over section 12 of the control section 25 in order to change the designation by the running condition designating section 3 of the control section 25 to constant speed running at the final aimed speed VS. It is to be noted that the flag $I_4$ indicates, when it assumes a value equal to 0, that designation of the running condition designating section 3 should be changed to constant speed running.

After completion of the acceleration control at step E122 of FIG. 12 in such a manner as described above, the sequence advances to step E123 at which an aimed torque $TOM_2$ of the engine 13 necessary to make the acceleration of the vehicle equal to the aimed acceleration DVS is calculated as described hereinabove in accordance with the equation (5) given hereinabove.

Then at step E124, a throttle valve opening $\theta_{TH2}$ with which the aimed torque $TOM_2$ can be obtained from the engine 13 is determined, and then the sequence advances to step E125. It is to be noted that, when the designation by the running condition desiganting section 3 of the control section 25 is accelerted running, the control at step E123 and step E124 is executed by the acceleraton controlling section 9 of the control section 25 in such a manner as described hereinabove.

The sequence advances from step E122 to step E125 via steps E123 and E124 in case it is judged at step L104 of FIG. 17 that the value of the flag $I_{11}$ is equal to 1. Accordingly, $I_{11}=1$ is judged at step E125, and the squence advances to step E126 at which the throttle valve 31 is actuated to a position provided by the throttle valve opening $\theta_{TH2}$ in such a manner as described hereinabove.

Then at subsequent step E127, the value of the flag $I_{12}$ is changed to 1, thereby completing the automatic cruise mode control in the present control cycle.

Since a torque substantially equal to the aimed torque $TOM_2$ is produced from the engine 13 by actuating the throttle valve in such a manner as as described, the vehicle makes accelerated running at an acceleration substantially equal to the aimed acceleration DVS.

While a control cycle wherein the sequence advances to step E116 via steps E110 to E114 in such a manner as described above is executed in response to changing over of the acceleration switch 45 to one of the positions [b] to [d] in FIG. 6, if neither of the acceleration switch 45 and the changing over switch 46 is operated, the automatic cruise mode control will be executed continuously in the following control cycle. In this instance, it is judged at first at step E101 of FIG. 12 that the contact of the accelerator switch 15 has been in an on-state, and the sequence thus advances to step E110. This is because, also in the preceding cycle, the accelerator pedal 27 was not treadled and the automatic cruise mode control was executed.

At step E110, it is judged whether or not the position of the acceleration switch 45 has been changed from tha tin the preceding control cycle as described hereinabove. Here, since the acceleration switch 45 has not been operated, the judgment is in the negative and the sequence thus advances to step E128 at which the changing over switch control related to the changing over switch 46 is executed.

Such changing over switch control is executed in accordance with the flow chart shown at steps F101 to F121 of FIG. 13 as described hereinabove.

Referring to FIG. 13, at first at step F101, it is judged whether or not the contact of the changing over switch 46 is in an on-state. Since here the changing over switch 46 is not operated, the contact of the changing over switch 46 is not in an on-state, and the judgment at step F101 is in the negative. The sequence thus advances to step F111 at which the value of the flag $I_5$ is changed to 0.

Then at subsequent step F112, the value of the flag $I_6$ is changed to 0, thereby completing the changing over switch control in the present control cycle.

It is to be noted that, although described hereinabove, the flag $I_5$ indicates, when it assumes a value equal to 1, that the contact of the changing over switch 46 was in an on-state in the preceding control cycle, and the flag $I_6$ indicates, when it assumes a value equal to 1, that the present control cycle is a first control cycle after the contact of the changing over switch 46 has been changed to an on-state.

Then, the sequence advances to step E129 of FIG. 12 at which it is judged whether or not the value of the flag $I_4$ is equal to 1. The flag $I_4$ indicates, when it assumes the value equal to 0, that the designation by the running codition designating section 3 of the control section 25 should be constant speed running as described hereinabove. Since here the value of the flag $I_4$ was changed to 1 at step E116 in the first control cycle after changing over of the acceleration switch 45 to any one of the positions [b] to [d] shown in FIG. 6, so long as the accelerated running of the vehicle continues, the judgment at step E129 remains in the affirmative, and the sequence advances to step E130.

To the contrary, if the vehicle is accelerated until the running speed reaches the final aimed speed VS as described hereinabove, the value of the flag $I_4$ is changed to 0 at step L120 of FIG. 17 by the running condition changing over section 12 of the control section 25. Consequently, the judgment at step E129 becomes in the negative, and the sequence advances to step E132. It is to be noted thatm in this instance, the disignation by the running condition designating station 3 of the ocntrol section 25 is changed over to constant speed running.

To the contrary, in case the sequence advances from step E129 to step E130, it is judged at step E130 whether or not the position of the acceleration switch 45 is [a]. Since here at step E130 the acceleration switch 45 is at any one of the positions [b] to [d], the judgment is in the negative, and the sequence advances to step E121 at which acceleration switch control is executed.

The acceleration switch control is executed in accordance with the flow chart shown at steps G101 to G105 of FIG. 14 by the aimed acceleration setting section 4 of the control section 25 to accomplish setting of an aimed acceleration $DVS_2$ corresponding to the position of the acceleration switch 45 as described hereinabove.

Then at step E122, acceleration control is executed in accordance with the flow chart shown at steps L101 to L120 of FIG. 17 principally by the acceleration controlling section 9 of the control section 25 to effect setting of an aimed acceleration DVS for acceleration running of the vehicle as described hereinabove. In case such setting of an aimed acceleration is effected when the present control cycle falls on a timing at which opening or closing movement is to be performed, opening or closing movement of the throttle valve 31 is subsequently performed at steps E123 to E127 as described hereinabove so that the vehicle makes accelerated running at an acceleration substantially equal to the aimed acceleration DVS.

After the running speed of the vehicle reaches the final aimed speed VS as a result of accelerated running, the designation by the running condition designating section 3 of the control section 25 is changed over to constant speed running as described hereinabove, and then the sequence advances from step E129 to step E132. At step E132, it is judged whether or not the value of the flag $I_6$ is equal to 1. Since the flag $I_6$ has been changed to 0 in value at step F112 of FIG. 13, the sequence advances from step E132 to step E133 at which aimed speed control is executed.

The aimed speed control is executed in accordance with the flow chart shown at steps J101 to J116 of FIG. 16 principally by the constant speed controlling section 8 of the control section 25 as described hereinabove.

In short, since the value of the flag $I_8$ has been changed to 0 in the first control cycle after changing over of the acceleration switch 45 (refer to step E117 of FIG. 12), $I_8$ is not judged at step J101, and consequently, the sequence advances normally to J109 unless either the acceleration switch 45 or the changing over switch 46 is operated.

The control which is to be executed at steps J109 to J116 subsequently is such as described hereinabove, and setting of a value of the aimed acceleration DVS for making the running speed of the vehicle coincide with the aimed speed VS and for maintaining the same at a fixed level is accomplished.

After completion of the aimed speed control, opening or closing movement of the throttle valve 31 is performed at steps E123 to E127 of FIG. 12 as described hereinabove so that the vehicle makes constant speed running at a running speed substantially equal to the aimed speed VS.

Accordingly, after the final aimed speed VS has been reached by the running speed of the vehicle as a result of acceleration of the vehicle by changing over of the acceleration switch 45 to any one of the positions [b] to [d] shown in FIG. 6, the final aimed speed VS is regarded as an aimed speed, and the running speed of the vehicle is maintained constant at the aimed speed after then.

In case the changing over switch 45 is changed to change the designation by the running condition designating section 3 opf the control section 25 to accelerated running and the vehicle is accelerated at an aimed acceleration DVS designated int he acceleration control at step E122, the aimed acceleration DVS and the running speed of the vehicle exhibit such variations, for example, as illustrated in FIG. 27(i) and 27(ii), respectively. It is to be noted that FIG. 27(i) illustrates a variation in value of the aimed acceleration DVS with respect to a time elapsed after such changing over of the changing over switch 45 while FIG. 27(ii) illustrates a variation in value of the running speed of the vehicle with respect to a time elapsed after changing over of the changing over switch 45.

In short, if the vehicle is running at first at a constant running speed $v_1$ and the acceleration switch 45 is changed over to any on of the positions [b] to [d] at a certain point of time $t_0$ as shown in FIGS. 27(e) and 27(ii), then accelerated running is designated. Then, acceleration is started with the aimed acceleration the value of which has been set by the step L108 of FIG. 17. In this instance, since the aimed acceleration $DVS_1$ set at step L110 of FIG. 17 is set to the aimed acceleration DVS for accelerated running for each control cycle which falls on a timing at which opening or closing of the throttle valve 31 is to be performed, the aimed acceleration DVS will be increased for each such control cycle in such a stepwise condition as seen in FIG. 27(i).

Meanwhile, as the aimed acceleration DVS increases in this manner, the running speed of the vehicle begins to increase smoothly at the point of time $t_0$.

As a result, the aimed acceleration $DVS_1$ will finally become higher, at a point of time $t_1$, than the aimed acceleration $DVS_2$ set in accordance with the positon of the acceleration switch 45 by the aimed acceleration setting section 4 of the control section 25. Consequently, in a control cycle after the point of time $t_1$, the aimed acceleration $DVS_2$ is employed as a value of the aimed acceleration DVS. Accordingly, the aimed acceleration DVS thereafter presents a fixed value as seen in FIG. 27(i), and consequently, the running speed of the vehicle will increase substantially at a fixed rate as seen in FIG. 27(ii).

Then, after the running speed reaches, at a point of time $t_2$, a value smaller by $V\alpha$ shown in FIG. 23 than the final aimed speed VS set at step E120 of FIG. 12, the aimed speed $DVS_3$ read out at step L115 of FIG. 17 from the map #MDVS3 presents a smaller value than the aimed acceleration $DVS_2$. Then, in a control cycle after the point of time $t_2$, the aimed acceleration $DVS_3$ is employed as a value of the aimed acceleration DVS.

Since the aimed acceleration $DVS_3$ decreases as the difference VS−VA between the final aimed speed VS and the actual speed VA as shown in FIG. 23 decreases, as the running speed increases, the aimed acceleration DVS gradually decreases for each control cycle in such a stepwise condition as shown in FIG. 27(i).

Due to such decrease of the aimed acceleration DVS, the rate of rise of the running speed is gradually moderated as seen in FIG. 27 (ii).

Then, if it is judged after a point of time $t_3$ by the final condition detecting section 11 of the control section 25 that the difference between the running speed and the final aimed speed VS is smaller than the reference value $K_4$, changing over to constant speed running designated by the running condition designating section 3 is executed by the running condition changing over section 12 of the control section 25, thereby completing the accelerated running of the vehicle. In a control cycle after thr point of time $t_3$, constant speed running of the vehicle is performed by the constant speed controlling section 8 of the control section 25 at the aimed acceleraton set in the aimed speed control at step E133 of FIG. 12.

As a result, the running speed smoothly approaches the final aimed speed VS and reaches a value substantially equal to the final aimed speed VS at the point of time $t_3$, and after the point of time $t_3$, the running speed presents a substantially same value as the final aimed speed VS as seen in FIG. 27(ii). Meanwhile, the aimed acceleration DVS presents a value near 0 at the point of time $t_3$, and after the point of time $t_3$, the aimed acceleration DVS presents a value for maintaining the running spped at a value coincident with the final aimed speed VS.

The control when the acceleration switch 45 is changed over to any one of the positions ⓑ to ⓓ shown in FIG. 6 but the changing over switch 46 is not operated proceeds in such a manner as described above. Subsequently, description will be give of control which is executed when the changing over switch 46 is operated while such accelerated running of the vehicle as described hereinabove is still continued.

If the changing over switch 46 is pulled forwardly in FIG. 6 into an on-state, then the sequence advances from step E101 to step E110 shown in FIG. 12 in a similar manner as described hereinabove. Since the position of the acceleration switch 45 has not been changed from that in the proceding control cycle, the judgment at step E110 is in the negative, and the sequence thus advances to step E128. At step E128, changing over switch control is executed in accordance with the flow chart of steps F101 to F121 shown in FIG. 13 as described hereinabove.

In the changing over switch control, at first at step F101, it is judged in accordance with the contact information read in at step A103 of FIG. 8($i$) whether or not the contact of the changing over switch 46 is in an on-state. In this instance, since an operating portion 18$a$ of the automatic cruise switch 18 is at a forewardly pulled position in FIG. 6, it is judged that the contact of the changing over switch 46 is in an on-state, and the sequence advances to step F102.

At step F102, the value fo the flag $I_3$ is changed to 1, and then at subsequent step F103, it is judged whether or not the value of the flag $I_5$ is equal to 1. It is to be noted that the flag $I_5$ indicates, when it assumes a value equal to 1, that the contract of the changing over switch 46 was in a on-state in the preceding control cycle as described hereinabove.

In case the sequence advances to step F103 in a first control cycle after the contact of the changing over switch 46 has been changed into an on-state, since the value of the flag $I_5$ has been changed to 0 at step F111 in the control cycle before changing over of the contact of the changing over switch 46 into an on-state, the sequence advances to step F104 depending upon such judgement at step F103. Then at step F104, the value of the flag $I_5$ is changed to 1, whereafter the sequence advances to step F105.

When teh sequence advances from step F105 to step F104 as described hereinabove, a flag $I_6$ is set to 1. It is to be noted that the flag $I_6$ indicates, when it assumes a value equal to 1, that the present cycle is a first control cycle after the contact of the changing over switch 46 has been changed into an on-state as described hereinabove.

To the contrary, in case the contact of the changing over switch 46 was already in an on-state in the preceding control cycle, the value of the flag $I_5$ has been changed to 1 at step F104 in the preceding control cycle. Accordingly, the sequence advances to step F113 depending upon such judgment at step F103.

At step F106 subsequent to step F105, the value of the flag $I_{12}$ is changed to 0, and then the sequence advances to step F107. It is to be noted that, although described hereinabove, the flag $I_{12}$ indicates, when it assumes a value equal to 0, either that opening or closing movement of the throttle valve 31 has not yet been performed in a control cycle which falls on a timing for opening or closing movement of the throttle valve 31 which is encountered for the first time after entering automatic cruise mode control in a control cycle, or that, although such opening or closing movement has been performed, opening or closing movement of the throttle valve 31 has not been performed in a control cycle which falls on a timing for opening or closing movement of the throttle valve 31 which is first encountered after modification of the designation by the running condition designating section 3 of the control section 25 as a result of operation of the acceleration switch 45 or the changing over switch 46.

At step F107, since the present control cycle is a first control cycle after the contact of the changing over switch 46 has been changed to an on-state, a running condition different from the running condition of the vehicle which has been designated by the running condition designating section (not shown) till the preceding control cycle is designated. To this end, giving preference to the superiority in follow-up performance to an actual acceleration value, $DVA_{65}$ read in a step A103 of FIG. 8($i$) is used as the value of the actual acceleration DVA.

At subsequent step F108, it is judged whether or not the value of a flag $I_4$ is equal to 1. It is to be noted that the flag $I_4$ indicates, when it assumes a value equal to 0, that constant speed running should be designated by the running condition designating section (not shown).

Here, since the contact of the changing over switch 46 has been changed over to an on-state while the accelerated running of the vehicle designated by changing over of the acceleration switch 45 still continues, the present control cycle is a first control cycle after the contact of the changing over switch 46 has been changed into an on-state and accordingly the value of the flag $I_4$ is not changed after it has been changed to 1 step E116 of FIG. 12. Accordingly, $I_4=1$ is judged at step F108, and the sequence thus advances to step F109.

At step F109, the value of the flag $I_4$ is changed to 0 by the running condition changing over section 12 of the control section 25, and then the sequence advances to step F110. At step F110, the latest actual speed $VA_j$ found out in the interrupt control of steps A123 to A128 of FIG. 8($iv$) is read in, thereby completing the changing over switch control in the present control cycle.

After the changing over switch control at step E128 of FIG. 12 has been executed in such a manner as described above, the sequence advances to subsequent step E129 at which it is judged whether or not the value of the flang $I_4$ is equal to 1. Since the flag $I_4$ has been changed to 0 in value at step F109 of FIG. 13, $I_4=1$ is not judged at step E129, and the sequence thus advances to step E132 so that the designation by the running condition designating section 3 of the control section 25 is changed over to constant speed running.

At step E132, it is judged whether or not the value of the flag $I_6$ is equal to 1 ($I_6=1$). Since the value of the flag $I_6$ has been changed to 1 at step F105 of FIG. 13, $I_6=1$ is judged at step is judged at step E132, and the sequence advances to step E105.

The control at step E105 and steps E106 to E109 following the step E105 is quite the same as the control executed at steps E105 to E109 in the first control cycle after releasing of the accelerator pedal 27 described hereinabove. Accordingly, in the present control (E105 to E109), irrespective of whether or not the present control cycle falls on a timing for opening or closing movement of the throttle valve 31, the throttle valve 31 is pivoted to a throttle valve opening with which it is forecast that constant speed running can be assured with an aimed speed defined by the actual speed $VA_f$ upon changing over of the changing over switch 46. As a result, a tongue substantially equal to a desired torque (of a magnitude required for constant speed running) is produced from the engine 13, and the running condition of the vehicle begins to change from accelerated running to constant speed running.

Such control as described above is executed in the first control cycle after the contact of the changing over switch 46 has been changed to an on-state. However, in case the acceleration switch 45 is not operated while the automatic cruise mode control is executed continuously in the following control cycle the sequence advance via steps E101 and E110 of FIG. 12 to step E128 to execute changing over switch control in a similar manner as described above.

The changing over switch control is executed also is accordance with the flow chart shown at steps F101 to F121 of FIG. 13 as described hereinabove. In case the sequence advances from step F101 to step F102, however, since the contact of the changing over switch 46 continues in an on-state and the value of the flag $I_5$ remains 1 after having been changed to 1 at step F104 in the first control cycle after changing over of the contract of the changing over switch 46 to an on-state, the sequence advances to step F113 depending upon judgment at step F103 whether or not the value of the flag $I_5$ is equal to 1.

At step F113, it is judged whether or not the value of the flag $I_4$ is equal to 1. Since the flag $I_4$ has been changed to 0 in value at step F109 in the control cycle after the contact of the changing over switch 46 has been changed to an on-state. $I_4 = 1$ is not judged at step F113, and the sequence thus advances to step F112. Then at step F112, the value of the flag $I_6$ is changed to 0, thereby completing the changing over switch control in the present control cycle.

Meanwhile, in case the sequence advances from step F101 to step F111, the value of the flag $I_5$ is changed to 0 at step F111, and then the value of the flag $I_6$ is changed to 0 at step F112, thereby completing the changing over switch control in the present control cycle.

Accordingly, the changing over switch control when the contact of the changing over switch 46 remains in an on-state continuously after the preceding control cycle and the changing over switch control when the contact of the changing over switch 46 is changed over from an on-state in the present control cycle are different only in setting of the value of the flag $I_5$.

In case the sequence advances to step E129 of FIG. 12 subsequently after completion of the changing over switch control, it is judged at step E129 whether or not the value of the flag $I_4$ is equal to 1. Here, since the flag $I_4$ has been changed to 0 at step F109 of FIG. 13 and remains as it is, the sequence advances to step E132 depending upon such judgment at step E129. Consequently, the designation by the running condition designating section 3 of the control section 25 remains constant speed running.

At step E132, it is judged whether or not the value of the flag $I_6$ is equal to 1. Here, since the value of the flag $I_6$ has been changed to 0 at step F112 of FIG. 13, the sequence advances from step E132 to step E133 at which aimed speed control is executed.

The aimed speed control is executed in accordance with the flow chart shown at steps J101 to J116 of FIG. 16 as described hereinabove.

Referring to FIG. 16, it is judged at first at step J101 whether or not the value of the flag $I_8$ is equal to 1. The flag $I_8$ indicates, when it assumes a value equal to 0, that the vehicle is running substantially at a constant speed by the automatic cruise mode control. Here, since the value of the flag $I_8$ has been changed to 1 when the sequence advanced from step E132 via step E105 to step E106 of FIG. 12 in the first control cycle after changing over of the changing over switch 46 to an on-state as described hereinabove, the sequence advances to step J102 depending upon such judgment at step J101.

Control which is executed at steps J102 to J107 is quite the same as the control executed in the aimed speed control at step E133 in the following cycles after execution of the control at steps E101 to E109 of FIG. 12 in the first control cycle after releasing of the accelerator pedal 27.

In particular, setting of an aimed acceleration DVS necessary to gradually reduced the actual acceleration DVS is performed for each throttle valve opening/closing cycle.

Control at steps E123 to E127 which is executed after completion of such aimed speed control is similar to that described hereinabove. Thus, for each throttle valve opening/closing timing cycle the throttle valve 31 is opened or closed to such a throttle valve opening (opening adjustment) with which an acceleration of the vehicle equal to the aimed acceleration DVS can be obtained.

As a result, the acceleration of the vehicle is decreased gradually, and the running speed of the vehicle gradually approaches the actual speed $VA_f$ at a point of time when constant speed running is reached after turning on of the contact of the changing over switch 46 so that it soon becomes substantially fixed.

Then, if it is judged at step J104 of FIG. 16 that the absolute value $|DVA|$ of the actual acceleration DVA is smaller than the preset reference value $K\alpha$, then the value of the flag $I_8$ is changed to 0 at subsequent step J108, whereafter control is executed at steps J109 to J116.

Also the control at steps J109 to J116 is quite the same, similarly to the control at steps J101 to J107, as the control which is executed in the aimed speed control at step E133 of FIG. 12 when the automatic cruise mode control is executed as a result of releasing of the accelerator pedal 17. To the contrary, in a control cycle after a control in which the judgment at step J104 is made, since the value of the flag $I_8$ has been changed at step J108, the sequence will advance from step J101 to J109 to execute similar control.

In particular, after the running speed of the vehicle has become substantially fixed, setting of an aimed acceleration DVS necessary to maintain the running speed constant is executed. To the contrary, in case the aimed speed changing switch 48 is changed over to the (+) side or the (−) side in FIG. 6, the set value of the aimed speed VS is increased or decreased in response to such changing over in order to maintain the running speed constant.

Further, by control at steps E123 to E127 which is executed after completion of the aimed speed control the throttle valve 31 is opened or closed to a required throttle valve opening (throttle valve opening with which an acceleration of the vehicle equal to the aimed acceleration DVS can be obtained) as described hereinabove. As a result, the vehicle makes constant speed running at a constant running speed substantially conincident with the aimed speed.

As described so far, if the contact of the changing over switch 46 is changed to an on-state when accelerated running of the vehicle is being performed, then the designation by the running condition designation section 3 of the control section 25 is changed over to constant speed running, and the actual speed $VA_f$ at a point of time when the changing over takes place is used as an aimed speed for constant speed running.

Then, as a result of releasing of the accelerator pedal 27, the running speed of the vehicle is maintained substantially constant in a similar manner as in the case of transition to a constant speed running condition.

In the following, description will be given of control when the operating portion 18a of the automatic cruise switch 18 is pulled forwardly to put the contact of the changing over switch 46 into an on-state while the designated by the running condition designating section 3 is constant speed running in the automatic cruise mode control with the acceleration switch 45 positioned at any one of the positions [b] to [d] shown in FIG. 6.

In this instance, after the contact of the changing over switch 46 is changed to an on-state, the sequence advances from step E101 to step E110 of FIG. 12 in a similar manner as in the case described hereinabove. At step E110, since operation of the switch 45 has not taken place, it is judged that the position of the acceleration switch 45 has not been changed from that in the preceding control cycle, and the sequence advances to step E128.

At step E128, changing over switch control is executed in accordance with the flow chart shown at steps F101 to F121 to FIG. 13 as described hereinabove.

In short, at first at step F101, it is judged in accordance with the contact information read in at step A103 of FIG. 8(i) whether or not the contact of the changing over switch 46 is in an on-state, and the sequence advances to step F102 depending upon judgment at step F101.

At step F102, the value of the flag $I_3$ is changed to 1, and then the sequence advances to step F103 at which it is judged whether or not the value of the flag $I_5$ is equal to 1. In the preceding cycles, the automatic cruise mode control was executed without operation of the acceleration switch 45 or the changing over switch 46, and the value of the flag $I_5$ has been changed to 0 at step F111. Accordingly, in the first control cycle after the contact of the changing over switch 46 has been changed to an on-state, the sequence advances to step F104 depending upon judgement at step F103. Then, the value of the flag $I_5$ is changed to 1 at step F104, and the sequence advances to step F105.

It is to be noted that, in case the contact of the changing over switch 46 remains in an on-state to continue the automatic cruise mode control in which the sequence advances to step F103 in the following control cycle, the sequence then advances to step F113 depending upon judgement at step F103 because the flag $I_5$ has been changed to 1 at step F104 in the first control cycle after changing over of the changing over switch 46 to an on-state as described hereinabove.

Then, in case the sequence advances from step F103 via step F104 to step F105, the value of the flag $I_5$ is changed to 1 at step F105, and then the value of the flag $I_{12}$ is changed to 0 at subsequent step F106, whereafter the sequence advances to step F107.

At step F107, since the present control cycle is a first control cycle after the contact of the changing over switch 45 has been changed to an on-state, a running condition different from the running condition of the vehicle which has been held designated till the preceding control cycle is designated by the running condition designating section 3 of the control section 25. To this end, giving preference here to the superiority in follow-up performance to an actual acceleration value, $DVA_{65}$ read in at step A103 of FIG. 8(i) is used as the value of the actual acceleration DVA.

At subsequent step F108, it is judged whether or not the value of the flag $I_4$ is equal to 1.

Here, in case the acceleration switch 45 has been changed over to effect accelerated running of the vehicle and then the running condition of the vehicle has entered a constant speed running condition at a final aimed speed as described hereinabove, the value of the flag $I_4$ has been changed to 0 at step L120 of FIG. 17.

To the contrary, in case the automatic cruise mode control has been executed to enter a constant speed running condition of the vehicle as a result of releasing of the accelerator pedal 27, the value of the flag $I_4$ has been changed to 0 at step E102 of FIG. 12. On the other hand, in case the automatic cruise mode control has been executed to enter a constant speed running condition of the vehicle as a result of releasing of the brake pedal 28, the value of the flag $I_4$ has been changed to 0 at step C145 of FIG. 10.

Further, in case the contact of the changing over switch 46 was changed into an on-state to enter a constant speed running condition of the vehicle, the value of the flag $I_4$ has been changed to 0 at step F109 of FIG. 13.

Accordingly, $I_4=1$ is not judged at step F108, and the sequence advances to step F117.

At step F117, the value of the flag $I_4$ is changed to 1, and then at step F118, the value of the flag $I_9$ is changed to 0. Subsequently at step F119, it is judged in accordance with the contact information read in at step A103 of FIG. 8(i) whether or not the acceleration switch 45 is at the position [a] shown in FIG. 6.

Since the acceleration switch 45 is positioned at one of the positions [b] to [d] shown in FIG. 6 then, the sequence advances to step F121 depending upon such judgement at step F117. At step F121, the designation by the running condition designating section 3 of the control section 25 is changed over to accelerated running.

In particular, at step F121, a value of a sum $(VA+V_{K1})$ of the actual speed VA detected by the speed/acceleration detecting section 24 and read in at step A103 of FIG. 8(i) in the preceding control cycle and the same preset correction amount $V_{K1}$ as used at step E120 of FIG. 12 described hereinabove is set as a final aimed speed VS for accelerated running.

The changing over switch control in the preceding control cycle is completed with this.

In this manner, in the changing over switch control, a final aimed speed VS for accelerated running is set in a similar manner as in a case when the acceleration switch 45 is changed over to one of the positions [b] to [d] shown in FIG. 6 in a constant speed running condition of the vehicle.

After the changing over switch control at step E128 of FIG. 12 has been executed in such a manner as described above, the sequence subsequently advances to step E129 at which it is judged whether or not the value of the flag I₄ is equal to 1. Since the flag I₄ has been changed to 1 in value at step F117 of FIG. 13 as described hereinabove, the sequence advances to step E130 depending upon such judgement at step E129.

At step E130, it is judged in accordance with the contact information read in at step A103 of FIG. 8(i) whether or not the position of the acceleration switch 45 is $\boxed{a}$ in FIG. 6. Here, since the position of the acceleration switch 45 is one of the position $\boxed{b}$ to $\boxed{d}$ shown in FIG. 6, it is judged at step E130 that the acceleration switch 45 is not at the position $\boxed{b}$, and the sequence advances to step E121.

At step E121, acceleration switch control is executed by the aimed acceleration setting section 4 of the control section 25, and then the sequence advances to step E122 at which acceleration control is executed principally by the acceleration controlling section 9 of the control section 25.

Such acceleration switch control and acceleration control caused by operation of the changing over switch 46 are the same as the acceleration switch control and the acceleration control, respectively, which are executed when the acceleration switch 45 is changed over to cause designation of an accelerated running condition of the vehicle. Further, control which is executed in a first control cycle after operation of the changing over switch 46 is the same as the control which is executed in a first control cycle after changing over of the acceleration control switch 45 to cause designation of an accelerated running condition of the vehicle. Besides, control in a control cycle which fall on a timing for opening or closing movement of the throttle valve 31 which is first encountered after operation of the changing over switch 46 is the same as the control in a control cycle which falls on a timing for opening or closing movement of the throttle valve 31 which is first encountered after changing over of the acceleration switch 45 to cause designation of an accelerated running condition of the vehicle.

In particular, in a first control cycle after operation of the changing over switch 46, setting of an aimed acceleration DVS₂ for a constant acceleration running condition corresponding to a position of the acceleration switch 45 is executed in the acceleration switch control, and then when the actual speed VA is lower than the preset reference value K₅, the value of the aimed acceleration DVS₂ is changed to a value corresponding to the actual speed in the subsequent acceleration control.

To the contrary, in case the control cycle falls on a timing for opening or closing movement of the throttle valve 31, the preset correction amount ΔDV₁ is added to the actual acceleration DVA additionally by the acceleration control, and the value of DVA+ΔDV₁ is set as an aimed acceleration DVS for assurring smooth starting of accelerated running of the vehicle.

In case a first control cycle after the contact of the changing over switch 46 has been changed over to an on-state falls on a timing for opening or closing movement of the throttle valve 31, the throttle valve 31 is opened or closed in such a manner as described above at steps E123 to E127 after completion of the acceleration control. Consequently, acceleration of the vehicle is started at an acceleration substantially equal to the aimed acceleration DVS.

To the contrary, in case the first control cycle does not fall on such opening/closing timing, the automatic cruise mode control in the control cycle is completed without effecting setting of an aimed acceleration DVS by the acceleration control in the control cycle or opening or closing movement of the throttle valve 31 at steps E123 to E127.

Control in a first control cycle after the contact of the changing over switch 46 has been changed to an on-state is executed in such a manner as described so far. However, in case neither of the accelerator pedal 27 and the brake pedal 28 is treadled to continuously execute the automatic cruise mode control nor the acceleration switch 45 is changed over in the following control cycle, the sequence advances again via steps E101 and E110 of FIG. 20 to step F101 of FIG. 20 at which it is judged whether or not the contact of the changing over switch 46 is in an on-state in a similar manner as described hereinabove.

Then, the case the contact of the changing over switch 46 remains in an on-state continuously from the preceding control cycle, the sequence advances to step F102 depending upon judgement at step F101. The operating portion 18a of the automatic cruise switch 18 is released to allow the automatic cruise switch 18 to be returned to its initial position. To the contrary, in case the contact of the changing over switch 46 is in an off-state, the sequence advances to step F111 depending upon such judgement at step F101.

In case the sequence advances from step F101 to F102, the value of the flag I₃ is changed to 1 at step F102, and then the sequence advances to step F103 at which it is judged whether or not the value of the flag I₅ is equal to 1. Since the value of the flag I₅ has been changed to 1 at step F104 in the first control cycle after changing over of the contact of the changing over switch 46 into an on-state as described hereinabove and the contact still remains in an on-state, the sequence advances to step F113 depending upon such judgement at step F103.

At step F113, it is judged whether or not the value of the flag I₄ is equal to 1. Since the value of the flag I₄ has been changed to 1 at step F117 in the present control cycle, the sequence advances to step F114 depending upon such judgment at step F113.

At step F114, it is judged in accordance with the contact information read in at step A103 of FIG. 8(i) whether the acceleration switch 45 is at the position $\boxed{a}$ shown in FIG. 6. Now, since the acceleration switch 45 is at any one of the positions $\boxed{b}$ to $\boxed{d}$ shown in FIG. 6, the sequence advances to step F116 depending upon such judgement at step F1114.

At step F116, a value of a sum VS+VT₁ of the final aimed speed VS in the preceding control cycle and a preset correction amount VT₁ is designated as a final aimed value VS for accelerated running in the present control cycle by the final aimed speed modification controlling section 6a of the control section 25.

It is to be noted that the final aimed speed VS in the preceding control cycle has been designated in value at step F121 iin case the present control cycle is a first control cycle after changing over of the contact of the changing over switch 46 to an on-state, but in case the present control cycle is not such a first cycle, the final aimed speed VS has been designated in value at step F116.

Accordingly, if the contact of the changing over switch 46 is changed to an on-state, then value of the actual speed VA added by a present correction amount V$_{K1}$ is designated as a final aimed speed VS for accelerated running in a subsequent first control cycle. If the on-state of the changing over switch 46 is continued, as the duration continues, the final aimed speed VS is increased by a preset correction amount $VT_1$ for each control cycle.

Then, in case the sequence advances from step F116 to step F112, the value of the flag $I_6$ is changed to 0, thereby completing the changing over switch control in the present control cycle.

In case the contact of the changing over switch 46 is not in an on-state in the present control cycle and the sequence advances to step F111 depending upon such judgement of step F101, the value of the flag $I_5$ is changed to 0 at step F111, and then the sequence advances to step F112. At step F112, the value of the flag $I_6$ is changed to 0 as described hereinabove, thereby completing the changing over switch control in the present control cycle.

After completion of the changing over switch control in this manner, the sequence subsequently advances to step E129 of FIG. 12. At step E129, it is judged whether or not the value of the flag $I_4$ is equal to 1. Since the value of the flag $I_4$ has been changed to 1 at step F117 to FIG. 13, the sequency advances to step E130 depending upon such judgement at step E129.

At step E130, it is judged whether or not the acceleration switch 45 is at the position [a] in FIG. 6. Since here the acceleration switch 45 is at one of the positions [b] to [d] shown in FIG. 6, the sequence advances from step E130 to step E121.

Control to be executed at step E121 and subsequent steps E122 to E127 is the same as the control which is executed in the second and following control cycles after the acceleration switch 45 has been changed as described hereinabove.

In particular, in the acceleration switch control at step E121, since there is no change in position of the acceleration switch 45, a value set in the first control cycle after the changing over switch 46 has been changed to an on-state is set as an aimed acceleration $DVS_2$ for subsequent constant acceleration running.

Further, by the acceleration control at step E122, the acceleration of the vehicle is raised smoothly to the aimed acceleration $DVS_2$ upon starting of such acceleration, whereafter the vehicle is accelerated at the aimed acceleration $DVS_2$, and when the running speed of the vehicle reaches the final aimed speed VS, the aimed acceleration DVS is set so that the acceleration may be decreased gradually before the final aimed speed VA is reached.

Further, if the actual speed VA is lower than the preset reference value $K_5$ then, the aimed acceleration $DVS_2$ is modified to a value corresponding to the actual speed VA. Then, the throttle valve 31 is opened or closed in accordance with such aimed acceleration DVS for each throttle valve opening/closing timing cycle. Consequently, the vehicle will be accelerated at an acceleration substantially equal to the aimed acceleration DVS.

Also in case the running speed of the vehicle has become substantially equal to the final aimed speed VS as a result of such acceleration described just above, the value of the flag $I_4$ is changed to 0 in the acceleration control at step E122 similarly as in the case when the acceleration control is executed as a result of changing over of the acceleration switch 45. Accordingly, in the following control cycle, the sequence will advance from step E129 via step W132 to step E133 at which constant speed running of the vehicle is peformed in the aimed speed control in which the final aimed speed VS is employed as an aimed speed.

As described so far, in case the acceleration switch 45 is held at one of the positions [b] to [d] shown in FIG. 6 so that the automatic cruise mode control is executed and the vehicle is in a constant speed running condition, if the operating portion 18a of the automatic cruise switch 18 is pulled forwardly in FIG. 6 to change the contact of the changing over switch 45 to an on-state, then the designation by the running condition designating section 3 of the control section 25 is changed to accelerated running. Consequently, accelerated running of the vehicle is performed smoothly at an acceleration corresponding to the position of the acceleration switch 45 in a similar manner as in the case of changing over of the acceleration switch 45.

Meanwhile, the final aimed speed upon which accelerated running is set to a higher value by a predetermined amount than the running speed of the vehicle in the constant speed running condition, and such final aimed speed is increased as the time while changing over switch 46 is held at the forwardly pulled position in FIG. 6 passes.

Then, after the running speed of the vehicle reaches the final aimed speed as a result of such accelerated running, the designation by the running condition designating section 3 is changed over to constant speed running, and consequently, constant speed running of the vehicle is performed with an aimed speed defined by the final aimed speed.

While the control when the acceleration switch 45 is changed to one of the positions [b] to [d] and the control when the operating portion 18a of the automatic cruise switch 18 is pulled forwardly to change the contact of the changing over switch 41 to an on-state with the acceleration switch 45 positioned at one of the positions [b] to [d] have been described above, control when the acceleration switch 45 is changed to the position [a] and control when the operating portion 18a of the automatic cruise switch 18 is pulled forwardly to change the contact of the changing over switch 46 to an on-state with the acceleration switch 45 positioned at the position [a] will be described below.

If the acceleration switch 45 is changed over to the position [b] shown in FIG. 6, or if the contact of the changing over switch 46 is changed to an on-state with the acceleration switch 46 positioned at the position [b] and accordingly the vehicle is in a constant speed running condition, an accelerated running condition of the vehicle is designated. Then, in case the acceleration switch 45 is changed over to the position [b] while acceleration of the vehicle is proceeding, since the accelerator pedal 27 was not treadled also in the preceding control cycle, it is judged at step E101 of FIG. 12 that the contact to the accelerator switch 15 wasw in an on-state in the preceding control cycle. The sequence thus advances to step E110.

At step E110, it is judged in accordance with the contact information read in at step A103 of FIG. 8(i) whether or not the position of the acceleration switch 45 has been changed from that in the preceding control cycle as described hereinabove. Since the acceleration 45 was at the position [b] in the preceding control cycle but is at the position [a] in the present control cycle, the sequence advances to step E1111 depending upon such judgement at step E110.

At step E111 and following steps E112 and E113, the value of the flag $I_2$ is changed to 1 and the values of the flags $I_5$ and $I_9$ are changed to 0, respectively. Then at step E114, it is judged in accordance with the contact information read in at step A103 of FIG. 8(i) whether or not the accelerator switch 45 is at the position [a].

Since the acceleration switch 45 is at the position [a] in the present control cycle, the sequence advances from step E114 to step E115 at which the value of the flag $I_4$ is changed to 0, whereafter the sequencef advances to step E104.

Control at step E104 and following steps E105 to E109 is quite the same as the control at steps E104 to E109 executed in the first control cycle after releasing of the accelerator pedal 27 described hereinabove.

By the control, irrespective of whether the present control cycle falls on a timing for opening or closing movement of the throttle valve 31, the vehicle is controlled such that constant speed running may be performed with an aimed speed defined by the actual speed $VA_I$ at a point of time directly after the acceleration switch 45 has been changed over to the position [a]. More particularly, the throttle valve 31 is adjusted to a suitable throttle valve opening so that a torque necessary for such constant speed running may be produced from the engine 13. As a result, torque of a desired magnitude is produced from the engine 13 so that the running condition of the vehicle starts changing from accelerated running to constant speed running.

Such control as described above is executed in a first control cycle afer the acceleration switch 45 has been changed over to the position [a], and also in the following control cycle, the automatic cruise mode control is executed continuously. Then, in case the acceleration switch 45 is held at the position [a] and the changing over switch 46 is not operated, the sequence advances from step E101 to step E110 of FIG. 12 in a similar manner as described hereinabove in order to judge whether or not the position of the acceleration switch 45 has been changed from that in the preceding control cycle.

Since the acceleration switch 45 is held at the position [a] and the position thereof has not been changed from that in the preceding control cycle as described hereinabove, the sequence advances from step E110 to step E128 at which changing over switch control is executed.

The changing over switch control is executed in accordance with the flow chart shown at steps F101 to F121 of FIG. 13 as described hereinabove.

Thus, at first step R101, since the changing over switch 46 has not been operated, it is judged that the contact of the changing over switch 46 is not in an on-state as described hereinabove, and the sequence advances to step F111.

At step F111, the value of the flag $I_5$ is changed to 0, and then at step F112, the value of the flag $I_6$ is changed to 0, thereby completing the changing over switch control in the present control cycle.

Then, the sequence advances to step E129 of FIG. 12, and it is judged at step E129 whether or not the value of the flag $I_4$ is equal to 1. Since the flag $I_4$ has been changed to 0 in value at step E115 of the first control cycle after the acceleration switch 45 has been changed to the position [a], the sequence advances, depending upon such judgement at step E129, to step E132 at which the designation by the running condition designating section 3 of the control section 25 is changed over to constant speed running.

At step E132, it is judged whether or not the value of the flag $I_6$ is equal to 1. Since the flag $I_6$ has been changed to 0 in value at step F112 of FIG. 13, the sequence advances, depending upon such judgement at step E132, to step E133 at which aimed speed control is executed.

The aimed speed control is executed in accordance with the flow chart at steps J101 to J116 of FIG. 16 as described hereinabove.

In short, at first at step J101, it is judged whether or not the value of the flag $I_8$ is equal to 1. Since the flag $I_8$ has been changed to 1 in value at step E106 of FIG. 12 in the first control cycle after the acceleration switch 45 has been changed to the position [a], the sequence advances from step 4101 to step J102.

Control at step J102 and following step J103 to J107 are quite the same as the aimed speed control executed at steps J102 to J107 after the sequence has advanced to step E133 in the control cycle following the first control cycle after releasing of the accelerator pedal 27 in which the control at steps E101 to E109 of FIG. 12 was executed. In particular, setting of an aimed acceleration DVS necessary to gradually decrease the actual acceleration DVA is executed for each control cycle which falls on a timing at which opening or closing movement of the throttle valve 31 is to be performed.

After the aimed speed control is completed in this manner, control is subsequently executed at steps E123 to E127 of FIG. 12 in such a manner as described for the various controls describe hereinabove. Thus, opening or closing movement of the throttle valve 31 to such a throttle valve opening with which an acceleration of the vehicle equal to the aimed acceleration DVS may be obtained is performed for each control cycle which falls on a timing for such opening or closing movement. As a result, the acceleration of the vehicle decreases gradually so that the running speed gradually approaches the actual speed $VA_I$ directly after changing over of the acceleration switch 45 and becomes substantially fixed.

The acceleration of the vehicle decreases in this manner. Then, if it is judged at step J104 of FIG. 16 that the absolute value |DVA| of the actual acceleration DVA is smaller than the preset reference value $K\alpha$, then the value of the flag $I_9$ is changed to 0 at subsequent step J108, whereafter the sequence advances to step J109. Thus, control is executed at step J109 and following steps J110 to J116. To the contrary, in each control cycle after judgment at step J104 has been made, since the value of the flag $I_9$ has been changed to 0 at step J108, the sequence advances from step J101 to step J109 to execute similar control.

The control executed at steps J109 to J116 is quite the same as the control which is executed at steps J109 to J116 after sequence has advanced to step J108 particularly depending upon judgment at step J104 in the control which is executed at steps J101 to J108 as described hereinabove in the automatic cruise mode control after releasing of the accelerator pedal 27.

Subsequently, control is executed at steps E123 to E127 of FIG. 12. By the control, opening or closing movement of the throttle valve31 to such a throttle valve opening with which an acceleration of the vehicle equal to the aimed acceleration DVS can be obtained is performed for each throttle opening/closing timing cycle. As a result, the vehicle makes constant speed running at a constant running speed substantially equal to the aimed speed VS.

In case the acceleration switch 45 is changed over to the position [a] when accelerated running of the vehicle is effected as a result of changing over of the acceleration switch 45 or changinh of the contact of the changing over switch 46 to an on-state, the designation by the running condition designating section 3 of the control section 25 is changed over to constant speed running, and control is executed for causing the vehicle to run at a constant speed employing as an aimed speed the actual speed $VA_j$ at a point of time directly after changing over of the acceleration switch 45, that is, the speed of the vehicle when the designation of the running condition was changed over to constant speed running.

The control is similar to that when the running condition is changed over to a constant speed running condition as a result of releasing of the accelerator pedal 27 or when the contact of the changing over switch 46 is changed to an on-state while the vehicle is making accelerated running. As a result, the running speed of the vehicle is maintained substantially constant in conformity with the aimed speed of the vehicle.

It is to be noted that, since the acceleration switch 45 is at the position [b] and the designation by the running condition designating section 3 of the control section 25 is constant speed running, if the acceleration switch 45 is changed over to the position [a] when the vehicle is in a constant speed running condition, similar control as described hereinabove is executed. In this instance, since the designation is already constant speed running from before such changing over, constant speed running is continued at the same fixed speed, and no change takes place in running condition of the vehicle.

Subsequently, description will be given of control to be executed when the operating portion 18a of the automatic cruise switch 18 is pulled forwardly in FIG. 6 to change the contact of the changing over switch 46 to an on-state while the acceleration switch 45 is held at the position [a] so that the automatic cruise mode control is executed and the vehicle is in a constant speed running condition because the designation by the running condition designating section 3 of the control section 25 is constant speed running.

In this instance, if the contact of the changing over switch 46 is changed over to an on-state, the sequence advances to steps E101 to E110 of FIG. 12 in a similar manner as described hereinabove. Since operation of the acceleration switch 45 has not performed at step E110, it is judged that the position of the acceleration switch 45 has not been changed from that in the preceding control cycle, and the sequence advances to step E128.

At step E128, changing over switch control is executed as described hereinabove. Thus, at first at step F101 of FIG. 13, it is judged in accordance with the contact information ead in at step A103 of FIG. 8(i) whether or not the contact of the changing over switch 46 is in an on-state.

Since the contact of the changing over switch 46 is now in an on-state, the sequence advances from step F101 to step F102 at which the value of the flag $I_3$ is changed to 1. Then at step F103, it is judged whether or not the value of the flag $I_5$ is equal to 1.

In the first control cycle after changing over of the contact of the changing over switch 46 to an on-state, automatic cruise mode control was executed in such a condition wherein neither of the acceleration switch 4k and the changing over switch 4l has been operated in the preceding control cycle. Accordingly, the value of the flag $I_5$ was changed to 0 at step F111. Consequently, the sequence advances to step F104 depending upon such judgment at step F103.

At step F104, the value of the flag $I_5$ is changed to 1, and then at step F105, the value of the flag $I_6$ is changed to 1, whereafter the value of the flag $I_{12}$ is changed to 0 at step F106, and then the sequence advances to step F107.

At step F107, since the present control cycle is a first control cycle after the contact of the changing over switch 46 has been changed to an on-state, a running condition different from the running condition which was designated in the preceding control cycle is designated by the running condition designating section 3 of the control section 25. Thus, giving preference to the superiority in follow-up performance to an actual value, $DVA_{65}$ read in at step A103 of FIG. 8(i) is used as the value of the actual acceleration DVA.

At subsequent step F108, it is judged whether or not the value of the flag $I_4$ is equal to 1. Here, the value of the flag $I_4$ is equal to 0 as described hereinabove.

In short, in case the constant speed running condition of the vehicle before the contact of the changing over switch 44 was changed to an on-state arose from changing over of the acceleration switch 44, the value of the flag $I_4$ has been changed to 0 at step E115 of FIG. 12.

To the contrary, in case such constant speed running condition was entered as a result of releasing of the accelerator pedal 27, the value of the flag $I_4$ has been changed to 0 at step E102 of FIG. 12.

On the other hand, in case such constant speed running condition was entered as a result of releasing of the brake pedal 28, the value of the flag $I_4$ has been changed to 0 at step C145 of FIG. 10.

Further, in case such constant speed running condition was entered as a result of changing over of the contact of the changing over switch 46 to an on-state, the value of the flag $I_4$ has been changed to 0 at step F109 of FIG. 13.

Accordingly, in any case, the sequence advances to step F11m depending upon such judgment at step F108.

Then at step F117, the value of the flag $I_4$ is changed to 1, and then at step F118, the value of the flag $I_9$ is changed to 0, whereafter the sequence advances to step F119. At step F119, it is judged in accordance with the contact information read in at step A103 of FIG. 8(i) whether or not the acceleration switch 45 is at the position [a].

In this instance, since the acceleration switch 45 is at the position [a], the sequence advance, depending upon such judgment at step F119, to step F120 at which the designation by the running condition designating section 3 of the control section 25 is changed over to decelerated running.

In particular, at step F120, a value of the actual speed VA read in at step A10o of FIG. 8(i) which is subtracted by the preset correction amount $VK_2$ is determined as a final aimed speed for deceleration running by the final aimed speed setting section 6 of the control section 25. The changing over switch control in the present control cycle is completed with this.

After the sequence subsequently advances to step E129 of FIG. 12, it is judged whether or not the value of the flag $I_4$ is equal to 1. Since the value of the flag $I_4$ has been changed to 1 at step F117 of FIG. 13, the sequence advances from step E129 to step E130.

At step E130, it is judged in accordance with the contact information read in at step A103 of FIG.8(i) whether or not the acceleration switch 45 is at the position $\boxed{a}$. Since the acceleration swich 45 is now at the position $\boxed{a}$, the sequence advances from step E13/ to step E131 at which deceleration control is executed.

In the deceleration control, setting of an aimed acceleration DVS of a negative value (that is, an aimed deceleration DVS) for causing decelerated running of the vehicle in which the running speed of the vehicle is decreased to the final aimed speed VS. The deceleration control is executed in accordance with the flow chart shown at steps H101 to H110 of FIG. 15 principally by the deceleration controlling section 10 and the aimed acceleration setting section 4 of the control section 25.

In short, at first step H101, it is judged whether or not the absolute value |VS-VA| of the difference between the final aimed speed VS and the actual speed VA read in at step A103 of FIG. 8(i) is smaller than the preset reference value $K_4$.

In case the sequence advances to step H101 in a first control cycle after the contact of the changing over switch 46 has been changed to an on-state, since the final aimed speed VS is a value obtained by subtracting the correction amount $VK_2$ from the actual speed VA as described hereinabove, the absolute value |VS-VA| is equal to the correction amount $VK_2$. Besides, since the correction amount $VK_2$ is set greater than the reference value $K_4$, the relationship of $|VS-VA| > K_4$ is satisfied, and the sequence thus advances to step H102.

At step H10i, a difference VS-VA between the final aimed speed VS and the actual speed VA is calculated, and then at step H10o, an aimed acceleration $DVS_5$ corresponding to the difference VS-VA is read out from a map #MDVS5. Subsequently at step H104, the aimed acceleration $DVS_5$ is designated as a value of the aimed acceleration DVS for deceleration running, thereby completing the deceleration control in the present control cycle.

Figure 25:
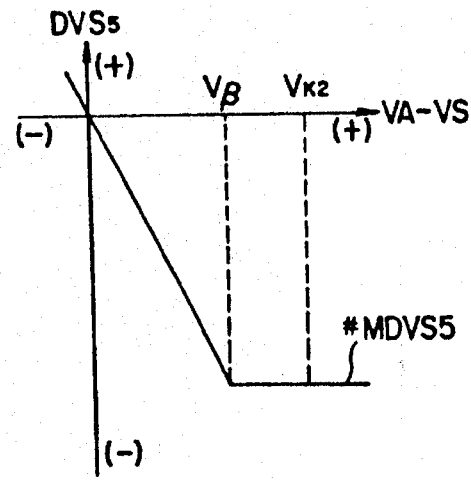

The map #MDVS5 mentioned above is provided to find out an aimed acceleration $DVS_5$ corresponding to an aimed deceleration for deceleration running using the difference VS-VA as a parameter. The difference VS-VA and the aimed acceleration $DVS_5$ have such a relationship as illustrated in FIG. 25. Accordingly, so long as the difference VS-VA has a positive value, the aimed acceleration $DVS_5$ has a negative value and substantially is a deceleration.

After setting of an aimed acceleration DVS by such deceleration control as described above, the sequence advances to step E123 of FIG. 12. At step E123, as described hereinabove, an aimed torque $TOM_2$ of the engine 13 necessary to make the acceleration of the vehicle equal to the aimed acceleration DVS is calculated using the equation (5) given hereinabove.

In the case of a first control cycle after the contact of the changing over switch 46 has been changed to an on-state, since the aimed acceleration $DVS_5$ having a negative value is designated as an aimed acceleration DVS and the running condition of the vehicle in the preceding control cycle was constant speed running, the Accordingly, in this instance, an aimed torque $TOM_2$ calculated in accordance with the equation (5) has a smaller value than the actual torque TEM which is being produced by the engine 13.

Then, the sequence advances to step E124 at which a throttle valve opening $\theta_{TH2}$ corresponding to the aimed torque $TOM_2$ calculated at step E123 and the engine rotational speed $N_E$ read in at step A103 of FIG. 8(i) is read out from the map #MTH (not shown), whereafter the sequence advances to step E125.

It is to be noted that the control at steps E123 and E124 is executed by the deceleration controlling section 10 of the control section 25 because the designation by the running condition designating section 3 of the control section is decelerated running.

The minimum value of the throttle valve opening $\theta_{TH2}$ of the map #MTH (not shown) corresponds to a minimum opening of the throttle valve 31 which provides an engine idling position. Thus, in case the aimed torque $TOM_2$ is decreased to a value lower than a minimum torque which can be produced by the engine 13, the minimum opening is designated for the throttle valve opening $\theta_{TH2}$.

Further, control at step E125 and following steps E126 and E127 is the same as that which is executed in the various controls described hereinabove. Thus, in case the present control cycle falls on a timing for opening or closing movement of the throttle valve 31, the throttle valve 31 is opened or closed to the throttle valve opening $\theta_{TH2}$ designated at step E124, and the value of the flat $I_{12}$ is changed to 1.

As a result, in case the aimed torque $TOM_2$ is higher than the minimum torque which can be produced by the engine 13, a torque substantially equal to the aimed torque $TOM_2$ is produced from the engine 13. On the contrary, in case the aimed torque $TOM_2$ is lower than the minimum torque from the engine 13, the throttle valve 31 is held at the minimum opening corresponding to the engine idling position. Consequently, deceleration by engine brake is started so that the running condition of the vehicle is changed from constant speed running to decelerated running.

On the other hand, in case the present control cycle does not fall on a timing for opening or closing movement of the throttle valve 31, the automatic cruise mode control in the present control cycle is completed without making opening or closing movement of the throttle valve 31.

After such control in the first control cycle after the contact of the changing over switch 46 has been changed to an on-state is executed in such a manner as described above, the automatic cruise mode control is executed continuously in the following control cycle. In case changing over of the acceleration switch 45 takes place, the sequence advances via steps E101 and E110 of FIG. 12 in a similar manner as described hereinabove again to step F101 of FIG. 13 at which it is judged whether or not the contact of the changing over switch 46 is in an on-state.

In case the contact of the changing over switch 46 is held in an on-state continuously from the preceding control cycle, the sequence advances to step F102. To the contrary, in case the operating portion 18a of the automatic cruise switch 18 has been released to change the contact of the changing over switch 46 to an off-state, the sequence advances to step F111.

In case the sequence advances from step F101 to F102, the sequence subsequently advances from step F102 via steps F103 and F113 to step F114 in a similar manner as in the case when the contact of the changing over switch 46 is continuously held in an on-state in the second and following control cycles after designation of an accelerated running condition of the vehicle as a result of changing the contact of the changing over switch 46 to an on-state while the acceleration switch 45 was at one of the positions [b] to [d] as described hereinabove.

At step F114, it is judges in accordance with the contact information read in at step A103 of FIG. 8(i) whether or not the acceleration switch 45 is at the position [a]. Since here the acceleration switch 45 is at the position [a], the sequence advances to step F115.

At step F115, a value of a difference $VS - VT_2$ of the preset correction amount $VT_2$ from the final aimed speed VS in the preceding control cycle is set as a final aimed speed VS for the present control cycle by the final aimed speed modifying section 6a of the control section 25.

It is to be noted that the final aimed speed VS in the preceding control cycle was set in value at step F120 in case the preceding control cycle was a first control cycle after changing of the contact of the changing over switch 46 to an on-state but was set in value at step F115 in case the present control cycle was not such first control cycle.

Accordingly, if the contact of the changing over switch 46 is changed over to an on-state, then in a first control cycle after then, a value $(VA-VK_2)$ of the preset correction amount $VK_2$ subtracted from the actual speed VA is designated as a final aimed speed VS for subsequent decelerated running, and then if the on-state of the contact is continued, the final aimed speed VS is decreased by the preset correction amount $VT_2$ for each control cycle as the time passes. In short, $VS = VA = VT_2 - VK_2$.

Subsequently, the sequence advances from step F115 to step F112 at which the value of the flag $I_6$ is changed to 0, thereby completing the changing over switch control in the present control cycle.

Since the contact of the changing over switch 46 is not in an on-state in the present control cycle, in case the sequence advances from step F101 to step F111, the value of the flag $I_5$ is changed to 0 at step F111, and then the value of the flag $I_6$ is changed to 0 at subsequent step F112, thereby completing the changing over switch control in the preceding control cycle.

After the changing over switch is completed in this manner, the sequence advances to step E129 of FIG. 12. At step E129, it is judged whether or not the value of the flag $I_4$ is equal to 1 as described hereinabove. Since here the value of the flag $I_4$ has been changed to 1 at step F117 of FIG. 13, the sequence advances to step E130 depending upon such judgment at step E129.

At step E130, it is judged whether or not the position of the acceleration switch 45 is [a] shown in FIG. 6. Since here the acceleration switch 45 is at the position [a], the sequence advances to step E131 to continue the deceleration control described hereinabove.

It is to be noted that the deceleration of the vehicle presents a substantially equal value to the absolute value of the aimed acceleration DVS, but if the aimed torque $TOM_2$ calculated at step E123 presents a smaller value than the minimum torque which can be produced from the engine 13, then the deceleration of the vehicle is a maximum deceleration obtainee by engine brake and is not always equal to the value of the aimed acceleration DVS because the throttle valve 31 is closed to its minimum opening for the engine idling position.

The aimed acceleration $DVS_5$ set as a value of the aimed acceleration has, as shown in FIG. 25, a fixed value while the difference VS−VA between the final aimed speed VS and the actual speed VA is smaller than $V_\beta$ shown in FIG. 25, but where the difference VS−VA is smaller than $V_\beta$, the value of the aimed acceleration $DVS_5$ approaches 0 as the difference VS−VA decreases. Accordingly, after the actual speed VA is reduced to a value near the final aimed speed VS as a result of decelerated running, the degree of deceleration of the vehicle is moderated as the actual speed VA decreases. Consequently, the running speed of the vehicle smoothly approaches the final aimed speed.

Decelerated running of the vehicle is accomplished in such a manner as described above. Then, if the actual speed VA is decreasesed until the absolute value |VS−VA| becomes smaller than the reference value $K_4$, it is detected by the final condition detecting section 11 of the control section 25 that the running speed of the vehicle has reached the final aimed speed VS. The sequence thus advances to step H105 depending upon such judgment at step H101.

At step H105, a difference VS−VA between the final aimed speed VS and the actual speed VA is calculated. Then at step H106, giving preference to the superiority in stability than the superiority in follow-up performance because the running speed of the vehicle is substantially constant and there is no sudden change in running condition similarly in the control of transition to a constant speed running condition described hereinabove, the actual acceleration $DVA_{850}$ calculated in the interrupt control of FIG. 8(iv) and read in at step A103 of FIG. 8(i) is used as a value of the actual acceleration DVA to be used at step E123 of FIG. 12.

The sequence subsequently advances to step H107 at which an aimed acceleration $DVS_4$ is found out in placed of the aimed acceleration $DVS_5$ in control executed in accordance with the flow chart at steps M101 to M106 of FIG. 18 because the actual speed VA has become substantially equal to the final aimed speed VS and it has been detected by the final condition detecting section 11 of the control section 25 that the running speed of the vehicle has reached the final aimed speed VS as described hereinabove.

Contents of the control are quite the same as those of the control executed at step J115 of FIG. 16 when the accelerator pedal 27 is released so that a constant speed running condition by the automatic cruise mode control is entered.

Subsequently at step H108, the aimed acceleration $DVS_4$ is designated as a value of the aimed acceleration DVS to be used subsequently at step E123 of FIG. 12, whereafter the sequence advances to step H109.

The aimed acceleration $DVS_4$ is set in accordance with such a relationship to the difference VS−VA between the aimed speed VS for constant speed running and the actual speed VA read in at step A103 of FIG. 8(i) as illustrated in FIG. 23 or 24 as described hereinabove. In either case, the aimed acceleration $DVS_4$ has a relationship that it increases as the difference VS−VA increases. Accordingly, the aimed acceleration DVS here acts to stop a decreasing condition of the running speed of the vehicle and maintain the running speed of the vehicle at the aimed speed VS, that is, the final aimed speed VS in the decelerated running condition.

At step H109, the value of the flag $I_4$ is changed to 0 by the running condition changing over section 12 of the control section 25, and then at step H110, the value of the flag $I_8$ is changed to 0, thereby completing the deceleration control in the present control cycle. After then, control is executed at steps E123 to E127 of FIG. 12.

The control is the same as the control at steps E123 to E127 in the various cases described hereinabove. Here, the control at steps E123 and E124 is executed by the deceleration controlling section 10 of the control section 25 because the designation by the running condition designating section 3 of the control section 25 is decelerated running.

In particular, a throttle valve opening $\theta_{TH2}$ is set in accordance with the aimed acceleration DVS designated in value in the deceleration control, and in case the present control cycle falls on an opening/closing timing for the throttle valve 31, the throttle valve 31 is opened or closed to the throttle valve opening $\theta_{TH2}$. As a result, the running speed of the vehicle will remain at a value substantially equal to the aimed speed VS.

In this manner, the automatic cruise mode control is executed at steps H105 to H110 of FIG. 15 continuously in the following control cycle. Further, in case neither of the acceleration switch 45 and the changing over switch 46 is operated, the sequence advances via steps E101 and E110 of FIG. 12 to step F101 of FIG. 13 again in a similar manner as described hereinabove.

Since here the contact of the changing over switch 46 has already been changed to an off-state, the sequence advances to step F111 depending upon such judgment at step F101 as described hereinabove. At step F111, the value of the flag $I_5$ is changed to 0, and then the value of the flag $I_6$ is changed to 0 at subsequent step F112, thereby completing the changing over switch control in the present control cycle.

Then, the sequence advances to step E129 of FIG. 12. At step E129, it is judged whether or not the value of the flag $I_4$ is equal to 1. Since the value of the flag $I_4$ has been changed to 0 at step H109 of FIG. 15 as described hereinabove, the sequence advances to step E132 so that the designation by the running condition designating section 3 of the control section 25 is changed over to constant speed running.

In particular, while it is judged at step E132 whether or not the value of the flag $I_6$ is equal to 1, since the value of the flag $I_6$ has been changed to 0 at step F112 of FIG. 13 as decribed hereinabove, the sequence now advances from step E132 to step E133 at which aimed speed control is executed.

While the aimed speed control is executed in accordance with the flow chart shown at steps J101 to J116 of FIG. 16, since the value of the flag $I_8$ which is to be judged at first step J101 has been changed to 0 already at step H110 of FIG. 15 as described hereinabove, the aimed speed control is executed in accordance with the steps J109 to J116 in a similar manner as in the case wherein the running condition of the vehicle changes over from an accelerated running condition to a constant speed running condition.

After completion of the aimed speed control, control is executed in accordance with steps E123 to E127 to FIG. 12 so that the throttle valve 31 is opened or closed for each control cycle falling on an opening/closing timing in accordance with the aimed acceleration DVS in a similar manner as described hereinabove. Consequently, the vehicle will run at a constant running speed substantially equal to the aimed speed VS.

As described so far, while the operating portion 18a of the automatic cruise switch 18 is pulled forwardly to put the contacts of the change-over switch 46 into an on-state when the acceleration switch 45 is held at the position [a] so that automatic cruise mode control is executed and the vehicle is in a constant speed running condition, decelerated running is designated by the running condition designating section 3 of the control section 25, and consequently, the running speed of the vehicle is decreased to a final aimed speed VS which decreases in value as the duration of an on-state of the contacts of the change-over switch 46 increases. Then, when it is detected by the final condition detecting section 11 of the control section 25 that the running speed reaches the final aimed speed VS, the running condition change-over section 12 of the control section 25 changes over the designation of the running condition designating section 3 to constant speed running so that running of the vehicle smoothly changes to constant speed running wherein the final aimed speed VS is an aimed speed. Consequently, the vehicle thereafter runs at a running speed substantially equal to the final aimed speed VS, that is, the running speed at a point of time when the designation of the running condition designating section 3 is changed over to constant speed running.

Subsequently, description will be given of control when the operating portion 18a of the automatic cruise switch 18 is pulled forwardly in FIG. 6 again to change the contact of the changing over switch 46 to an on-state while such decelerated running as described above still continues.

In this instance, after the contact of the changing over switch 46 is changed to an on-state, the sequence advances via steps E101 and E110 of FIG. 12 to step F101 of FIG. 13 in a similar manner as described hereinabove.

At step F101, it is judged in accordance with the contact information read in at step A103 of FIG. 8(i) whether or not the contact of the changing over switch 46 is in an on-state. Since the contact is in an on-state now, the sequence advances to step F102.

At step F102, the value of the flag $I_3$ is changed to 0, and then at step F103, it is judged whether or not the value of the flag $I_5$ is equal to 1.

In case the sequence advances to step F103 in a first control cycle after the contact of the changing over switch 46 has been changed to an on-state, since the value of the flag $I_5$ has been changed 0 at step F111 in the preceding control cycle, the sequence advances to step F104 depending upon such judgment at step F103.

At step F104 and following steps F105 and F106, the values of the flags $I_5$ and $I_6$ are changed to 1 and the value of the flag $I_{12}$ is changed to 0, respectively, and then the sequence advances to step F107. At step F107, the contact of the changing over switch 46 is changed to an on-state as described hereinabove.

Then, since the present control cycle is a first control cycle after the designation by the running condition designating section 3 of the control section 25 has been changed to a different running condition, $DVA_{65}$ read in at step A103 of FIG. 8(i) is used, giving preference to the superiority in follow-up performance to an actual value, as the value of the actual acceleration DVA.

At subsequent step F108, it is judged whether or not the value of the flag $I_4$ is equal to 1. Since the contact of the changing over switch 46 was changed over to an on-state while decelerated running of the vehicle was still continued and the present control cycle is a first cycle after such changing over of the contact of the changing over switch 46 into an on-state as described hereinabove, the value of the flag $I_4$ has been changed to 1 at step F117 in the changing over switch control of FIG. 13 upon reading in of the changing over switch 46. Accordingly, the sequence advances to step F109 depending upon such judgment at step F108.

At step F109, the value of the flag $I_4$ is changed to 0 by the running condition changing over section 12 of the control section 25, and then at subsequent step F110, the latest speed $VA_I$ found out in the interrupt control as steps A123 to A128 of FIG. 8(iv) is read in as an actual speed of the vehicle at a point of time directly after the contact of the changing over switch 46 has been changed to an on-state, thereby completing the changing over switch control in the present control cycle.

Such changing over switch control as described above is the same as the changing over switch control in the first control cycle after the contact of the changing over switch 46 has been changed over to an on-state during accelerated running of the vehicle described hereinabove. Accordingly, the values of the flags $I_4$ and $I_6$ after completion of the changing over switch control are the same. Thus, after completion of the changing over switch control, the sequence advances via steps E129 and E132 of FIG. 12 to step E105 at which the designation by the running condition designating section 3 of the control section 25 is changed over to constant speed running.

The control at steps E105 to E109 is quite the same as the control executed at steps E105 to E109 in the first control cycle after releasing of the accelerator pedal 27 or in the first cycle after changing over of the contact of the changing over switch 46 into an on-state during accelerated running of the vehicle. In particular, irrespective of whether or not the present control cycle falls on a timing for opening or closing movement of the throttle valve 31, the throttle valve opening 31 is adjusted so as to effect constant speed running of the vehicle using as an aimed speed the actual speed $VA_I$ at a point of time directly after the contact of the changing over switch 46 has been changed to an on-state.

As a result, a required torque is produced from the engine 13 so that the running condition of the vehicle starts to change from decelerated running to constant speed running.

Such control as described above is executed in a first control cycle after the contact of the changing over switch 46 has been changed to an on-state. In case the automatic cruise mode control is executed continuously also in the following control cycle but the acceleration switch 45 is not operated, the sequence advances via steps E101 and E110 of FIG. 12 to step E128 to execute changing over switch control in such a manner as described hereinabove.

Since contents of the control in the first control cycle after the contact of the changing over switch 46 has been changed over to an on-state are the same as those of the control in the first control cycle after the contact has been changed to an on-state during constant speed running of the vehicle, the relevant flags have the same values, and consequently the changing over switch control is executed in a similar manner. The sequence thus advances via steps E129 and E132 to step E133 at which aimed speed control is executed in accordance with the flow chart shown at steps J101 to J116 of FIG. 16.

In the aimed speed control, it is judged at first at step J101 whether or not the value of the flag $I_8$ is equal to 1. Since here the value of the flag $I_8$ has been changed to 0 at step E106 of FIG. 12 in the first control cycle after changing over of the changing over switch 46 to an on-state, the sequence advances from step J101 to step J102.

At step J102, it is judged whether or not the value of the flag $I_{11}$ is equal to 1. It is to be noted that the flag $I_{11}$ indicates, when it assumes a value equal to 1, that the present control cycle falls on a timing for opening or closing movement of the throttle valve 31.

Since the present control cycle does not fall on a timing for opening or closing movement of the throttle valve 31 when the value of the flag $I_{11}$ is not equal to 1, the automatic cruise mode control in the present control cycle is completed immediately. To the contrary, in case the value of the flag $I_{11}$ is equal to 1, the present control cycle falls on a timing for opening or closing movement of the throttle valve 31, and accordingly the sequence advances to step J103 to execute the aimed speed control continuously.

In case the sequence advances to step J103, the actual speed VA read in at step A103 of FIG. 8(i) is substituted as a temporary value to the aimed speed VS for constant speed running. Thus, in preparation for control after the running speed of the vehicle becomes substantially fixed, the aimed speed VS is updated in value for each control cycle which falls on a timing for opening or closing movement of the throttle valve 31 until the running speed of the vehicle becomes substantially fixed in this manner.

Subsequently at step J104, it is judged whether or not the absolute value of the actual acceleration DVA into which $DVA_{65}$ or $DVA_{130}$ has been substituted as described hereinabove is smaller than the preset reference value $K\alpha$.

If it is judged at step J104 that the absolute value of the actual acceleration DVA is smaller than the reference value $K\alpha$ because the running speed of the vehicle has become substantially fixed and the deceleration of the vehicle has approached 0 as a result of execution of the aimed speed control, the sequence advances to step J108 at which the value of the flag $I_8$ is changed to 0, whereafter the sequence advances to step J109. To the contrary, in case the running speed has not yet become substantially fixed on the deceleration of the vehicle has not approached 0, it is judged at step J104 that the absolute value of the actual acceleration DVA is not smaller than the reference value $K\alpha$, and the sequence thus advances to step J105.

At step J105, it is judged whether or not the actual speed DVA is greater than 0. Since here the vehicle has been in a decelerated running condition before the contact of the changing over switch 46 is changed to an on-state, the actual deceleration DVA has a negative value, and the sequence thus advances to step J106.

At step J106, the value of the actual acceleration DVA added by the preset correction amount $\Delta DV_2$ is set to the aimed acceleration DVS, thereby completing the aimed speed control in the present control cycle.

After completion of such aimed speed control as described above, control is executed subsequently at steps E123 to E127 of FIG. 12 in a similar manner as in the various cases described hereinabove. Thus, the throttle valve 31 is opened or closed to a throttle valve opening $\theta_{TH2}$ corresponding to the aimed acceleration DVS for each control cycle which falls on an opening/closing timing for the throttle valve 31.

As a result, the vehicle makes deceleration running at a negative acceleration, that is, at a deceleration substantially equal to the aimed acceleration DVS.

Since the aimed acceleration DVS is a sum of the actual speed DVA in the control cycle and the correction amount $\Delta DV_2$, as such control is executed repetitively, the aimed acceleration DVS gradually approaches 0 in negative value. Consequently, the deceleration of the vehicle also approaches 0.

While the actual acceleration DVA approaches 0 in such a manner as described above, if it is judged at step J104 of FIG. 16 that the absolute value of the actual acceleration DVA is smaller than the preset reference value $K\alpha$, then the sequence advances via step J108 to step J109 as described hereinabove.

Control to be executed at step J109 and following steps J110 to J116 is the same as the control executed at step J109 to J116 when a constant speed running condition is entered as described above. Accordingly, in the control cycle wherein the sequence advances from step J104 via step J108 and then step J109 to step J116, setting of a required aimed acceleration DVS is accomplished so that the vehicle may run at a constant speed which coincides with the aimed speed VS set in value at step J103.

To the contrary, in case the aimed speed changing switch 48 is changed over to the (+) side or the (−) side of FIG. 6, modification of the set value of the aimed speed VS is accomplished in response to such changing over.

Also after execution of such aimed speed control as described above, opening or closing movement of the throttle valve 31 is similarly accomplished in the control at steps E123 to E127 of FIG. 12, and the vehicle runs at a constant running speed substantially equal to the aimed speed VS.

It is to be noted that, in the following control cycle after a control cycle in which the sequence advances from step J104 via step J108 to step J109, since the value of the flag $I_8$ has been changed to 0 at step J108, the sequence advances, in aimed speed control, from step J101 directly to step 109 so that such control as described above is executed.

Accordingly, in case, while the acceleration switch 46 is at the position [a], at first the contact of the changing over switch 45 is changed to an on-state to designate a deceleration running condition of the vehicle and then the contact is changed once to an off-state whereafter the contact of the changing over switch 46 is changed to an on-state again while the vehicle still remains in a decelerated running condition as described hereinabove, the designation by the running condition designating section 3 of the control section 25 is changed over from decelerated running to constant speed running and the decelerated running of the vehicle is stopped, and the vehicle will thereafter run maintaining a running speed which is substantially equal to the running speed at a point of time directly after the contact of the changing over switch 46 is changed to an on-state, that is, the running speed when the designation is changed over to constant speed running.

As the automatic cruise mode control is executed in such a manner as described so far, in case treadling of the brake pedal 28 is canceled while the accelerator pedal 27 remains in a released condition or in case treadling of the accelerator pedal 27 is canceled while the brake pedal 28 remains in a released condition, the vehicle makes constant speed running while maintaining the running speed at point of time directly after such canceling of treadling.

Then, in case the acceleration switch 45 is changed over to any one of the positions [b] to [d] of FIG. 6 while the vehicle is in a constant speed running condition or in case the contact of the changing over switch 46 is changed ot an on-state while the acceleration switch 45 is any one of the positions [b] to [d], the vehicle makes accelerated running at an acceleration corresponding to the position [b], [c] or [d] of the acceleration switch 45, and then after the running speed of the vehicle reaches the final aimed speed, the vehicle makes constant speed running at a constant running speed substantially equal to the final aimed speed. It is to be noted that, in case the contact of the changing over switch 46 is changed to an on-state to effect accelerated running of the vehicle, the set value of the final aimed speed increases as the duration of the on-state of the changing over switch 46 increases.

To the contrary, in case the acceleration switch 45 is changed over to the position [a] while the vehicle is in a constant speed running condition or in case the contact of the changing over switch 46 is changed to an on-state while the acceleration switch 45 remains at the position [a], the vehicle makes decelerated running, and after the final aimed speed is reached, constant speed running of the vehicle is accomplished at a constant running speed substantially equal to the final aimed speed. It is to be noted that, in case the contact of the changing over switch 46 is changed to an on-state to effect such decelerated running of the vehicle as described above, the final aimed speed decreases in set value as the duration of the on-state of the changing over switch 46 increases.

Further, in case the contact of the changing over switch 46 is changed to an on-state again while the vehicle is either in an accelerated running condition or in a decelerated running condition, the vehicle makes constant speed running while maintaining a running speed substantially equal to the running speed at a point of time directly after the contact has been changed to an on-state.

For example, in case the acceleration switch 45 is changed over, during accelerated running of the vehicle with the acceleration switch 45 positioned at the position [b], to the position [a], the vehicle makes constant speed running while maintaining a running speed substantially equal to the running speed at a point of time directly after such changing over of the acceleration switch 45. To the contrary, in case the aimed speed changing switch 48 is changed over to the (+) side or the (−) side in FIG. 6 while the vehicle is in a constant speed running condition, the set value of the aimed speed for constant speed running is increased or decreased in response to such changing over of the aimed speed changing switch 48, and as the duration of such changing over increases, the amount of increase or decrease of the set value of the aimed speed increases.

Where the engine 13 is controlled by the engine controlling system 1 of the first embodiment of the present invention having such construction as described above, the following effects can be attained.

For an interval of time until the rotational speed of the engine 13 rises to a rotational speed in a normal condition directly after starting of the engine 13, or when the operating condition of the engine 13 becomes unstable due to some causes so that the rotational speed of the engine 13 is decreased, the throttle valve 31 operates in response to movement of the accelerator pedal 27 in an equivalent condition to that the accelerator pedal 27 and the throttle valve 31 are mechanically coupled directly to each other.

Accordingly, in this instance, control of the throttle valve executed then does not depend upon a changing rate of the treadled amount of the accelerator pedal nor upon a running condition of the vehicle or the like. Accordingly, the throttle valve 31 is controlled stably, which prevents the running condition of the engine 13 from being rendered unstable.

To the contrary, in case the brake pedal 28 is treadled so that braking by the brake (not shown) of the vehicle is effected, the following effects can be attained.

Firstly, when such braking is being effected, since the throttle valve 31 is normally held at the minimum opening corresponding to the engine idling position in priority to any other instruction of the automatic cruise switch 18, accelerator pedal 27 or the like, a braking effect by engine brake is attained in addition to braking by the brake (not shown).

Secondly, in case the duration of a condition wherein a deceleration is greater than a reference value in branking by the brake continues for an interval of timer longer than a reference value and the speed of the vehicle upon canceling of treadling of the brake pedal 28 is lower than a reference value, the throttle valve 31 is held at the minimum opening position until the 10 accelerator pedal 27 is subsequently treadled. Accordingly, there is an effect that, in case the brake pedal 28 is released once directly after the vehicle has been stopped as a result of deceleration by the brake (not shown) in order to stop the vehicle at a crossing or the like, braking by engine brake is accomplished so that the vehicle is stopped smoothly and an impact upon stopping can be prevented.

Thirdly, in case, in braking by the brake, the deceleration does not exceed the reference value or such duration as described above is not longer than the reference value or else the speed of the vehicle upon canceling of such treadling as described above, the speed of the vehicle is maintained constant with an aimed speed defined by the speed of the vehicle at a point of time directly after canceling of treadling of the brake pedal 28 until the accelerator pedal 27 is subsequently treadled. Accordingly, there is no necessity of treadling the accelerator pedal 27 in order to maintain the speed of the vehicle nor of re-starting by manual operation for constant speed running control which is canceled each time the brake pedal 28 is treadled in a conventional constant speed running device. Accordingly, there is an effect that the burden to a driver is moderated and constant speed running of the vehicle is facilitated on a road where traffic is comparatively heavy.

Fourthly, upon transition to such a constant speed running condition as described above, for an interval of time till a timing for opening or closing movement of the throttle valve 31 which is encountered for the first time directly after canceling of treadling of the brake pedal 28, the throttle valve 31 is temporarily opened or closed to a throttle valve opening with which it is forecast for the vehicle to maintain the actual speed at a point of time directly after such canceling. Accordingly, there is an effect that transition to a constant speed running condition of the vehicle can proceed rapidly and smoothly from a point of time directly after canceling of treadling of the brake pedal 28.

Fifthly, where the throttle switch 47 provided on the automatic cruise switch 18 is positioned at the position [f], after the brake pedal 28 is released, the throttle valve 31 is normally maintained at the minimum opening corresponding to the engine idling position until the accelerator pedal 27 is treadled subsequently. Accordingly, upon running on a gentle descent or the like, the vehicle can run under additional braking by engine brake by changing over the throttle switch 47 to the position [f].

Subsequently, there are following effects when the accelerator pedal 27 is treadled.

Firstly, an acceleration of the vehicle is set in accordance with a treadled amount of the accelerator pedal 27, a changing rate of the treadled amount and an interval of time elapsed after the changing rate has become lower than a reference value. Consequently, the more quickly the accelerator pedal 27 is treadled, the more suddenly the vehicle is decelerated, and thus the more moderately the accelerator pedal 27 is treadled, the more slowly the vehicle is decelerated. Accordingly, acceleration of the vehicle of a high responsability upon which a will of the driver is reflected precisely can be attained. Also there is an effect that the acceleration is changed smoothly if such treadling is moderated or stopped and accordingly occurrence of an impact arising from a sudden change in acceleration can be prevented.

Secondly, after treadling of the accelerator pedal 27 is canceled, the speed of the vehicle is maintained constant with an aimed speed defined by the speed of the vehicle at a point of time directly after such canceling. Accordingly, there is no necessity of treadling the accelerator pedal 27 again in order to maintain the speed of the vehicle constant or of resetting an aimed speed each time the speed of the vehicle is changed by the accelator pedal 27 as in a conventional constant speed running device. Accordingly, there are effects that the burden to the driver is moderated and that constant speed running on a road where traffic is comparatively heavy is facilitated. The effects become particularly remarkable by a combination with such constant speed running after canceling of treading of the brake pedal 28 as described above.

Thirdly, upon transition to a constant speed running condition of the vehicle, for an interval of time till a timing for opening or closing of the throttle valve 31 which is encountered for the first time after canceling of treadling of the accelerator pedal 27, the throttle valve 31 is temporarily opened or closed to a throttle valve opening with which it is forecast for the vehicle to maintain the actual speed at a point of time directly after such canceling. Consequently, there is an effect that transition to a constant speed running condition from a point of time directly after such canceling can proceed rapidly and smoothly.

Fourthly, when the shift selector 29 is at a position other than for the D range or when the throttle valve switch 47 is at the position [e], the throttle valve 31 operates in response to movement of the accelerator pedal 27 in an equivalent condition to that the accelerator pedal 27 and the throttle valve 31 are mechanically coupled directly to each other. Accordingly, since the throttle 31 is moved in the closing direction if treadling of the accelerator pedal 27 is moderated or stopped, the vehicle can run, upon running, for example, on a sloping road, under additional braking by engine brake by moving the shift selector 29 to the L range position or by changing over the throttle switch 47 to the position e.

Fifthly, among aimed accelerations which are set upon treadling of the accelerator pedal, the aimed acceleration which is set in accordance with the treadled amount of the accelerator pedal 27 exhibits, with respect to a same treadled amount, a greater value during increase in treadled amount than during decrease in treadled amount as shown in FIG. 20. Consequently, there is an effect that the acceleration of the vehicle is increased or decreased in response to transition from increase to decrease or from decrease to increase in treadled amount of the accelerator pedal 27 and the driving feeling is improved.

Further, when transition to a constant speed running condition is to be effected in response to canceling of treadling of the accelerator pedal 27 or in response to canceling of treadling of the brake pedal 27, the aimed acceleration is set so that the acceleration of the vehicle may be gradually decreased finally to 0 as time passes after such canceling of treading. Accordingly, there is an effect that occurrence of an impact by a sudden change in acceleration upon transition to a constant speed running condition can be prevented.

Meanwhile, the following effects can be anticipated when the accelerator pedal 27 and the brake pedal 28 are both in a released condition and the vehicle is in a constant speed running condition as described hereinabove.

Firstly, one of three running conditions including accelerated running, decelerated running and constant speed running can be selected by operation of the acceleration switch 45 or the changing over switch 46, and acceleration or deceleration to a final aimed speed or transition to constant speed running after reaching of such final aimed speed is performed automatically in response to a single operation of the acceleration switch 45 or the changing over switch 46. Accordingly, there is an effect that a change in speed of the vehicle in accordance with situations during constant speed running on a highway or the like is facilitated and the burden to the driver is moderated.

Secondly, in case the contact of the changing over switch 46 is changed to an on-state to designate accelerated running or decelerated running, the difference between a speed of the vehicle before such designation and a final aimed speed is increased if the duration of the on-state of the changing over switch 46 increases because an aimed speed VS is equal to a sum of an actual speed VA, a correction amount $VK_1$ and another correction amount $VT_1$ corresponding to the duration of an on-state, that is, $VS=VA+VK_1+VT_1$, or a difference from an actual speed VA of a correction amount $VK_2$ and another correction amount $VT_2$ corresponding to the duration of an on-state, that is, $VS=VA-VK_2-VT_2$. Therefore, when it is intended to effect acceleration or deceleration of the vehicle beyond the final aimed speed, it is only necessary to change the contact of the changing over switch 46 to an on-state again to re-designate accelerated running or decelerated running and continue the on-state for a required period of time. Further, if the contact of the changing over switch 46 is changed to an on-state while the vehicle is in an accelerated or decelerated running condition, the vehicle is changed over to a constant speed running condition wherein the speed of the vehicle at a point of time directly after the contact of the changing over switch 46 has been changed to an on-state is employed as an aimed speed. Accordingly, in case a desired speed of the vehicle is reached before the final aimed speed is reached, it is only necessary to operate the changing over switch 46 once. In addition, since moderate acceleration, intermediate acceleration and quick acceleration are available for accelerated running by means of the acceleration switch 45, the aforementioned effects can be further promoted by combination of such operations.

Thirdly, if the speed of the vehicle changes suddenly on a sloping road or the like while the vehicle is in a constant speed running condition, then the aimed acceleration to restore the original speed of the vehicle is set to a value corresponding to a difference between an aimed speed and an actual speed detected by the speed detecting means and falling within a range not greater than a predetermined value such that the difference of the aimed acceleration from an acceleration of the vehicle at present may not exceed a preset value. Accordingly, there is an effect that a quick change in acceleration is eliminated and occurrence of an impact is prevented.

In case the acceleration switch 46 or the changing over switch 46 is operated to designate such an accelerated running condition as described hereinabove, the following effects can be anticipated.

Firstly, an aimed acceleration of a fixed value corresponding to the position of the acceleration switch 45 is not designated immediately after such designation of an accelerated running condition, but a slope is provided for rising of the aimed acceleration (refer to FIG. 27), and the aimed acceleration is designated such that the fixed value may be approached and finally reached by the actual aimed acceleration of the vehicle. Accordingly, there is an effect that occurrence of an impact or hunting by a sudden change in acceleration when transition from a constant speed running condition to an accelerated running condition takes place can be prevented.

Secondly, as the speed of the vehicle approaches a final aimed speed as a result of accelerated running, an aimed acceleration which decreases as the speed of the vehicle approaches the final aimed speed is designated in place of an aimed acceleration of a fixed value corresponding to the position of the acceleration switch 45. Consequently, when the speed of the vehicle reaches the final aimed speed, the acceleration of the vehicle changes smoothly and enters a constant speed running condition. Accordingly, there is an effect that occurrence of an impact by a sudden change in acceleration can be prevented.

Thirdly, when the speed of the vehicle is lower than the reference value, an aimed acceleration having a value which increases as the speed rises and approaches an aimed acceleration of a fixed value set in accordance with the position of the acceleration switch 45 is set again in place of the aimed acceleration of the fixed value. Accordingly, there is an effect that, if the acceleration switch 45 or the changing over switch 46 is operated to designate an accelerated running condition during slow running of the vehicle, acceleration of the vehicle is effected mor moderately and the driving feeling is improved.

To the contrary, in case the changing over switch 46 is operated to designate a decelerated running condition as described hereinabove, when the speed of the vehicle approaches a final aimed speed as a result of such decelerated running, an aimed deceleration which gradually approaches 0 as the speed of the vehicle approaches the final aimed speed in designated in place of the aimed deceleration of a fixed value till then. Accordingly, there is an effect that, when the speed of the vehicle approaches a final aimed speed, the acceleration of the vehicle changes smoothly and enters a constant speed running condition, and accordingly, occurrence of an impact by a sudden change in acceleration is prevented and the driving feeding can be improved.

It is to be noted that, since, even if the aimed speed changing switch 45 is operated, such instruction is ignored (steps J104 to J108 of FIG. 16) during accelerated running or decelerated running other than during constant speed running, confusion in control is prevented and control of the engine is assured by the present system.

Further, if an operation is made to change the speed of the vehicle during constant speed running, the vehicle will then make accelerated or decelerated running. In this instance, however, an aimed acceleration is set in accordance with a difference VS−VA between a new aimed speed VS and an actual speed VA (refer to FIGS. 23 and 25), and the engine is controlled in accordance with the aimed acceleration to accomplish changing of the speed of the vehicle. Accordingly, theres is an effect that occurrence of an impact by a sudden change in acceleration when the vehicle is changed over from a constant speed running condition to an accelerated running condition in a similar manner as described above.

Particularly, since, when the difference VS−VA becomes smaller than a fixed value (in short, the actual speed VA approaches the aimed speed VS), the aimed acceleration which has remained a fixed value so far is set such that it may decrease as the difference VS−VA decreases (refer to the map #MDVS3 of FIG. 23 and the map #MDVS5 of FIG. 25), convergence of the actual speed to the aimed speed is stabilized.

To the contrary, if the acceleration switch 45 or the changing over switch 46 is operated to designate a constant speed running condition while the vehicle is in an accelerated running condition or in a decelerated running condition, then the following effects can be anticipated.

Firstly, for an interval of time during transition to a constant speed running condition till a timing for opening or closing movement of the throttle valve 31 which is encountered for the first time directly after an operation for such transition, the throttle valve 31 is temporarily opened or closed to a throttle valve opening with which it is forecast for the vehicle to maintain the actual speed at a point of time directly after such operation. Accordingly, there is an effect that transition to a constant speed running condition directly after such operation can proceed rapidly and smoothly.

Secondly, since the aimed acceleration is gradually decreased (or increased) for each throttle valve opening/closing cycle upon transition to a constant speed running condition, the actual acceleration of the vehicle is gradually decreased (or increased) as time passes after the operation by actuating the throttle valve 31 in accordance wtih the gradually decreasing (or increasing) aimed acceleration. Then, when the actual acceleration becomes smaller (or greater) than the reference value, the speed of the vehicle is employed as a new aimed speed VS, and the aimed acceleration decreases (or increases) as the difference VS−VA decreases (or increases) so that the vehicle finally enters a constant speed running condition at a speed substantially equal to the aimed speed VS. Accordingly, there is an effect that occurrence of an impact by a sudden change in acceleration upon transition to a constant speed running condition is prevented.

When the accelerator pedal 27 and the brake pedal 28 are both in a released condition and automatic cruise mode control is being executed, the following effects can be attained.

Firstly, as a value of an actual acceleration which is used in automatic cruise mode control, one of $DVA_{65}$ which is high in follow-up performance to an actual change in acceleration of the vehicle and is suitable for control which requires a high responsibility, $DVA_{850}$ which is low in influence by an instantaneous disturbance and is suitable for control which requires a high stability and $DVA_{130}$ which has intermediate values between the values of them is selectively used suitably upon starting of a change in running condition, during the change in running condition or after completion of the change in running condition.

Consequently, there is an effect that, when, for example, treadling of the accelerator pedal 27 is canceled or treadling of the brake pedal 28 is canceled to place the vehicle into a constant speed running condition, and when the acceleration switch 45 or the changing over switch 46 is operated to put the vehicle into a different running condition, starting of such transition can be effected rapidly and precisely by using the value of $DVA_{65}$ in the control at a first opening/closing timing for the throttle valve 31 after starting of such transition. Further, there is an effect that, by using $DVA_{850}$ after a constant speed running condition is reached after such transition, stabilized control can be attained which is free from occurrence of an error in operation by a disturbance.

Secondly, the timing at which the throttle valve 31 is to be opened or closed is set with a cycle which increases in inverse proportion to a change in speed of the vehicle when the speed of the vehicle is varying such that the vehicle is making accelerated or decelerated running as a result of operation of any one of the running condition changing means such as the accelerator pedal 27, brake pedal 28, acceleration switch 45 and change-over switch 46. Accordingly, there is an effect that the frequency of opening or closing movement of the throttle valve 31 per unit time increases as the speed of the vehicle rises and driving of the vehicle of a high responsibility can be attained.

Thirdly, by the fail safe control wherein, in case an air pressure detected by the air pressure detecting device of the air suspension of the car weight detecting section 19 (data corresponding to the weight of the vehicle) changes suddenly, data of an actual acceleration obtained before such sudden change are adopted and control of the system is re-set to its initial condition, when it can be judged that an error has taken place in an actual acceleration DVA found out by the third interrupt control, latest ones of already calculated proper data (final calculated values) are adopted as data of the actual accelerations DVA ($DVA_{65}$, $DVA_{130}$ and $DVA_{850}$). Accordingly, even if a bump, a rebound or the like of a wheel is caused, for example, by an uneven configuration of a road surface to cause an error in car speed data, no erred acceleration data will be adopted. Consequently, there are advantages that running control of the vehicle is made smooth without being influenced by a disturbance, that desired control can be executed rapidly because possible latest acceleration data are adopted, and that a driving or operating feeling can be improved.

Then, after a constant speed running control is entered, since the speed of the vehicle is substantially constant and no great variation in opening of the throttle valve is involved, the timing described above is set with a constant period independent of the speed of the vehicle. Consequently, there is an effect that, even if the rate of high speed running is increased, possible deterioration in life of the throttle valve 31 and the throttle valve pivoting section 26 is prevented.

Then, after a constant speed running condition is reached, the speed of the vehicle becomes substantially fixed and there is no significant variation in opening of the throttle valve 31. Accordingly, such timings as described above are set with a fixed cycle independent of the speed of the vehicle. Consequently, there is an effect that, even if the rate of the throttle valve 31 and the throttle valve pivoting section 26 can be prevented.

Subsequently, an engine controlling system of a second embodiment of the present invention will be described. The engine controlling system of the second embodiment is different in part of automatic cruise mode from the engine controlling system of the first embodiment described hereinabove. In short, while the aimed acceleration DVS is caused to gradually approach 0 as means for causing the speed of the vehicle to approach an aimed speed VS upon transition to a constant speed running condition in the automatic cruise mode control in the embodiment described hereinabove, the speed of the vehicle is caused to approach and aimed speed VS by a different means.

To this end, the second embodiment is similar to the first embodiment except that, in the second embodimet, part of the construction of the engine controlling system and part of the automatic cruise mode control in control executed by the engine controlling system are different from those of the first embodiment Accordingly, for description of contents of construction of the system of the second embodiment, FIGS. 1 to 7 for the first embodiment can be used as they are, and for description of contents of control by the system of the second embodiment, FIGS. 8, 9, 11, 13 to 15, 17 and 18 can be used as they are while FIGS. 28, 29 and 30 corresponding to FIGS. 10, 12 and 16 relating to flow charts of the automatic cruise mode control will be used in place of FIGS. 10, 12 and 16, respectively.

It is to be noted that, in FIGS. 28, 29 and 30, like steps are denoted by like reference characters to those of FIGS. 10, 12 and 16, respectively.

To the contrary, since maps which are to be used for various controls of the second embodiment are similar to those used in the first embodiment, FIGS. 19 to 27 are used as they are.

As for the second embodiment, characteristic portions will be described with reference to FIGS. 28 to 30 except those portions of the first embodiment described hereinabove.

FIG. 28 is a flow chart illustrating details of non-direct throttle movement control executed at step A116 of the flow chart shown in FIG. 8(i). The non-direct throttle movement control involves, similarly as in the first embodiment, such actuation of the throttle valve 31 in response to movement of the accelerator pedal 27 that the acceleratro pedal 27 and the throttle valve 31 may not always have a mechanically directly coupled relationship to each other in order to control the engine 13.

FIG. 29 is a flow chart illustrating details of automatic cruise mode control executed at step C144 of the flow chart of FIG. 28. The automatic cruise mode control involves, similarly as in the first embodiment, such adjustment of the opening of the throttle valve 31 in response to information of the detecting sections adn switches 14 to 24 shown in FIG. 2 when treadling of the accelerator pedal 27 or the brake pedal 28 is canceled that the vehicle may make accelerated running, decelerated running or constant speed running in order to control the engine 13. However, the automatic cruise mode control is different in means for causing the speed of the vehicle to approach an aimed speed VS from that of the first embodiment.

FIG. 30 is a flow chart illustrating details of aimed speed control executed at step E133 of the flow chart of FIG. 29. The aimed speed control is executed principally by the constant speed controlling section 8 of the control section 25 similarly as in the first embodiment and involves modification of an aimed speed VS for constant speed running by the aimed speed changing switch 48 and setting of an aimed acceleration necessary for causing the speed of the vehicle to approach the aimed speed VS in the automatic cruise mode and another aimed acceleration necessary for maintaining the speed of the vehicle constant after the speed has been approached and become substantially equal to the aimed speed VS. Also here, the aimed speed control is different from that of the first embodiment in means for setting such an aimed acceleration that is necessary to cause the speed of the vehicle to approach the aimed speed VS.

The engine controlling system 1 of the second embodiment having such a construction as shown in FIGS. 1 and 7 operates in the following manner in such control as defined by the flow charts shown in FIGS. 28 to 30

After an ignition switch (not shown) is at first turned on to start the engine 13, control of the main flow shown at steps A101 to A117 of FIG. 8(i) is executed, and in preference to such control, first interrupt control which is to be executed for each 50 milliseconds in accordance with the flow chart of steps A118 to 120 of FIG. 8(ii), second interrupt control which is to be executed for each 10 milliseconds in accordance with the flow chart of steps A121 to A122 of FIG. 8(iii) and third interrupt control which is to be executed for each 65 milliseconds in accordance with the flow chart of steps A123 to A128 of FIG. 8(iv) are executed.

Contents of the controls in the second embodiment which are executed in accordance with the flow charts shown in FIGS. 8(i), 8(ii) and 8(iii) are different from those of the first embodiment only in the non-direct throttle movement control at step A116 including the automatic cruise mode control. Accordingly, operation of the engine controlling system 1 of the second embodiment proceeds in the quite same manner as in the first embodiment except when such non-direct throttle movement control is accomplished.

Further, in case such non-direct throttle movement control is executed, while the means for causing the speed of the vehicle to approach an aimed speed in the automatic cruise mode control is different, results thus attained are approach of the speed of the vehicle to the aimed speed and constant speed running wherein the speed of the vehicle is maintained constant. Thus, substantially similar results as in the first embodiment are attained.

While contents of the non-direct throttle movement control to be executed at step A116 are illustrated in the flow chart of FIG. 28, the flow chart is a modification to the corresponding flow chart (FIG. 10) of the first embodiment in that the step C129 is replaced by a step C147 and an additional step C146 is provided between the steps C147 and C128.

At step C147, the value of a latest actual speed $VA_I$ read in at step C121 of FIG. 28 in a similar manner as in the first embodiment is substituted as a first aimed speed $VS_1$. Meanwhile, at step C146, the value of a flag $I_{10}$ is changed to 0. The flag $I_{10}$ is used in the aimed speed control executed in the automatic cruise mode control and indicates, when it assumes a value equal to 1, that initial setting of a second aimed speed $VS_2$ has been aleady executed in the automatic cruise mode control.

In this manner, since the step C146 involves control relating in the automatic cruise mode control at step C144 while the step C147 only involves changing of the name and reference character of the step C129 of the first embodiment, operation of the engine controlling system 1 of the present embodiment is substantially same as that of the first embodiment except when the automatic cruise mode control at step C144 is executed while the brake pedal 28 and the accelerator pedal 27 are both in a released condition.

The automatic cruise mode control at steps C144 is executed in accordance with the flow chart shown in FIG. 29.

The flow chart of FIG. 29 is a modification to the corresponding flow chart of the first embodiment (FIG. 12) in that the step E105 is replaced by another step E134 and an additional step E135 is provided between the steps E106 and E107.

At step E134, the value of a latest actual speed $VA_I$ read in in the changing over switch control at step E128 or at step E104 in a similar manner as in the first embodiment is substituted into the first aimed speed $VS_1$. Meanwhile, at step E135, the value of the flag $I_{10}$ is changed to 0.

The step E134 only involves changing of the name and reference character of the aimed speed VS set in value at step E105 of FIG. 12 in the first embodiment into the first aimed speed $VS_1$ similarly as at step C147 of FIG. 28. Accordingly, in case the sequence advances from step E134 via steps E106 and E135 to step E107, calculation of an aimed torque $TOM_3$ necessary to maintain the speed of the vehicle at a value coincident with the first aimed speed $VS_1$ is executed at step E107 in accordance with the equation (5) used in the first embodiment in a similar manner as in the first embodiment.

Then, in case the automatic cruise mode control illustrated in the flow chart of FIG. 29 is executed and the sequence advances from step E101 to step E102 in a first control cycle after releasing of the accelerator pedal 27, the value of the flag $I_{10}$ to be used in the aimed speed control at step E133 is changed to 0 at step E135. Except the only difference in this regard from the first embodiment, the throttle valve 31 is pivoted to control the engine 13 in a similar manner as in the first embodiment so that the speed of the vehicle may be maintained at a value coincident with the first aimed speed $VS_1$ which is only different in name and reference character from the aimed speed VS of the first embodiment.

To the contrary, in case the accelerator pedal 27 has been already released in the preceding control cycle and the sequence advances from step E101 to step E110, two different controls are executed by way of step E135. One of the controls is executed when the sequence advances from step E114 via step E115 to step E104 and then via steps E134, E106 and E135 to step E107 similarly as described hereinabove, and the other control is executed when the sequence advances via steps E128 and E132 to step E134 and then via steps E106 and E135 to step E107 similarly as described hereinabove. in those cases, it is different from the first embodiment in that the value of the flag $I_{10}$ is changed to 0 at step E135.

Further, when the sequence advances from step E132 to step E133 and the aimed speed control is executed, contents of the aimed speed control are different from those of the first embodiment. The flag $I_{10}$ provided only in the second embodiment is used in the aimed speed control, and the substantial difference of the engine controlling means of the second embodiment from that of the first embodiment exists when the aimed speed control is executed. Conditions with which the aimed speed control is executed and contents of the control at the other steps than at step E133 at which the aimed speed control is executed are substantially same as those of the first embodiment.

Subsequently, description of the aimed speed control will be described which is executed in accordance with the flow chart shown in FIG. 30.

In short, at first at step J101, it is judged, similarly as in the first embodiment, whether or not the value of a flag $I_8$ is equal to 1. The flag $I_8$ indicates, when it assumes a value equal to 0, that the vehicle is running at a substantially constant speed as a result of execution of the automatic cruise mode control as described hereinabove.

Then, in case the speed of the vehicle is substantially constant already as a result of execution of the automatic cruise mode control, the sequence advances to step J130 depending upon such judgment at step J101, but in the other case, the sequence advances to step J102 similarly as in the first embodiment.

In particular, in case the sequence advances to step J101 before the speed of the vehicle becomes substantially fixed after transition to a running condition by the automatic curise mode control, and in case the sequence advances to step J101 before the speed of the vehicle is in a running condition by the automatic curise mode control, becomes substantially fixed after the acceleration switch 45 or the changing over switch 46 has been operated to designate constant speed running, the sequence then advances to step J102 depending upon such judgment at step J101.

To the contrary, in case the sequence advances to step J101 after the speed of the vehicle has become a substantially fixed value after transition to a running condition by the automatic cruise mode control, in case the sequence advances to step J101 after the speed of the vehicle has become substantially fixed after designation of constant speed running during accelerated or decelerated running of the vehicle, and in case the sequence advances to step J101 after the speed of the vehicle has reached an aimed sped and become substantially fixed as a result of accelerated or decelerated running, the sequence advances to step J130 depending upon such judgment at step J101.

In case the sequence advances from step J101 to step J102, it is judged at step J102 whether or not the value of flag $I_{11}$ is equal to 1. The flag $I_{11}$ indicates, when it assumes a value equal to 1, that the present control cycle is a throttle valve opening/closing timing cycle as described hereinabove.

In case the present control cycle falls on a throttle valve opening/closing timing cycle, the sequence advances to step J117 depending upon such jugment at step J102. To the contrary, in case the present control cycle does not fall on a throttle valve opening/closing timing cycle, the aimed speed control in the present control cycle is completed depending upon such judgment at step J102.

In case the sequence advances from step J102 to step J117, it is judged at step J117 whether or not the value of the flag $I_{10}$ is equal to 1.

In case initial setting of a value of the second aimed speed $VS_2$ has not yet been executed in the automatic cruise mode control, the sequence advances from step J117 to step J118 at which the actual speed VA read in at step A103 of FIG. 8(i) is designated as a value of the second aimed speed $VS_2$ to effect initial setting thereof. Then at step J119, the value of the flag $I_{10}$ is changed to 1, whereafter the sequence advances to step J120.

To the contrary, in case initial setting of the second aimed speed $VS_2$ has been executed already at step J118 in the preceding control cycle, since the value of the flag $I_{10}$ has been also changed to 1 at step J119, the sequence advances directly to step J120 depending upon such judgment at step J117.

By the way, aimed speed control is executed in the following six cases. When automatic cruise mode control is entered in any control cycle in response to canceling of treadling of the accelerator pedal 27, then such aimed speed control is executed in case neither of the acceleration switch 45 and the changing over switch 46 causes designation of constant speed running, in case constant speed running is designated by the acceleration switch 45 or the changing over switch 46, and in case the speed of the vehicle has reached a final aimed speed as a result of accelerated or decelerated running. Also when such automatic cruise mode control is entered in any control cycle in response to canceling of treadling of the brake pedal 28, the aimed speed control is executed in any of such three cases as describe above.

Among the six cases, in any of the four cases except the two cases wherein the speed of the vehicle has been reached a final aimed speed as a result of accelerated or decelerated running, the sequence advances to step J102.

In any of the four cases, since the value of the flag $I_{10}$ has been changed to 0 at step C146 of FIG. 28 or at step E135 of FIG. 29 as described hereinabove, the sequence advances from step J117 to J118 to effect setting of a second aimed speed again without fail in a first throttle valve opening/closing timing cycle. Further, since the value of the flag $I_{10}$ is changed to 0 at step J119 in the throttle valve opening/closing timing cycle, the sequence advances, in the following throttle valve opeing/closing timing cycle, from step J117 directly to step J120 as described hereinabove.

At step J120, it is judged whether or not the absolute value $|VS_2-VS_1|$ of a difference between the second aimed speed $VS_2$ and the first aimed speed $VS_1$ is smaller than a preset reference value $K_3$.

In case neither of the acceleration switch 45 and the changing over switch 46 is operated during execution of the automatic cruise mode control in any control cycle in response to canceling of treadling of the brake pedal 28, the latest actual speed $VA_l$ is designated as the first aimed speed $VS_1$ at step C147 (FIG. 28) in a first control cycle after such canceling of treadling of the brake pedal 28. But in the other cases, the latest actual speed $VA_l$ is designated as the first aimed speed $VS_1$ at step E134 (FIG. 29) in a first following control cycle.

Meanwhile, in any of the four cases described above, the initial value of the second aimed speed $VS_2$ is the actual speed read in at step A103 (FIG. 8(i)) in a throttle valve opening/closing timing cycle first encountered.

Since there is a difference in timing between setting of the first aimed speed $VS_1$ and setting of the second aimed speed $VS_2$, they have different values from each other. In short, in case the vehicle has been in an accelerated running condition till then, the second aimed speed $VS_2$ is higher thant the first aimed speed $VS_1$, but on the contrary in case the vehicle has been in a decelerated running condition till then, the first aimed speed $VS_1$ is higher than the second aimed speed $VS_2$.

Thus, if it is judged at step J120 that the absolute value $|VS-VA|$ is not smaller than the preset reference value $K_3$, then the sequence advances to step J121.

To the contrary, in case the difference between the first aimed speed $BS_1$ and the seond aimed speed $VS_2$ has decreased so that it is judged at step J120 that the absolute value $|VS_2-VS_1|$ is smaller than the preset reference value $K_3$, the sequence advandces to step J128.

After the sequence advances from step 120 to step J121, it is judged at step J121 whether or not the second aimed speed is higher than the first aimed speed $VS_1$. Then, if it is judged that the second aimed speed $VS_2$ is higher, the sequence advances to step J123, but on the contrary if it is judged that the second aimed speed $VS_2$ is not higher, the sequence advances to step J122.

At step J123, a value $VS_2-V_{K2}$ obtained by substraction of a preset correction value $V_{K2}$ from the second aimed speed $VS_2$ in the preceding control cycle is set to the value of a new second aimed speed $VS_2$, and the sequence advances to step J124. To the contrary, at step J122, a value $VS_2+V_{K2}$ obtained by addition of the preset correction vfalue $V_{K2}$ to the second aimed speed $VS_2$ in the preceding control cycle is set to the value of a new second aimed speed $VS_2$, and then the sequence advances to step J124.

Accordingly, by such control at steps J121 to J123 as described above, the value of the second aimed speed $VS_2$ is changed to approach the value of the first aimed speed $VS_1$ by the correction amount $V_{K2}$ for each opening/closing timing for the throttle valve 31.

At step J124, the second aimed speed $VS_2$ is set as a value of the aimed speed VS for constant speed running by the aimed speed control, and then at subsequent step J125, a difference $VS-VA$ between the aimed speed VS set in this manner and the actual speed VA read in at step A103 of FIG. 8(i) is calculated, whereafter the sequence advances to step J126.

At step J126, an aimed acceleration $DVS_3$ corresponding to the difference $VS-VA$ is read out from the map #MDVS3. The map #MDVS3 is the same as the map used at step L115 (FIG. 17) in the acceleration control described hereinabove, but here the aimed acceleration $DVS_3$ in the aimed speed control is used as an acceleration for causing the speed of the vehicle to approach the aimed speed VS until coincidence is reached. It is to be noted that the map #MDVS3 is provided to find out an aimed acceleration $DVS_3$ using the difference $VS-VA$ as a parameter, and the difference $VS-VA$ and the aimed acceleration $DVS_3$ have such a relationship as illustrated in FIG. 23.

Subsequently as step J127, the aimed acceleration $DVS_3$ is designated as a value of the aimed acceleration DVS which is to be subsequently used to calculate an aimed torque $TOM_2$ at step E123 (FIG. 29) after the aimed speed control, thereby completing the aimed speed control in the present control cycle.

After completion of the aimed speed control in this manner, control at steps E123 to E127 of FIG. 29 is executed in the quite similar manner as in the first embodiment. Then, by the control, an aimed torque $TOM_2$ for obtaining an acceleration of the vehicle equal to the aimed acceleration DVS set in the aimed speed control is calculated, and the throttle valve 31 is opened or closed to an opening $\theta_{TH2}$ thus determined so as to casue the engine 13 to produce the aimed torque $TOM_2$.

As a result, a torque substantially equal to the aimed torque $TOM_2$ is produced from the engine 13 so that the speed of the vehicle approaches the aimed speed VS, that is, the second aimed speed $VS_2$ as described hereinabove in connection with the first embodiment.

Accordingly, as the control at steps J121 to J127 shown in FIG. 30 in the aimed speed control described above is repetitively executed for each throttle valve opening/closing timing cycle, the second aimed speed $VS_2$ gradually approaches the first aimed speed $VS_1$ as described hereinabove.

In case the second aimed speed $VS_2$ approaches the first aimed speed $VS_1$ so that it is judged at step J120 that the absolute value $|VS_2-VS_1|$ of the difference between them is smaller than the preset reference value $K_3$, the sequence advances to step J128 at which the first aimed speed $VS_1$ is set as a value of the aimed speed VS for constant speed running in the aimed speed control. In short, after the second aimed speed $VS_2$ has approached the first aimed speed $VS_1$ sufficiently, the first aimed speed $VS_1$ becomes the aimed speed VS.

Then at subsequent step J129, it is judged whether or not the absolute value $|VS-VA|$ of a difference between the aimed speed VS and the actual speed VA read in at step A103 of FIG. 8(i) is smaller than a preset reference value $K_4$.

In case the speed of the vehicle has not yet approached the aimed speed sufficiently, it is judged that the absolute value $|VS-VA|$ is not smaller than the reference value $K_4$, and the sequence advances to step J125.

At step J125 and following steps J126 and J127, such control as described hereinabove is executed. Control to be executed at steps E123 to E127 of FIG. 29 after the control is also such as described hereinabove. AS a result of such control, the speed of the vehicle approaches the aimed speed VS.

Since the values of the first aimed speed $VS_1$ and the second aimed speed $VS_2$ are not yet changed in the following control cycle, the sequence advances from step J120 to J128 of FIG. 30 so that similar control as described above is executed. Then, if the speed of the vehicle sufficiently approaches the aimed speed VS and it is judged at step J129 that the absolute value $|VS-VA|$ is smaller than the reference value $K_4$, the value of the flag $I_8$ is changed to 0 at step J108, and after then, the control at steps J109 to J116 is executed.

Since the value of the flag $I_8$ is changed to 0 here at step J108, the sequence advances, in the following control cycle, to step J130 depending upon judgment at step J101 so long as the aimed speed control is executed continuously. Thus, at step J130, the value of the flag $I_{10}$ is changed to 0, whereafter the control at steps J109 to J116 is executed.

The control at steps J109 to J116 is quite similar to that in the first embodiment, and at steps J109 to J112, setting of the aimed speed VS is changed by means of the aimed speed changing switch 48, and then at steps J113 to J116, an aimed accleration DVS is set which is necessary to maintain the speed of the vehicle at a value coincident with the aimed speed.

It is to be noted that, since modification to the aimed speed VS by the control at steps J109 to J112 is effected after the absolute value $|VS-VA|$ of the difference between the aimed speed VS and the actual speed VA has been decreased to a value smaller than the reference value $K_4$, changing of setting of the aimed speeds VS by the aimed speed changing switch 48 is enabled, similarly as in the first embodiment, only when the vehicle is in a constant running condition wherein the speed of the vehicle is constant.

As a result of execution of such aimed speed control, the running condition of the vehicles enters a constant speed running condition in compliance with the following various cases.

In case automatic cruise mode control is entered as a result of canceling of treadling of the accelerator pedal 27 or the brake pedal 28, if neither of the acceleration switch 45 and the changing over switch 46 is operated, then the vehicle finally enters a constant speed running condition wherein it maintains a speed substantially equal to the speed at a point of time directly after such canceling of treadling.

To the contrary, in case either the acceleration switch 45 or the changing over switch 46 is operated to designate constant speed running, the vehicle finally enters a constant speed running condition wherein the speed thereof is substantially equal to the speed at a point of time directly after such operation.

On the other hand, in case the speed of the vehicle reaches an aimed speed as a result of accelerated or deceleration running of the vehicle, the vehicle finally enters a constant speed running condition wherein the speed thereof is substantially equal to a final aimed speed.

Since the control of the engine 13 by the engine controlling system 1 of the second embodiment of the present invention is executed in such a manner as described above, substantially similar effects to those of the first embodiment can be attained. In addition, the following effects peculiar to the second embodiment can be attained by the aimed speed control which is different from that of the first embodiment.

In short, in case the accelerator pedal 27 is treadled to effect acceleration of the vehicle and then the treadling is canceled, at first the actual speed $VA_f$ at a point of time directly after such canceling is set to the first aimed speed $VS_1$, and the throttle valve 31 is temporarily pivoted to an opening position at which it is forecast for the vehicle to maintain the first aimed speed $VS_1$. Subsequently, when a first throttle valve opening/closing timing cycle is encountered in the following control cycle, the actual speed VA is set to the second aimed speed $VS_2$ and the opening of the throttle valve 31 is adjusted to control the engine 13 so that the speed of the vehicle may approach the second aimed speed $VS_2$ while the second aimed speed $VS_2$ is caused to gradually approach the first aimed speed $VS_1$. Consequently, the speed of the vehicle finally becomes substantially coincident with the first aimed speed $VS_1$ and is thereafter maintained constant at the first aimed speed $VS_1$.

Accordingly, firstly there is an effect that the speed of the vehicle in a constant speed running condition coincides further accurately with the speed at a point of time directly after cancelling of treadling of the accelerator pedal 27.

Secondly, not the first aimed speed $VS_1$ but the second aimed speed $VS_2$ is employed as an aimed speed for constant speed running immediately in a first throttle valve opening/closing timing cycle after canceling of treadling of the accelerator pedal 27 in order to decrease the difference between the aimed speed and the speed of the vehicle at a point of time directly before the throttle valve 31 is opened or closed in the first throttle valve opening/closing timing cycle.

Accordingly, there is an effect that sudden change in speed and acceleration of the vehicle when the throttle valve 31 is opened or closed in the throttle valve opening/closing timing cycle is eliminated and accordingly occurrence of a disagreeable impact is prevented and a very smooth change in speed can be realized.

Subsequently, in case the brake pedal 28 is treadled to decelerate the vehicle and then such treadling is canceled, similarly as in the first embodiment, except when the condition wherein the deceleration of the vehicle upon deceleration is higher than a reference value continues for an interval of time longer than a reference interval of time and the speed of the vehicle upon such canceling of treadling is lower than a reference value, the first aimed speed $VS_1$ and the second aimed speed $VS_2$ are set to effect opening or closing movement of the throttle valve 31 in a similar manner as upon canceling of treadling of the accelerator pedal 28.

Accordingly, firstly there is an effect that the speed of the vehicle in a constant speed running condition coincides further accurately with the speed at a point of time directly after canceling of treadling of the brake pedal 28.

Secondly, the second aimed speed $VS_2$ is employed as an aimed speed of constant speed running immediately in a first throttle valve opening/closing timing cycle after canceling of treadling of the brake pedal 28 in order to decrease the difference between the aimed speed and the speed of the vehicle at a point of time directly before the throttle valve 31 is opened or closed in the first throttle valve opening/closing timing cycle.

Accordingly, there is an effect that sudden change in speed and acceleration of the vehicle when the throttle valve 31 is opened or closed in the throttle valve opening/closing timing cycle is eliminated and accordingly occurrence of a disagreeable impact is prevented and a very smooth change in speed can be realized.

It is to be noted that the throttle valve opening/closing timing cycle in the embodiment described above corresponds to an engine output adjusting cycle.

Description of the second embodiment is completed with this.

Figure 31:
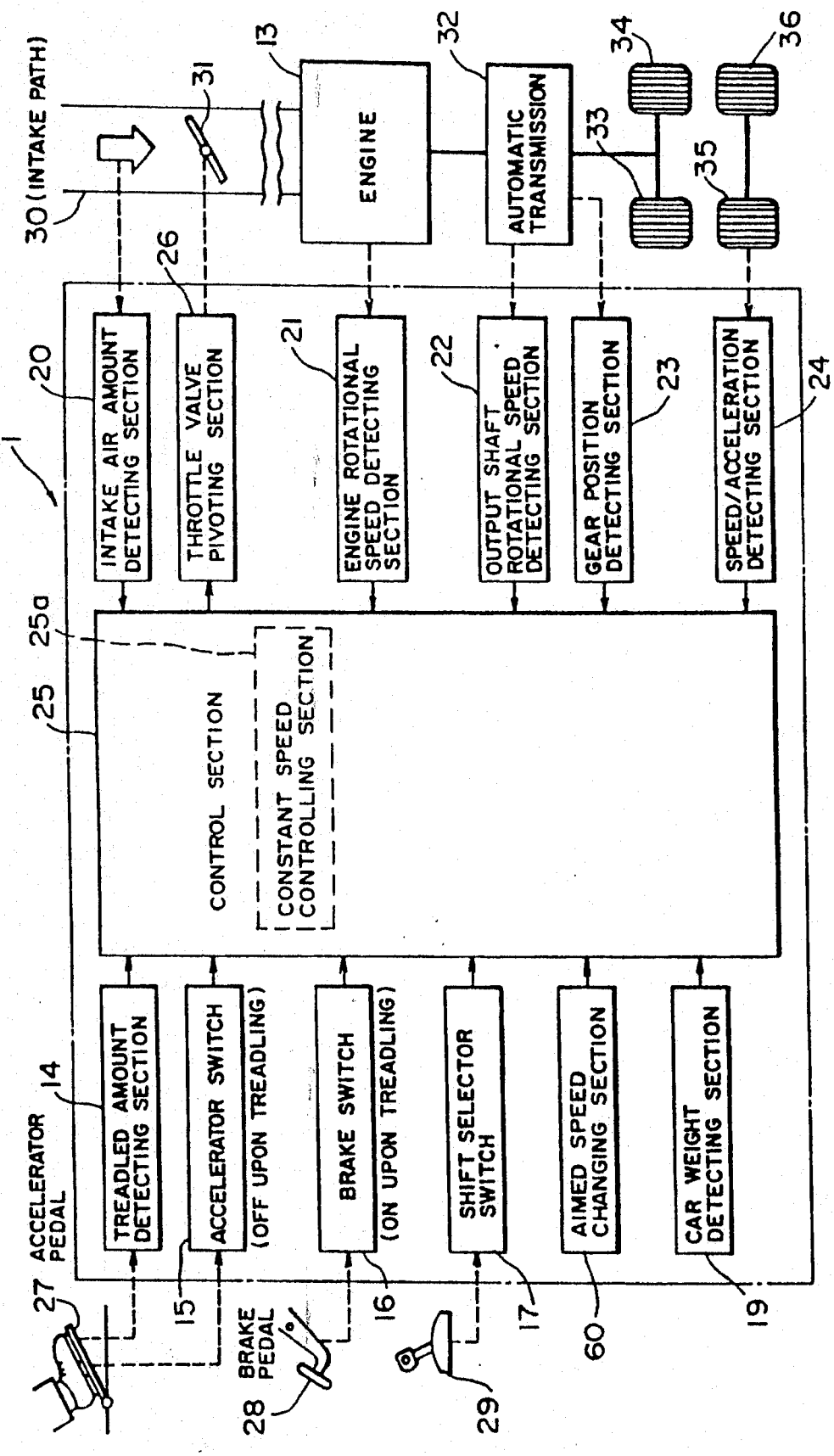
FIG. 31 is a block diagram schematically showing general construction of a vehicle engine controlling system according to a third embodiment of the present invention.
Figure 32:
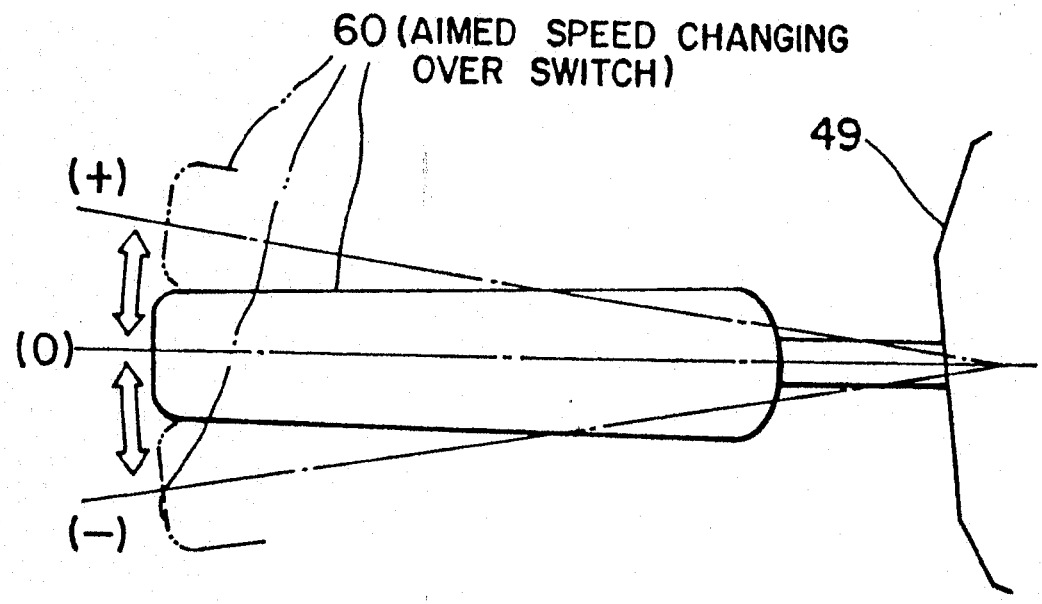
FIG. 32 is a front elevational view of an aimed speed changing switch of the vehicle engine controlling system of FIG. 31.

Subsequently, description will be given of a vehicle engine controlling system according to a third preferred embodiment of the present invention which is shown in FIGS. 31 to 35, among which FIG. 31 is a block diagram showing the entire system and FIG. 32 is a front elevational view of an aimed speed changing switch of the system.

As shown in FIG. 31, the vehicle engine controlling system of the third embodiment includes an aimed speed changing switch 60 in place of the automatic cruise switch 18 in the vehicle engine controlling system of the first embodiment described hereinabove. Consequently, the acceleration switch 45, change-over switch 46 and throttle switch 47 provided on the automatic cruise switch 18 are omitted from the aimed speed changing switch 60. Accordingly, with the vehicle engine controlling system of the present embodiment, various controls relating to the switches 45, 46 and 47, that is, the change-over switch control (refer to FIG. 13), deceleration switch control (refere to FIG. 14), deceleration control (refer to FIG. 15), acceleration control (refer to FIG. 17) and so forth in the automatic cruise mode control, are not executed, and the automatic cruise mode control principally includes aimed speed control which is executed by the constant speed running controlling means (constant speed controlling means) 8 in accordance with a flow chart shown in FIG. 35.

The aimed speed changing switch 60 has such a form of, for example, a lever provided projectingly on a steering column 49 as shown in FIG. 32. When the aimed speed changing switch 60 is pivoted upwardly or downwardly from such a neutral position as shown in solid lines in FIG. 32, it is turned on to change a set value of an aimed speed for constant speed running. In particular, in the present embodiment shown, if the aimed speed changing switch 60 is pivoted upwardly, then a (+) side contact is closed to increase an aimed speed, but on the contrary if the aimed speed changing switch 60 is pivoted downwardly, the a (−) side contact is closed to decrease the aimed speed. In this instance, similarly to the aimed speed changing switch 48 of the automatic cruise switch 18 described hereinabove, the final aimed speed is increased or decreased in proportion to a period of time while either one of the contacts is in a closed condition, that is, a duration of an on-state of either contact of the aimed speed changing switch 60. Further, if the aimed speed changing switch 60 is released after operation thereof, it will be automatically returned to its initial position, that is, the neutral position shown in FIG. 32 to return to an off-state. Accordingly, if the aimed speed changing switch 60 is manually pivoted to increase or decrease a final aimed speed and then released, then the final aimed speed is set to a value at a point of time at which the switch 60 is released from manual operation.

The remaining construction of the system is substantially similar to that of the system of the first embodiment described hereinabove except those elements which relates to the switches 45, 46 and 47. Accordingly, the description relating to FIGS. 1(i) and 1(ii), 3 to 5 and 7 can apply as it is to description of construction of the system of the third embodiment.

In the following, contents of control of the vehicle engine controlling system of the present embodiment will be described.

Figure 33I:
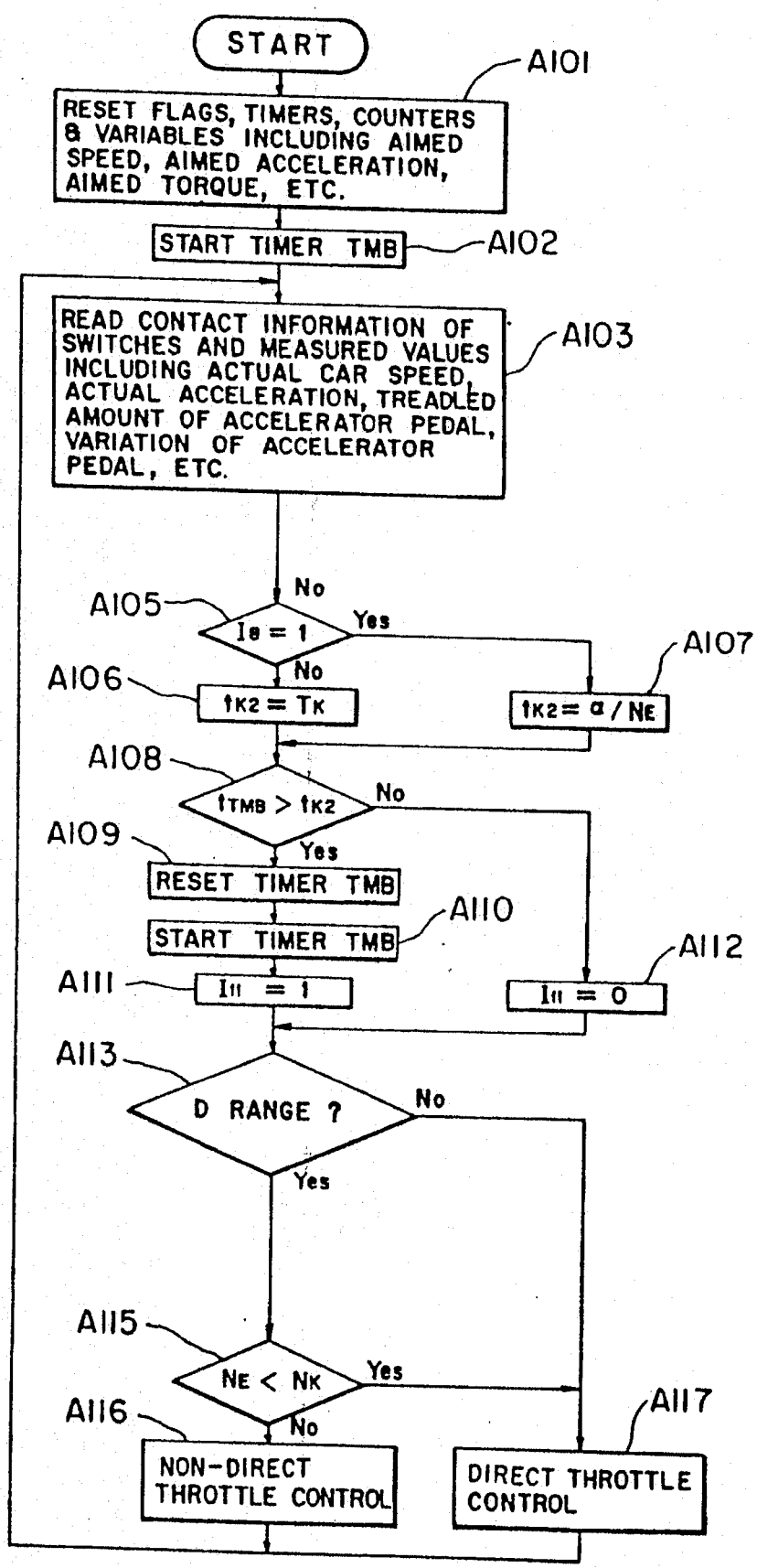
FIG. 33(i) is a flow chart of a main routine illustrating general operation of the vehicle engine controlling system of FIG. 31, and FIGS. 33(ii) to 33(iv) are flow charts of interrupt routines illustrating operation of the vehicle engine controlling system of FIG. 31.
Figure 33:
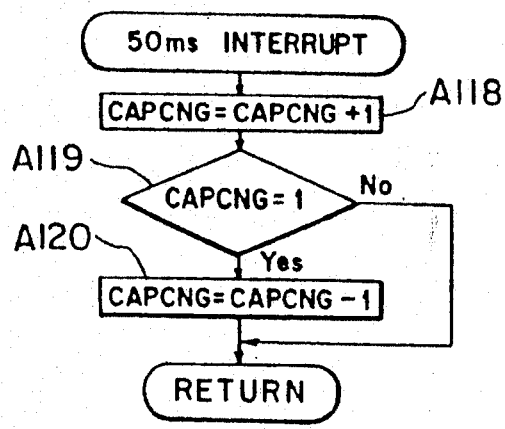
Figure 33:
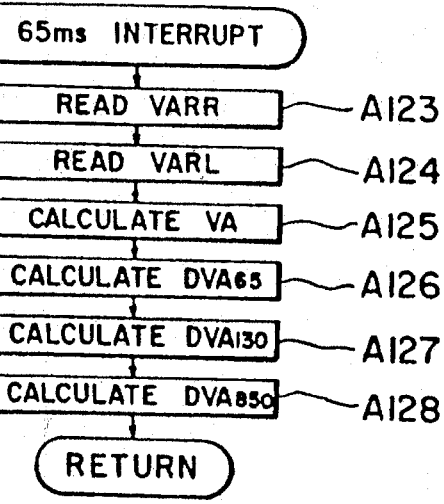

FIGS. 33(i) is a main flow chart illustrating contents of main operation of the present control; FIGS. 33(ii) to 33(iv) are flow charts illustrating contents of interrupt controls which are each executed in priority by an interrupt of the main flow chart; FIG. 34 is a flow chart illustrating details of control of non-direct throttle movement executed at step A116 of FIG. 33(i); FIG. 35 is a flow chart illustrating details of automatic cruise mode control executed at step C144 of FIG. 34. It is to be noted that like reference numerals in FIG. 31 denote like parts or elements to those of FIG. 2. Further, FIGS. 33(i) to 33(iv), 34 and 35 correspond to FIGS. 8(i) to 8(iv), 10 and 12, respectively, and those steps denoted by like reference characters have like contents of control. In addition, FIG. 9 of the first embodiment described hereinabove is used as a flow chart illustrating details of direct throttle movement control executed at step A117 of FIG. 33(i) of the present embodiment; FIG. 11 is used as a flow chart illustrating details of acceleration mode control executed at step C137 of FIG. 34; FIG. 16 is used as a flow chart illustrating details of aimed speed control executed at step E133 of FIG. 35; and FIG. 18 is used as a flow chart illustrating details of control of determination of an aimed acceleration $DVS_4$ executed at step J115 of FIG. 16, and besides, FIGS. 19 to 24 are used as maps which are used for control with the engine controlling system.

In the main flow chart illustrating principal contents of the present control of FIG. 33(i), the steps A104 and A114 of the corresponding flow chart of the first embodiment (FIG. 8(i)) are omitted. In particular, since in the present embodiment aimed speed control is executed mainly to cause the vehicle to make constant speed running at an aimed speed, the judgment of a flag $I_4$ at step A104 is unnecessary, and since no throttle switch is provided, the step A114 is also unnecessary. Since contents of the remaining part of FIG. 33(i) and control of FIGS. 33(ii) to 33(iv) are similar to those of FIGS. 8(i) to 8(iv), respectively, detailed description thereof will be omitted herein.

Also the non-direct throttle movement control shown in FIG. 34 is similar to that of the first embodiment except that the judgment regarding the throttle switch (step C123) and the setting of the flag $I_4$ (step C145) in the corresponding control (FIG. 10) of the first embodiment are omitted. Accordingly, detailed description thereof will also be omitted herein.

Here, contents of the automatic cruise mode control will be described in detail with reference to the flow chart of FIG. 35.

The automatic cruise mode control at step C144 of FIG. 34 executed in the non-direct throttle movement control is executed in accordance with the flow chart of steps E101 to E133 of FIG. 35.

The automatic cruise mode control is executed when neither of the accelerator pedal 27 and the brake pedal 28 is treadled in the non-direct throttle movement control described hereinabove.

Referring to FIG. 35, it is judged at first at step E101 whether or not the contact of the accelerator switch 15 was in an on-state in the preceding control cycle without the accelerator pedal 27 being treadled. In case the present control cycle is a first control cycle after the accelerator pedal 27 has been released and the contact of the accelerator switch 15 has been brought into an on-state, the sequence advances to step E104 depending upon such judgment at step E101. On the contrary, in case the accelerator pedal 27 was released and the contact of the accelerator switch 15 was in an on-state already in the preceding control cycle, the sequence advances to step E133 depending upon such judgment at step E101.

In case the sequence advances to step E104, the latest actual speed $VA_f$ calculated in the interrupt control at steps A123 to A128 of FIG. 33(iv) is read in, at step E104, as an actual speed of the vehicle directly after releasing of the accelerator pedal 27, and then at step E105, the actual speed $VA_f$ is substituted into the aimed speed VS.

Then at sttep E106, the value of a flag $I_8$ is changed to 0. The flag $I_8$ indicates, when it assumes a value equal to 0, that the speed of the vehicle is maintained substantially constant by the automatic cruise mode control.

Subsequently at step E107, an aimed torque $TOM_3$ of the engine 13 necessary to maintain the speed of the vehicle at the aimed speed VS is calculated in the following equation (4) similarly as in the first embodiment, and then the sequence advances to step E108.

$$TOM_3=[\{(W\cdot r/g)\cdot ks+ki\}\cdot(DVS_3-DVS_{65})+T_Q\cdot TEM]/T_Q \tag{4}$$

At step E108, a throttle valve opening $\theta_{TH3}$ corresponding to the aimed torque $TOM_3$ calculated at step E107 and the engine rotational speed $N_E$ detected by the engine rotational speed detecting section 18 and read in at step A103 of FIG. 8(i) is read out from the map #MTH described hereinabove.

Subsequently at step E109, a signal inidicative of the throttle valve opening $\theta_{TH3}$ is delivered from the control section 25 to the actuator driving section 39 of the throttle valve pivoting section 26. Consequently, a required driving signal is delivered from the actuator driving section 39 to the throttle valve actuatoor 40 so that the throttle valve actuator 40 pivots the throttle valve 31. In this instance, the opening of the throttle valve 31 is fed back to the actuator driving section 39 by way of the throttle valve opening detecting section 41 to efect feedback control.

Then, after the throttle valve 31 is pivoted to a predetermined position, the actuator driving section 39 no more delivers the driving signal, and consequently the throttle valve 31 is stopped at the predetermined position, thereby completing the automatic cruise mode control in the present control cycle.

As the throttle valve 31 is operated to open or close the intake air path 30 in this manner, the amount of air taken into the engine 13 and the amount of fuel supply is also changed as described hereinabove. Consequently, a torque substantially equal to the aimed torque $TOM_3$ is produced from the engine 13.

The torque produced from the engine 13 in this manner is substantially equal to a torque necessary to maintain the speed of the vehicle at the aimed speed which is equal to the actual speed of the vehicle at a point in time directly after releasing of the accelerator pedal 17 as described hereinabove. Then, by the control at steps E104 to E109 described above, the throttle valve 31 is temporarily pivoted, directly after releasing of the accelerator pedal 27, to a position of a throttle valve opening which will maintain the speed of the vehicle directly after releasing of the accelerator pedal 27 even when the present control cycle is not a control cycle which falls on a timing at which opening or closing movement of the throttle valve 31 is to be performed in order to make preparations for subsequent transition to a constant speed running condition at the aimed speed.

Such pivotal motion of the throttle valve 31 by the control at steps E104 to E109 described above is substantially same as pivotal motion of the throttle valve 31 by the control at steps C121 and C129 to C132 of FIGS. 10 and 34 in the non-direct throttle movement control described hereinabove, but only the difference resides in requirements for starting the control.

To the contrary, in case the contact of the accelerator switch 115 was in an on-state and the sequence advances from step E101 to step E133, then aimed speed control is executed at step E133 in acordance with the flow chart shown in FIG. 16 similarly as in the first embodiment described hereinabove. Since the aimed speed control is similar to that of the first embodiment, description thereof will be omitted herein.

In this manner, also with the vehicle engine controlling system of the present embodiment described above, direct throttle movement control as well as aimed speed control of the automatic cruise mode control can be executed in a similar manner as in the system of the first embodiment. Particularly with the aimed speed control, substantially similar effects to those of the first embodiment can be attained.

It is to be noted that thhe aimed speed changing switch 60 is not limited to the specific switch shown in FIG. 32 and may be of any other type such as the aimed speed changing switch 48 of the turning type which is provided on the automatic cruise switch 18 of the first embodiment.

Subsequently, a vehicle engine controlling system according to a fourth embodiment of the present invention will be described. The vehicle engine controlling system is a modification to the system of the third embodiment to which the control of the second embodiment is applied. In short, while in the third embodiment the aimed acceleration DVS is changed to gradually approach zero as means for making the speed of the vehicle approach an aimed speed VS upon transition into a constannt speed running condition by automatic cruise mode control, in the fourth embodiment, the speed of the vehicle is made approach an aimed speed VS by a different means.

To this end, the vehicle engine controlling system of the fourth embodiment is made substantially similar to that of the third embodiment except part of the construction of the system and part of automatic cruise mode control among various controls executed by the system.

Accordingly, contents of control of the system of the present embodiment can be described as FIGS. 34 and 35 of the third embodiment are changed to FIGS. 36 and 37, respectively, similarly to the second embodiment with respect to the first embodiment.

FIG. 36 is a flow chart illustrating details of non-direct throttle movement control (step A116 of FIG. 33($i$)). The flow chart of FIG. 36 includes additional stesp C146 and C147 to the flow chart of FIG. 34. Meanwhile, FIG. 37 is a flow chart illustrating details of automatic cruise mode control executed at step C144 of FIG. 31, and the flow chart of FIG. 37 includes an additional step E135 to the flow chart of FIG. 35. Further, in the present embodiment, FIG. 30 of the second embodiment is appropriated as aimed speed control in place of FIG. 16 which is appropriated in the third embodiment.

Details of various controls in the present embodiment are similar to corresponding ones of the controls of the first to third embodiments described hereinabove, and overlapping description thereof will be omitted herein.

With such control of the vehicle engine controlling system of the present embodiment described above, similar effects to those of the second embodiment can be attained.

In the following, description will be given of such engine controlling system 1 where it is installed in a vehicle which has a manual transmission.

While each of the engine controlling systems 1 of the first and second embodiments is installed in the vehicle which has the automatic transmission 32, such system 1 can be installed also in a vehicle having a manual transmission (not shown). With the system 1, substantially similar effects to those of the first and second embodiments described hereinabove can be attained.

In this instancce, the construction of the engine controlling system 1 of the first and second embodiments shown in FIG. 2 should be modified in the following regards.

In short, the output rotational speed detecting section 22 is eliminated and a manual transmission (not shown) is provided in place of the automatic transmission 32, and a shift lever (not shown) for manually selecting a gear position of the manual transmission is provided in place of the shift selector 29. Further, the shift selector 17 is replaced by a shift position switch (not shown) which has a contact which presents an on-state when the shift lever is positioned at a neutral position or at a position for rearward running or when a clutch pedal (not shown) is treadled.

Contents of control executed by the engine controlling system 1 which is modified for the manual transmission in such a manner as described just above are modified in the following points to those of the first and second embodiments.

In short, in the control executed at step A113 of FIG. 8($i$), it is judged whether or not the contact of the shift position switch (not shown) is in an on-state. Then, if it is judged that the contact is in an on-state, then the sequence advances to step A117, but on the contrary if it is judged that the contact is in an off-state, then the sequence advances to step A114.

Meanwhile, the value of the speed ratio e for calculating a torque ratio $T_Q$ in the equation (1) used at step C130 of FIG. 10 or FIG. 28, the equation (2) used at step D123 of FIG. 11, the equation (4) used at step E107 of FIG. 12 or FIG. 29 and the equation (5) used at step E123 of FIG. 12 or FIG. 29 is equal to 1.

Operation of the engine controlling system 1 having such a construction as described above is different from that of the engine controlling system 1 of the first and second embodiments only at step A113 which is modified as described above.

In particular, when the shift lever is at the neutral position or at the position for rearward running or when the clutch pedal (not shown) is treadled, the contact of the shift position switch is in an on-state. Accordingly, depending upon such judgment at step A113, the sequence advances to step A117 at which direct throttle movement is performed in a similar manner as in the first embodiment or in the second embodiment.

To the contrary, when the shift lever is positioned at any other position, than the neutral position and the position for rearward running and the clutch pedal is not treadled, the contact of the shift position switch is in an off-state. Accordingly, depending upon such judgment at step A113, the sequence advances to step A114 at which control is executed in a similar manner as in the first embodiment or the second embodiment.

Accordingly, also where such engine controlling system is installed in a vehicle which has a manual transmission, substantially similar effects to those of the first embodiment or the second embodiment can be attained.

Meanwhile, the shift lever of such an engine controlling system as described above may have, at a position thereof at which the shift position switch presents an on-state, a first speed position which may be used as the low gear position, or such a first speed position and a second speed position as the second gear position, or otherwise such first and speed positions and a third speed position as the third gear position.

Description of the engine controlling system 1 as installed in the vehicle which has the manual transmission is thus completed.

The engine controlling systems of the different embodiments described hereinabove may have such modification as described below.

When the acceleration switch 45 or the changing over switch 46 is operated to designate an accelerated running condition or a decelerated running condition while automatic cruise mode control is executed in a control cycle and the vehicle is in a constant speed running condition, a set value of a final aimed speed may be modified by the final aimed speed setting section 6 of the control section 25.

In short, the set value of the final aimed speed then is a sum of a correction amount $V_{K1}$ and an actual speed VA detected by the speed/acceleration detecting section 24 when an accelerated running condition is designated but is a difference of a correction amount $V_{K2}$ from an actual speed VA detected by the speed/acceleration detecting section 24 when a decelerated running condition is designated. However, the final aimed speed may be set otherwise by multiplying an actual speed VA by a preset coefficient.

Or else, an aimed speed VS while the vehicle has been in a constant speed running condition may be employed in place of an actual speed VA. Meanwhile, substantially similar effects can be attained if the two correction amounts $V_{K1}$ and $V_{K2}$ have a same value.

Subsequently, when the changing over switch 46 is operated to designate a decelerated running condition while the vehicle is in a constant speed running condition, the aimed acceleration may be increased gradually for each control cycle after such designation similarly as when an accelerated running condition is designated. In this instance, in addition to the effects attained by the embodiments described hereinabove, there is an effect that transition to decelerated running proceeds further smoothly.

To the contrary, in case the throttle switch 47 is moved to the position [f], the throttle valve 31 is normally maintained at its minimum opening position corresponding to the engine idling position after canceling of treadling of the brake pedal 28. In this instance, the throttle valve 31 may be normally maintained at its minimum opening position further after canceling of treadling of the accelerator pedal 27.

Further, the acceleration switch 45 has the four positions [a] to [d] shown in FIG. 6, and in case changing over of the acceleration switch 45 is effected without effecting operation of the changing over switch 46, if the acceleration switch 45 is changed over to the position [a], a constant speed running is designated, but if the acceleration switch 45 is changed over to any of the positions [b] to [d], accelerated running is designated by the running condition designating section 3 of the control section 25. However, running conditions corresponding to the positions [a] to [d] may not be limited to such as described above, and arbitrary running conditions may be designated by the individual positions [a] to [d] of the acceleration switch 45.

Further, while delerated running is not designated by mere changing over of the acceleration switch 45 in the embodiments described above, one of the four positions of the acceleration switch 45 may be a position for selective setting of decelerated running in order to enable designation of decelerated running by mere changing over of the acceleration switch. Besides, selection of the acceleration switch 45 is not limited to the four positions [a] to [d] and may otherwise have an increased or decreased number of positions.

In addition, changing over of a running condition corresponding to operation of the changing over switch 46 is not limited to such as described hereinabove in connection with the embodiments, and arbitrary running conditions may be set in combination for each position of the acceleration switch 45 so that they may be changed over in response to operation of the changing over switch 46.

Subsequently, in case, when deceleration of the vehicle is performed by the brake (not shown), the duration of a condition wherein deceleration of the vehicle is greater than a reference value is longer than a reference interval of time and the speed of the vehicle upon deceleration is lower than a reference value, the throttle valve 31 is maintained at the minimum opening corresponding to the engine idling position continuously after canceling of releasing of the brake pedal 28. The requirements may be modified in accordance with characteristics or an object for use of the vehicle.

The requirement for holding the throttle valve to the engine idling position may be such, for example, as follows.

In particular, a requirement may be (1) that the deceleration upon treadling of the brake pedal is greater than the reference value, or (2) that the duration of a treadled condition of the brake pedal is longer than the reference value, or else (3) that the speed of the vehicle upon canceling of treadling of the brake pedal is lower than the reference value. Or, as a requirement provided by a suitable combination of the requirements listed above, a requirement may be, for example, (4) that the deceleration upon treadling of the brake pedal is greater than the reference value and the speed of the vehicle upon deceleration (speed of the vehicle upon canceling of treadling of the brake pedal) is lower than the reference value, or (5) that the duration of a condition wherein the deceleration upon treadling of the brake pedal is greater than the reference value is longer than the reference value.

Meanwhile, although judgment of a degree of deceleration is made depending on deceleration, it may otherwise be made depending on a magnitude of pressure of brake oil for actuating the brake.

Further, automatic cruise mode control is executed in each control cycle. An additional function may be provided of indicating an aimed speed for constant speed running when constant speed running is designated as a running condition of the vehicle but indicating a final speed for accelerated running or for deceleration running when accelerated running or decelerated running is designated. In this instance, changing of a set value of an aimed speed or a final aimed speed can be made while confirming the same by eyesight.

Further, in the engine controlling system 1 of the embodiments described above, when the accelerator pedal 27 and the brake pedal 28 are both in a released condition, constant speed running is normally designated as a running condition of the vehicle except a special case. However, constant speed running may otherwise be performed only when constant speed running is designated artificially as in a conventional system. In this instance, since designation of a running condition is made artificially, similar effects can be attained by rendering the engine controlling system 1 operative when the vehicle is accomplishing constant speed running.

In addition, in the engine controlling system of any of the embodiments, without designating constant speed running as a running condition of the vehicle when merely the accelerator pedal 27 and the brake pedal 28 are both put into a released condition, constant speed running may be designated when the acceleration switch 45 or the changing over switch 46 is changed to effect changing over to a preset condition, that is, when the acceleration switch 45 in the embodiments is changed over to the position [a].

INDUSTRIAL APPLICABILITY OF THE INVENTION

As described hereinabove, an engine controlling system of the present invention can improve its practical use where it is applied as a controlling system for an engine of a vehicle for controlling an output power of the engine, and particularly as a controlling system for an engine of an automobile for appropriately controlling the automobile engine to smoothly make automatic control of running of the automobile.

What is claimed is:

1. An engine controlling system for a vehicle having an engine, comprising:
    engine output adjusting means for adjusting output power of the engine;
    acceleration/deceleration instructing means for instructing the engine output adjusting means to accelerate or decelerate the vehicle by adjusting the output power of the engine;
    accelerated/decelerated condition detecting means for generating an inactive state detection signal when the acceleration/deceleration instructing means is released;
    constant running speed designating means responsive to said accelerated/decelerated condition detecting means for automatically starting generation of a constant running speed designating signal when generation of said inactive state detection signal has started;
    target speed setting means for automatically setting, as a target speed for the vehicle, the running speed of the vehicle at the moment that generation of said constant running speed designating signal has started;
    running speed detecting means for detecting the running speed of the vehicle and for generating an output signal representative thereof; and
    control means for controlling the engine output adjusting means in response to the output signal of the running speed detecting means and the target speed.

2. An engine controlling system for a vehicle as claimed in claim 1, wherein said acceleration/deceleration instructing means comprises:
    an accelerator pedal of said vehicle,
    operation amount detecting means for detecting an operation amount of said accelerator pedal, said operation amount detecting means producing an operation amount detection signal,
    output controlling means responsive to said operation amount detection signal for controlling said engine output adjusting means, and
    a brake pedal of said vehicle; and
    wherein said accelerated/decelerated condition detecting means comprises:
    accelerator pedal release detecting means for detecting release of said accelerator pedal, said accelerator pedal release detecting means producing an accelerator pedal release detection signal,
    brake pedal operated condition detecting means for producing a brake pedal operation detection signal when said brake pedal is in a treadled condition and for producing a brake pedal release detection signal when said brake pedal is not in a treadled condition, and
    signal outputting means for producing a non-operation detection signal when the accelerator pedal release detection signal and the brake pedal release detection signal are received at the same time.

3. An engine controlling system for a vehicle as claimed in claim 1, wherein said control means comprises:
    constant running speed target acceleration setting means for setting, when the constant running speed designating signal is received, a target acceleration of said vehicle necessary to make the running speed of said vehicle equal to the target speed,
    constant running speed target output calculating means for calculating a target output power of said engine corresponding to the target acceleration set by said constant running speed target acceleration setting means,
    constant running speed control amount calculating means for calculating a control amount of said engine output adjusting means corresponding to the target engine output power calculated by said constant running speed target output calculating means, and
    constant running speed output controlling means for controlling said engine output adjusting means in accordance with the control amount calculated by said constant running speed control amount calculating means.

4. An engine controlling system for a vehicle as claimed in claim 1, wherein said control means comprises:
    first means for controlling said engine output adjusting means to make the running speed of said vehicle equal to the target speed;
    second means for putting said engine into a substantially minimum output operating condition; and
    control change-over means for selecting one of said first means and said second means.

5. An engine controlling system for a vehicle as claimed in claim 4, wherein said control change-over means includes a switch provided in an interior of said vehicle, said switch comprising a first contact position associated with said first means and a second contact position aossociated with said second means.

6. An engine controlling system for a vehicle as claimed in claim 2, wherein said control means includes a braking controlling means for controlling, when the brake pedal operation detection signal is received, said engine output adjusting means to put said engine directly into a substantially minimum output operating condition.

7. An engine controlling system for a vehicle as claimed in claim 6, wherein said braking controlling means comprises:
- a sudden brake detecting means for generating a sudden braking detection signal when said sudden brake detecting means detects at least one of:
  - a condition wherein deceleration of said vehicle when the brake pedal operation detection signal is being received is greater than a predetermined value,
  - a condition wherein duration of the brake pedal operation detection signal is longer than a predetermined time, and
  - a condition wherein the running speed of said vehicle when the brake pedal release detection signal is received is lower than a reference speed; and
- output drop controlling means for controlling, when the sudden braking detection signal, accelerator pedal release detection signal and brake pedal release detection signal are received simultaneously, said engine output adjusting means to put said engine directly into the substantially minimum output operating condition.

8. An engine controlling system for a vehicle as claimed in claim 7, wherein said sudden brake detecting means generates the sudden braking detection signal when said sudden brake detecting means detects that the duration of a condition wherein the deceleration is greater than the predetermined value is longer than a reference time.

9. An engine controlling system for a vehicle as claimed in claim 2, wherein said output controlling means comprises:
- target acceleration setting means responsive to the operation amount detection signal for setting a target acceleration in accordance with an operation amount of said accelerator pedal and a changing rate of the operation amount,
- target output calculating means for calculating a target engine output corresponding to the target acceleration, and
- control amount calculating means for calculating a control amount of said engine output adjusting means corresponding to the target engine output,
- wherein said control means controls said engine output adjusting means in accordance with said control amount.

10. An engine controlling system for a vehicle as claimed in claim 1, wherein said engine output adjusting means includes a throttle valve for varying an amount of air to be taken into said engine.

* * * * *